(12) United States Patent
Ikeda et al.

(10) Patent No.: US 7,763,181 B2
(45) Date of Patent: Jul. 27, 2010

(54) OPTICAL COMPENSATION FILM, METHOD OF PRODUCING THE SAME, AND POLARIZING PLATE AND LIQUID CRYSTAL DISPLAY DEVICE USING THE SAME

(75) Inventors: Akira Ikeda, Minami-ashigara (JP); Michio Nagai, Minami-ashigara (JP); Hideyuki Nishikawa, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 11/664,840

(22) PCT Filed: Sep. 7, 2006

(86) PCT No.: PCT/JP2006/317746

§ 371 (c)(1), (2), (4) Date: Apr. 6, 2007

(87) PCT Pub. No.: WO2007/029771

PCT Pub. Date: Mar. 15, 2007

(65) Prior Publication Data

US 2008/0113112 A1   May 15, 2008

(30) Foreign Application Priority Data

Sep. 7, 2005   (JP) .............................. 2005-259718

(51) Int. Cl.
C09K 19/00 (2006.01)
C09K 19/06 (2006.01)
C09K 19/52 (2006.01)

(52) U.S. Cl. .............................. 252/299.01; 252/299.6; 430/20; 428/1.1; 428/1.3; 349/117

(58) Field of Classification Search .................. 428/1.1, 428/1.3; 349/117; 430/20; 252/299.01, 252/299.6
See application file for complete search history.

(56) References Cited

U.S. PATENT DOCUMENTS

| | | | |
|---|---|---|---|
| 4,583,825 A | 4/1986 | Buzak |
| 5,410,422 A | 4/1995 | Bos |
| 5,518,783 A | 5/1996 | Kawata et al. |
| 5,583,679 A | 12/1996 | Ito et al. |
| 5,646,703 A | 7/1997 | Kamada et al. |
| 5,774,197 A | 6/1998 | Nakamura |
| 5,805,253 A | 9/1998 | Mori et al. |
| 6,436,558 B1 | 8/2002 | Sato et al. |
| 7,431,971 B2 | 10/2008 | Nishikawa et al. |
| 7,431,972 B2 | 10/2008 | Nagai et al. |
| 2002/0037427 A1 | 3/2002 | Taguchi |
| 2005/0195348 A1 | 9/2005 | Saitoh et al. |
| 2006/0114385 A1 | 6/2006 | Ito et al. |
| 2006/0170851 A1 | 8/2006 | Kawamoto |
| 2006/0216440 A1 | 9/2006 | Nishikawa et al. |
| 2007/0091228 A1 | 4/2007 | Itadani et al. |
| 2008/0064879 A1 | 3/2008 | Takahashi et al. |
| 2008/0090027 A1 | 4/2008 | Li et al. |
| 2008/0113112 A1 | 5/2008 | Ikeda et al. |
| 2008/0158483 A1* | 7/2008 | Saitoh et al. ................... 349/96 |
| 2008/0193679 A1 | 8/2008 | Nishikawa et al. |

FOREIGN PATENT DOCUMENTS

| | | |
|---|---|---|
| DE | 39 11 620 A1 | 10/1990 |
| DE | 102 34 188 A1 | 2/2004 |
| EP | 1 156 349 A1 | 11/2001 |
| EP | 1 506 991 A2 | 2/2005 |
| JP | 6-214116 A | 8/1994 |
| JP | 7-157473 A | 6/1995 |
| JP | 7-281028 A | 10/1995 |
| JP | 7-306317 A | 11/1995 |
| JP | 9-26572 A | 1/1997 |
| JP | 9-197397 A | 7/1997 |
| JP | 9-292522 A | 11/1997 |
| JP | 10-54982 A | 2/1998 |
| JP | 10-312166 A | 11/1998 |
| JP | 11-279165 A | 10/1999 |
| JP | 11-292848 A | 10/1999 |
| JP | 11-316378 A | 11/1999 |
| JP | 11-345686 A | 12/1999 |
| JP | 3056997 B2 | 6/2000 |

(Continued)

OTHER PUBLICATIONS

*International Search Report dated Dec. 12, 2006.

(Continued)

*Primary Examiner*—Geraldina Visconti
(74) *Attorney, Agent, or Firm*—Buchanan Ingersoll & Rooney PC

(57) ABSTRACT

A liquid crystal display showing a high contrast and reduced in color shift depending on the viewing angle is provided.

The liquid crystal display device comprises a liquid crystal cell having a retardation value Re1(400) at 400 nm and a retardation value Re1(550) at 500 nm in the black state; and at least one layer of optically anisotropic layer formed of a composition comprising at least one species of liquid crystalline compound, having a retardations value Re2(400) at 400 nm and a retardation value Re2(550) at 550 nm, wherein Re2(400) and Re2(550) of said optically anisotropic layer, and retardations values Re1(400) and Re1(550) satisfy the relational expression (1) below:

$0.9 \leq \alpha2/\alpha1 \leq 1.1$   Relational Expression (1)

where, $\alpha1 = Re1(400)/Re1(550)$ and $\alpha2 = Re2(400)/Re2(550)$.

9 Claims, 2 Drawing Sheets

FOREIGN PATENT DOCUMENTS

| | | |
|---|---|---|
| JP | 2001-166147 A | 6/2001 |
| JP | 2002-20363 A | 1/2002 |
| JP | 2002-040429 A | 2/2002 |
| JP | 2003-57817 A | 2/2003 |
| JP | 2003-138251 A | 5/2003 |
| JP | 2004-184864 A | 7/2004 |
| JP | 2005-221962 A | 8/2005 |
| WO | WO96/37804 A1 | 11/1996 |

OTHER PUBLICATIONS

*Written Opinion of the International Searching Authority dated Dec. 12, 2006.

Notification Concerning Transmittal of Copy of International Preliminary Report on Patentability (Form PCT/IB/326), International Preliminary Report on Patentability (Form PCT/IB/373), Written Opinion of the International Search Authority (Form PCT/ISA/237) mailed in corresponding International Patent Application No. PCT/JP2006/317746, Mar. 20, 2008, the International Bureau of WIPO, Geneva, CH *.

Cherioux F et al., "Synthesis and characterization of an octupolar polymer and new molecular octupoles with off-resonant third order optical nonlinearities", Chemical Communications - Chemcon, Royal society of Chemistry, GB, No. 20, 1999, pp. 2083-2084, XP002261155.

Cherioux F. et al., "Synthesis and Electrochemical Properties of new star-shaped thiophene oligomers and their polymers", Chemical Communications - Chemcom, Royal Society of Chemistry, GB, No. 20, 1998 pp. 2225-2226, XP-002261154.

J.B. Hynes et al., "Hydroxylamine Derivatives as Potential Antimalarial Agents, 3. 1,2,4-Oxadiazoles", Journal of Medicinal Chemistry, vol. 15, No. 11, 1972, pp. 1198-1200, XP-002364208.

Kim et al., "Synthesis of Novel Discotic Mesogen Containing Electron-Transportable Oxadiazole Moiety", Molecular Crystals and Liquid Crystals, vol. 370, 2001, pp. 391-394, XP008055885.

Kim B G et al., "Star-shaped discotic nematic liquid crystal containing 1,3,5,-triethynylbenzene and oxadiazole-based rigid arms", Tetrahedron Letters, Elsevier, Amsterdam, NI, vol. 42, No. 14, Apr. 2, 2001 pp. 2697-2699 XP004231644.

Cristiano R et al., "Synthesis and Characterization of Low Molecular Mass Luminescent Liquid Crystalline Materials With 1,3,4-Oxadiazole Units", Liquid Crystals, Taylor and Francis, Abingdon, GB, vol. 32, No. 1, Jan. 2005, pp. 7-14, XP001222748 ISSN: 0267-8292 abstract; compound II.

Cristiano R et al., "Light-Emitting Bent-Shape Liquid Crystals", Liquid Crystals, Taylor and Francis, Abingdon, GB, vol. 32, No. 1, Jan. 2005, pp. 15-25, XP001222749 ISSN: 0267-8292, abstract; figure 1.

* cited by examiner (a)

(b)

OPTICAL COMPENSATION FILM, METHOD OF PRODUCING THE SAME, AND POLARIZING PLATE AND LIQUID CRYSTAL DISPLAY DEVICE USING THE SAME

TECHNICAL FIELD

The present invention relates to an optical compensation film, a method of producing the same, a polarizing plate and a liquid crystal display device using the same.

BACKGROUND ART

A liquid crystal display device comprises a liquid crystal cell and polarizing plate(s). A polarizing plate comprises protective film(s) generally composed of cellulose acetate, and a polarizing film, and is obtained typically by dying the polarizing film composed of polyvinyl alcohol film with iodine, stretching, and being stacked on both surfaces thereof with protective film(s). A transmission-type liquid crystal display device generally comprises two polarizing plates disposed both sides of the liquid crystal cell, and further comprises one or more optical compensation films; whereas a reflection-type liquid crystal display device generally comprises a reflection plate, a liquid crystal cell, one or more optical compensation film(s), and a polarizing plate in this order. A liquid crystal cell is composed of liquid crystalline molecules, two substrates enclosing them in between, and electrode layers applying therethrough voltage to the liquid crystalline molecules. The liquid crystal cell provides ON/OFF states based on difference in aligned states of the liquid crystalline molecules; and various displaying modes applicable to both of transmission and reflection types such as TN (twisted nematic), IPS (in-plane switching), OCB (optically compensatory bend), VA (vertically aligned), and ECB (electrically controlled birefringence) modes have been proposed.

In recent years, an OCB mode (or bend mode), characterized by its rapid response, has been attracting more attention under increasing needs of liquid crystal television sets. In the OCB mode, retardation of the liquid crystal cell is compensated by the optical compensation film(s) in principle, and therefore matching of optical characteristics between the optical compensation films and the liquid crystal cell are required for achieving wide viewing angle characteristics, viewing angle dependence capable of ensuring desirable hue, and strong blackness in the black state. For example, Japanese Laid-Open Patent Publication Nos. H9-211444 and H11-316378 disclose OCB-mode liquid crystal display devices provided with optical compensation films formed of liquid crystalline compounds. It has, however, been difficult to obtain desirable viewing angle characteristics, simply by controlling ever-known parameters as described in these publications. Japanese Laid-Open Patent Publication Nos. H8-101381 and H9-329785 disclose improvement in wavelength-dependence of the optical compensation film. These publications disclose techniques of improving optical characteristics of materials used for producing the optical compensation films and the liquid crystal cell, however, further improvement for better black state and for viewing angle dependence in contrast and hue has still required. For overcoming these problems, Japanese Laid-Open Patent Publication No. H9-230332 discloses the multi-gap technique in which transmittance of light of a liquid crystal layer is optimized for each of RGB; and Japanese Laid-Open Patent Publication No. 2001-290149 discloses a method in which difference in retardation Re between the liquid crystal cell and the optical compensation films is optimized in each of RGB regions of the RGB filter. These publications, however, provide only mention of adjusting wavelength-dependence of a liquid crystal cell, and no mention adjusting wavelength-dependence of an optical compensation film.

Japanese Laid-Open Patent Publication Nos. 2004-184864 and 2004-212938 provide mentions of wavelength-dependence characteristics of the optical compensation films. According to both publications, the wavelength-dependence in Re of an optically anisotropic film is defined as $\alpha$, which is equal to Re(400 nm)/Re(550 nm), a ratio of the Re value measured at 400 nm to the Re value measured at 550 nm. Considering wavelength-dependence characteristics of a rod-like liquid crystal in a cell of an actual liquid crystal panel, it is important to adjust $\alpha<1.2$ so as to make agreement of the dispersion characteristics between the cell and the optically anisotropic layers, in terms of achieving desirable display quality in the black state. These publications, however, provide no mention of specific means for lowering the wavelength-dependence $\alpha$ of optically anisotropic layers smaller than 1.2. Japanese Laid-Open Patent Publication Nos. H7-281028, H9-104656, H9-117983, 2000-111734 and 2000-111915 disclose techniques of controlling desired characteristics by mixing liquid crystal compounds and non-liquid crystal compounds which compose the optically anisotropic layers. These publications describe means for controlling or improving temperature of alignment, transition temperature, average angle of alignment, twist alignment property, molecular arrangement, and durability of the optically anisotropic layers, but do not disclose how to control the wavelength-dependence characteristics; and the present invention provides the technique.

PROBLEMS TO BE SOLVED BY THE INVENTION

It is therefore an object of the present invention to provide an optical compensation film, of which wavelength dependence is optimized as being conformed to that of a liquid crystal cell in the black state, capable of optically compensate a liquid crystal cell, in particular, OCB-mode or TN-mode liquid crystal cell, thereby contributing to improvement in contrast and moderation of viewing-angle-dependent coloration in the black state; and to provide a polarizing plate. It is another object of the present invention to provide a simple method of producing such optical compensation film.

It is still another object of the present invention to provide a liquid crystal display device, in particular OCB-mode or TN-mode liquid crystal display device, having a liquid crystal cell optically compensated in a correct manner, showing a high contrast, and moderated in viewing-angle-dependent coloration in the black state.

MEANS OF SOLVING THE PROBLEMS

The means of solving the problems are as follows.

[1] An optical compensation film comprising at least one optically anisotropic layer formed of a composition comprising two or more species of liquid crystalline compounds which differ in wavelength-dependence from each other, wherein a ratio $\alpha 2$, which is a ratio of a retardation value at 400 nm to a retardation value at 550 nm value, of said optically anisotropic layer is smaller than 1.2.

[2] The optical compensation film of [1], wherein said optically anisotropic layer is a layer formed of a composition comprising at least one species of liquid crystalline compounds represented by a formula (DI) or a formula (I) below:

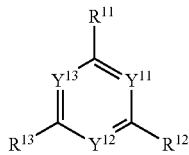

[Formula 1]

where, in the formula (DI), $Y^{11}, Y^{12}$ and $Y^{13}$ independently represent methine or nitrogen atom, $R^{11}$, $R^{12}$ and $R^{13}$ independently represent the group represented by the formula (DI-A), the formula (DI-B) or the formula (DI-C) below:

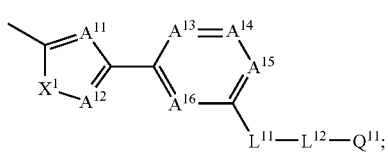

[Formula 2]

(where, in the formula (DI-A), $A^{11}, A^{12}, A^{13}, A^{14}, A^{15}$ and $A^{16}$ independently represent methine or nitrogen atom, $X^1$ represents an oxygen atom, sulfur atom, methylene or imino, $L^{11}$ represents —O—, —O—CO—, —CO—O—, —O—CO—O—, —S—, —NH—, —SO$_2$—, —CH$_2$—, —CH=CH— or —C≡C—, $L^{12}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substituent. $Q^{11}$ independently represents a polymerizable group or hydrogen atom);

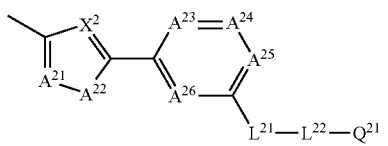

[Formula 3]

(where, in the formula (DI-B), $A^{21}, A^{22}, A^{23}$ $A^{24}$ $A^{25}$ and $A^{26}$ independently represent methine or nitrogen atom, $X^2$ represents an oxygen atom, sulfur atom, methylene or imino, $L^{21}$ represents —O—, —O—CO—, —CO—O—, —O—CO—O—, —S—, —NH—, —SO$_2$—, —CH$_2$—, —CH=CH— or —C≡C—, $L^{22}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substituent. $Q^{21}$ independently represents a polymerizable group or hydrogen atom);

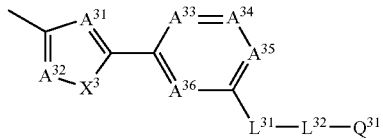

[Formula 4]

(where, in the formula (DI-C), $A^{31}, A^{32}, A^{33}, A^{34}, A^{35}$ and $A^{36}$ independently represent methine or nitrogen atom, $X^3$ represents an oxygen atom, sulfur atom, methylene or imino, $L^{31}$ represents —O—, —O—CO—, —CO—O—, —O—CO—O—, —S—, —NH—, —SO$_2$—, —CH$_2$—, —CH=CH— or —C≡C—, $L^{32}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substitutive group. $Q^{31}$ independently represents a polymerizable group or hydrogen atom);

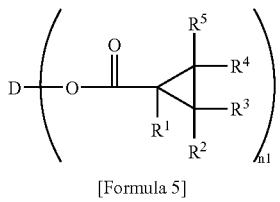

[Formula 5]

where, in the formula (I), D represents a triphenylene, n1 represents an integer from 3 to 6, $R^1$, $R^2$, $R^3$, $R^4$ and $R^5$ independently represent a hydrogen atom, substituted or non-substituted $C_{1-20}$ alkyl group, substituted or non-substituted $C_{3-20}$ alkenyl group, substituted or non-substituted $C_{1-20}$ alkoxy group, substituted or non-substituted $C_{3-20}$ alkenyloxy group, substituted or non-substituted $C_{6-20}$ aryl group, substituted or non-substituted $C_{6-20}$ aryloxy group, or substituted or non-substituted $C_{1-20}$ alkoxycarbonyl group.

[3] The optical compensation film of [1] or [2], further comprising a support having Re/Rth(450 nm), which is ratio of Re to Rth at 450 nm, 0.4 to 0.95 times as small as Re/Rth (550 nm), which is ratio of Re to Rth at 550 nm, and having Re/Rth(650 nm), which is ratio of Re to Rth at 650 nm, 1.05 to 1.9 times as large as Re/Rth(550 nm).

[4] A method of producing an optical compensation film comprising:

applying a composition comprising at least one species of liquid crystalline compound to a surface, and aligning molecules of said liquid crystalline compound, to thereby form an optically anisotropic layer having α2, which is ratio of a retardation value at 400 nm to a retardation value at 550 nm, of smaller than 1.2, wherein wavelength-dependence α2 of said optically anisotropic layer is adjusted to the range by adding a plurality of liquid crystalline compounds of which wavelength-dependence is different from each other to the composition, and/or by adding a non-liquid crystalline compound together with the liquid crystalline compound(s) to the composition.

[5] The method of [4], wherein said composition has a viscosity equal to or smaller than 1500 mPa·s at T° C.; and said optically anisotropic layer is formed by aligning molecules of said liquid crystalline compound(s) at T° C.

[6] A polarizing plate comprising a polarizing film, and an optical compensation film as set forth in [1] to [3].

[7] A liquid crystal display device comprising:

a liquid crystal cell having a retardation value Re1(400) at 400 nm and a retardation value Re1 (550) at 500 nm in the black state; and at least one layer of optically anisotropic layer formed of a composition comprising at least one species of liquid crystalline compound, having a retardation value Re2(400) at 400 nm and a retardation value Re2(550) at 550 nm, wherein Re2(400) and Re2(550) of said optically anisotropic layer, and retardations values Re1(400) and Re1(550) satisfy the relational expression (1) below:

$0.9 \leq \alpha2/\alpha1 \leq 1.1$    Relational Expression (1)

where, $\alpha1$=Re1(400)/Re1(550) and $\alpha2$=Re2(400)/Re2 (550).

[8] The liquid crystal display device of [7], further comprising a polarizing film disposed further outside of said optically anisotropic layer, and a polymer film disposed between said polarizing film and said optically anisotropic layer;

where said polymer film has Re/Rth(450 nm), which is ratio of Re to Rth at 450 nm, 0.4 to 0.95 times as small as Re/Rth(550 nm), which is ratio of Re to Rth at 550 nm, and has Re/Rth(650 nm), which is ratio of Re to Rth at 650 nm, 1.05 to 1.9 times as large as Re/Rth (550 nm).

[9] The liquid crystal display device of [7] or [8], employing an OCB-mode device.

[10] The liquid crystal display device of [7] or [8], employing a TN-mode device.

It is to be understood in this description that "45°", "parallel" or "normal" means a range smaller than an exact angle±5°. Difference from the exact angle is preferably smaller than 4°, and more preferably smaller than 3. As for the angle, "+" means rotation in the clockwise direction, and "−" means rotation in the counter-clockwise direction. The term "slow axis" means the direction in which refractive index becomes maximum. The "visible light region" means the range from 380 nm to 780 nm. Refractive indices are measured at λ=550 nm in the visible light region, unless otherwise specifically noted.

In this description, the term "polarizing plate" is used for both of long-web polarizing plates and those cut ("cutting" in this description includes "punching" and "clipping") into size suitable for incorporation into liquid crystal devices. In this description, the terms "polarizing film" and "polarizing plate" are used in a discriminative manner, wherein the "polarizing plate" means a stack including a "polarizing film" having a transparent protective film at least on one surface thereof.

In this description, the term "molecular symmetry axis" means axis of rotation symmetry if the molecule has the axis of rotation symmetry, without always needing rotation symmetry of the molecule in a strict sense. In general, the molecular symmetry axis of discotic liquid crystalline compound is the axis which penetrates the disk plane at the center thereof and normal thereto, and that of rod-like liquid crystalline compound is the longitudinal axis of the molecule. In this description, Re(λ) and Rth(λ) represent in-plane retardation and in-thickness direction retardation at wavelength λ, respectively. The Re(λ) is measured by using KOBRA-21ADH (manufactured by Oji Scientific Instruments) for an incoming light of a wavelength λnm in a normal direction to a film-surface. The Rth(λ) is calculated by using KOBRA-21ADH based on three retardation values; first one of which is the Re(λ) obtained above, second one of which is a retardation which is measured for an incoming light of a wavelength nm in a direction rotated by +40° with respect to the normal direction of the film around an in-plane slow axis, which is decided by KOBRA 21ADH, as an a tilt axis (a rotation axis), and third one of which is a retardation which is measured for an incoming light of a wavelength λnm in a direction rotated by −40° with respect to the normal direction of the film around an in-plane slow axis as an a inclining axis (a rotation axis); a hypothetical mean refractive index and an entered thickness value of the film. The mean refractive indexes of various materials are described in published documents such as "POLYMER HANDBOOK" (JOHN WILEY&SONS, INC) and catalogs. If the values are unknown, the values may be measured with an abbe refractometer or the like. The mean refractive indexes of major optical films are exemplified below:

cellulose acylate (1.48), cycloolefin polymer (1.52), polycarbonate (1.59), polymethylmethacrylate (1.49) and polystyrene (1.59).

KOBRA 21ADH calculates nx, ny and nz, upon enter of the hypothetical values of these mean refractive indices and the film thickness. Base on thus-calculated nx, ny and nz, Nz=(nx−nz)/(nx−ny) is further calculated.

EMBODIMENTS OF THE INVENTION

The present invention will be described in detail.

In order to raise the front contrast in the OCB mode, it is preferable to match the retardation of the liquid crystal cell and the optically anisotropic layer in the black state for complete compensation. According to the conventional techniques, for matching the retardation of each colors of red (R), green (G) and blue (B) between the liquid crystal cell in the black state and the optically anisotropic layers, for example, the cell gap is adjusted; or the driving voltage is separately controlled so as to apparently adjust the retardation of the liquid crystal cell. Regarding the method in which the driving voltage is separately controlled so as to apparently adjust the retardation of the liquid crystal cell, FIG. 2(a) schematically shows a method of correcting retardation in relation to wavelength. On the shorter wavelength side, the driving voltage is applied so as to increase the retardation of the liquid crystal cell, to thereby adapt it to the retardation ascribable to the optically anisotropic layer, whereas on the longer wavelength side, the drive voltage is applied so as to decreased the retardation of the liquid crystal cell, to thereby adapt it to the retardation ascribable to the optically anisotropic layer.

However, according to these methods, complete compensation can not be attained; and there are still problems remaining such as lowering in contrast due to incomplete blackness and leakage of light, and color shift.

According to the present invention, as shown in FIG. 2(b), the wavelength-dependence of the optically anisotropic layer is adjusted so as to match the retardation of the liquid crystal cell in the black state. As described in the above, none of the previous publications showed specific methods therefor.

The present invention achieves matching of wavelength-dependence characteristics with the liquid crystal cell in the black state, by using an optically anisotropic layer having retardation values Re2(400) and Re2(550) which satisfy the relational expression (1) below with retardation values Re1 (400) at 400 nm and Re1(550) at 550 nm of the liquid crystal cell in the black state:

$0.9 \leq \alpha2/\alpha1 \leq 1.1$    Relational Expression (1)

where, $\alpha1$=Re1(400)/Re1(550) and $\alpha2$=Re2(400)/Re2 (550).

According to the present invention, it is possible to achieve optical compensation by adjusting wavelength-dependence characteristics of retardation of the optically anisotropic layer so as to adapt it to that of the liquid crystal cell in the black state, without adjusting the cell gap for R, G and B or driving voltage separately. Furthermore, according to the embodiments of the combination with a support, typically composed of a polymer film, having predetermined wavelength-dependence characteristics, it is further possible to achieve improvement in viewing-angle-dependent color shift.

Wavelengths of R, G, B adopted in this description are 650 nm for R, 550 nm for G, and 400 nm for B. Although the wavelengths of R, G, B are not always represented by these wavelengths, they are considered as being appropriate for the purpose of specifying optical characteristics capable of raising the effects of the present invention.

An exemplary liquid crystal display device of the present invention will be described in detail, referring to the attached drawings.

An OCB-mode liquid crystal display device shown in FIG. 1 has a liquid crystal cell comprising a liquid crystal layer in which liquid crystal molecules 7 show bend alignment under voltage application, or in the black state, and substrates 6 and 8 holding them in between. The substrates 6 and 8 are rubbed on the surfaces thereof brought into contact with the liquid crystal molecules 7, wherein direction of rubbing is indicated by arrow RD. The arrow seen through the substrate is illustrated by a broken line. Polarizing films 1 and 101 are disposed so as to hold the liquid crystal cell in between. The polarizing films 1 and 101 are disposed so that their transmission axes 2 and 102 are perpendicular to each other, and they are at 45° away from the RD direction of the liquid crystal layer 7 of the liquid crystal cell. Between each of the polarizing films 1 and 101 and the liquid crystal cell, there are respectively disposed polymer films 3a and 103a typically composed of a cellulose acylate film, and optically anisotropic layers 5 and 9 which satisfy the above-described relational expression (1) with the liquid crystal cell in the black state. The polymer films 3a and 103a are disposed so that the slow axes 14a and 104a thereof are parallel to the direction of transmission axes 2 and 102 of the respectively-adjacent polarizing films 1 and 101. The optically anisotropic layers 5 and 9 exhibit optical anisotropy developed by alignment of the liquid crystalline compound.

The liquid crystal cell shown in FIG. 1 is composed of an upper substrate 6 and a lower substrate 8, and a liquid crystal layer formed of liquid crystal molecules 7 held therebetween. The substrates 6 and 8 have alignment layers (not shown) formed on the surfaces thereof brought into contact with the liquid crystal molecules 7 (occasionally referred to as "inner surface", hereinafter), so as to align the liquid crystal molecules 7 under no applied voltage or low applied voltage, in the parallel direction with a pre-tilt angle. On the inner surfaces of the substrates 6 and 8, there are formed transparent electrodes (not shown) capable of applying therethrough voltage to the liquid crystal layer composed of the liquid crystal molecules 7. In the present invention, product $\Delta n \cdot d$ of thickness d (µm) of the liquid crystal layer and refractive index anisotropy $\Delta n$ is preferably adjusted to 0.1 to 1.5 µm, more preferably 0.2 to 1.5 µm, still more preferably 0.2 to 1.2 µm, and further more preferably 0.6 to 0.9 µm. These ranges ensure high luminance in the white state under application of the white level voltage, and can provide a bright and high-contrast display device. There is no special limitation on liquid crystal material to be adopted, wherein a liquid crystal material, having a positive dielectric anisotropy, and being capable of responding in parallel with the direction of electric field, is used for an embodiment where the electric field is applied between the upper and lower substrates 6 and 8.

For an example of a liquid crystal cell employing an OCB-mode, a nematic liquid crystal material having positive dielectric anisotropy and $\Delta n=0.08$, $\Delta \in =5$ or around can typically be used between the upper and lower substrates 6 and 8. Although thickness d of the liquid crystal layer is not specifically limited, it may be adjusted to 6 µm or around, for the case where a liquid crystal having characteristics of the above-described ranges is used. Brightness in the white state varies depending on the magnitude of product $\Delta n \cdot d$ of the thickness d and refractive index anisotropy $\Delta n$ in the white state, so that $\Delta n \cdot d$ of the liquid crystal layer under no applied voltage is preferably adjusted to the range from 0.6 to 1.5 µm, in view of obtaining a sufficient level of brightness under application of the white level voltage.

In the OCB-mode liquid crystal display device, it is not so often to use a chiral material, which is generally used for TN-mode liquid crystal display devices, because it degrades dynamic response characteristics, but may occasionally be added for the purpose of reducing alignment failure. For the case where the multi-domain structure is adopted, it is advantageous for the purpose of adjusting alignment of the liquid crystal molecules in the boundary regions between every adjacent domains. The multi-domain structure refers to a structure in which one pixel of the liquid crystal display device is divided into a plurality of domains. For example, adoption of the multi-domain structure in the OCB mode is preferable in view of improving viewing-angle characteristics of luminance and hue. More specifically, viewing-angle-dependent deflection of luminance and hue can be reduced, by composing each pixel by two or more (preferably 4 or 8) domains differing in the initial alignment state of the liquid crystal molecules for averaging. Similar effect can be obtained also by composing each pixel by two or more different domains in which the direction of alignment of the liquid crystal molecules under applied voltage varies in a continuous manner.

The polymer films 3a and 103a may function as a support for the optically anisotropic layers 5 and 9, as a protective film for the polarizing film 1 and the polarizing film 101, or as the both. More specifically, the polarizing film 1, the polymer film 3a and the optically anisotropic layer 5, or the polarizing film 101, the polymer film 103a and the optically anisotropic layer 9 may be incorporated as an integrated stack into the liquid crystal display device, or may be integrated individually as an independent component. Another possible configuration may be such that a protective film for the polarizing film is additionally disposed between the polymer film 3a and the polarizing film 1, or between the polymer film 103a and the polarizing film 101, but such a protective film is preferably not disposed. The slow axis 4a of the polymer film 3a and the slow axis 104a of the polymer film 103a are preferably parallel or perpendicular to each other. According to the embodiments in which the slow axes 4a and 104 of the polymer films 3a and 103a are perpendicular to each other, the birefringence of the individual polymer films may be cancelled, and therefore lowering in optical characteristics of light in the normal direction to the liquid crystal display device may be reduced. According to the embodiments in which the slow axes 4a and 104a are parallel to each other, residual retardation, if any, of the liquid crystal layer may be compensated by birefringence of the protective film.

Direction of each of the transmission axes 2 and 102 of the polarizing films 1 and 101, direction of each of slow axes 4a and 104a of the polymer films 3a and 103a, and alignment direction of liquid crystal molecules 7 is adjusted to an optimal range, depending on materials used for the individual components, display mode, stacked structure of the components and so forth. More specifically, the polarizing film 1 and the polarizing film 101 are disposed so that the transmission axis 2 and the transmission axis 102 thereof are substantially perpendicular to each other. The liquid crystal display device of the present invention is, however, not limited to such configuration.

The optically anisotropic layers 5 and 9 are disposed respectively between the polymer film 3a and 103a, and the liquid crystal cell. The optically anisotropic layers 5 and 9 are layers formed of a composition comprising a liquid crystalline compound, for example, a rod-like compound or a disc-like compound. In the optically anisotropic layer, liquid crystalline compound molecules are fixed in a predetermined alignment state. At least at the interface on the polymer films 3a and 103a side, the mean alignment directions 5a and 9a of the molecular symmetry axis of the liquid crystalline compound in the optically anisotropic layers 5 and 9 cross at an angle of approximately 45° with the in-plane slow axes 4a and 104a of the polymer films 3a and 103a. Being disposed in such a configuration, the optically anisotropic layer 5 or 9 can give retardation to light coming in the normal direction and prevent light from leaking. Also at the interface on the liquid crystal cell side, the mean alignment directions of the optically anisotropic layers 5 and 9 are preferably crossed at an angle of approximately 45° with the in-plane slow axes 4a and 104a of the polymer films 3a and 103a.

The mean alignment direction 5a of the molecular symmetry axis of the liquid crystalline compound in the optically anisotropic layer 5 at the polarizing film side (polymer film interface side) is preferably at approximately 45° with respect to the transmission axis 2 of the polarizing film 1 disposed more closer thereto. Similarly, the mean alignment direction 9a of the molecular symmetry axis of the liquid crystalline compound in the optically anisotropic layer 9 at the polarizing film side (polymer film interface side) is preferably at approximately 45° with respect to the transmission axis 102 of the polarizing film 101 disposed more closer thereto. Disposition while keeping such relation allows optical switching, depending on sum of retardation generated by optically anisotropic layer 5 or 9 and retardation generated by the liquid crystal layer.

According to the present invention, the retardation values at 400 nm and 550 nm, Re1(400) and Re1(550), of the liquid crystal cell in the black state are considered, and the optically anisotropic layer (s), having a wavelength-dependence almost equal to that of the liquid crystal cell in the black state, $\alpha 1 = Re1(400)/Re1(550)$, is employed. Since $\alpha 1$ of OCB-mode liquid crystal cells generally falls in the range from 1.0 to 1.2 or around, it is preferable, in terms of satisfying the above-described relational expression (1), to adjust $\alpha 2 = Re2(400)/Re2(550)$, a ratio of a retardation value at 400 nm, Re2(400), to a retardation value at 550 nm, Re2(550), of the optically anisotropic layer(s) to 0.9 to 1.3 or around, more preferably to smaller than 1.2, and still more preferably to smaller than 1.18. The optically anisotropic layer(s) showing such wavelength-dependence can be produced typically by using a composition comprising two or more species of liquid crystalline compound of which wavelength-dependence is different from each other, a composition comprising a liquid crystalline compound together with a non-liquid crystalline compound, and/or, a composition showing a predetermined range of viscosity at an alignment temperature. These methods will be described later.

Next, the principle of image display on the liquid crystal display device shown in FIG. 1 will be explained.

In the driving state where the driving voltage corresponded to the black state is applied through the transparent electrodes (not shown) respectively on the liquid crystal cell substrates 6 and 8, the liquid crystal molecules 7 in the liquid crystal layer show bend alignment, and the in-plane retardation in this state is canceled by the in-plane retardation of the optically anisotropic layers 5 and 9, leaving state of polarization of incident light almost unchanged. Since the transmission axes 2, 102 of the polarizing films 1 and 101 cross perpendicular to each other, light coming from the lower side (for example through the back electrode) is polarized by the polarizing film 101, passes through the liquid crystal cell 5 to 8 while keeping the state of polarization unchanged, and is blocked by the polarizing film 1. More specifically, the liquid crystal display device shown in FIG. 1 can provide an ideal black state under the driving state. On the contrary, when driving voltage corresponded to the white state is applied through the transparent electrode (not shown), the liquid crystal molecules 7 in the liquid crystal layer show a bend alignment different from the bend alignment corresponded to the black state, and shows an in-plane retardation different from that corresponded to the black state, and shows an in-plane retardation different from that in the black state. As a consequence, the optically anisotropic layers 5 and 9 can no more cancel in-plane retardation of the liquid crystal cell by their in-plane retardation, so that light passing through the liquid crystal cell 5 to 8 varies the state of polarization thereof, and can pass through the polarizing film 1. The white state is thus obtained.

According to the present invention, leakage of light and color shift in the normal direction view and laterally oblique direction views generated in the OCB-mode liquid crystal display device in the black state can be improved at the same time, by employing the optically anisotropic layers which satisfy the above-described relational expression (1). By disposing them in combination with the polymer film showing predetermined optical characteristics, the viewing-angle-dependent color shift can further be improved. More specifically, according to the present invention, the polymer film to be combined with the optically anisotropic layer satisfying the above-described relational expression (1) is selected in terms of Re/Rth, which is a ratio of Re to Rth of the polymer film. This is because the value of Re/Rth is a determinant of two specific axes of polarization in propagation of light going through a biaxial birefringent medium in an oblique direction. Two specific axes of polarization in propagation of light going through a biaxial birefringent medium in an oblique direction correspond to the long axis and the short axis on a section appeared when the refractive index ellipsoid is cut in the direction of normal line on the direction of propagation of light.

In general, the polymer film, disposed between the optically anisotropic layer and the polarizing film, such as a support of the optically anisotropic layer and a protective film of a polarizing film, may have an almost constant value of Re/Rth irrespective of the individual wavelengths of R, G, B, and consequently show an almost constant angle of slow axis. Also in the present invention, the polymer film having such characteristics may be used as a support of the optically anisotropic layer or as a protective film of the polarizing film, but use of the polymer film having Re/Rth values independently satisfy predetermined relations for each wavelength of R, G, and B makes it possible to optimize both of the slow axis and retardation, which are major factors determining variation in the state of polarization, for each wavelength of R, G, and B, and to further moderate the viewing-angle-dependent color shift. When light comes in an oblique direction through the polymer film, the optically anisotropic layer having predetermined wavelength-dependence, and further the bend-alignment liquid crystal, it is preferred that optical compensation can be achieved for any visible light in terms of the two factors, retardation and apparently-misalignment in transmission axes of upper and lower polarizing film in a direction other than the normal direction, at the same time. And, for achieving such optical compensation, preferably, the Re/Rth value of the polymer film is adjusted depending on wavelength. More specifically, by increasing Re/Rth of the polymer film as the wavelength increases, it is made possible to further moderate difference in the states of polarization at R, G, B ascribable to the wavelength-dependence of the optically anisotropic layer and the liquid crystal cell layer. As a consequence, combination of the optically anisotropic layer showing predetermined wavelength-dependence and the polymer film showing predetermined wavelength-dependence allows further complete compensation, and can moderate lowering in contrast. According to the invention, almost complete compensation may be achieved over the entire visible light region, if parameters of the film are determined by representing the entire visible light region with R, G and B.

From this point of view, the polymer films 3a and 103a preferably have a ratio of Re3 to Rth3 at 450 nm, Re3/Rth3 (450 nm), 0.4 to 0.95 times as small as a ratio of Re3 to Rth3 at 550 nm, Re3/Rth3 (550 nm), have a ratio a ratio of Re3 to Rth3 at 650 nm, Re3/Rth3 (650 nm), 1.05 to 1.9 times as large as Re3/Rth3 (550 nm), and have an Rth of 70 to 400 nm.

Configuration of the liquid crystal display device of the present invention is not limited to that shown in FIG. 1, and may comprise other components. For example, a color filter may be disposed between the liquid crystal cell and the polarizing film. For the case where the liquid crystal display device is used as that of the transmission type, it is allowable to dispose a back light using a cold-cathode or hot-cathode fluorescent tube, light emitting diode, field emission element, or electroluminescence element as a light source on the back side.

The liquid crystal display device of the present invention includes those of direct image viewing type, image projection type and light modulation type. The present invention is particularly effective in an embodiment where the invention is applied to active-matrix liquid crystal display devices using three-terminal or two-terminal semiconductor elements such as TFT and MIM. Of course, also an embodiment where the invention is applied to passive-matrix liquid crystal display devices represented by those of the STN type, characterized by time-divisional driving, is effective.

Materials used for producing the optical compensation film of the present invention and method of producing will be detailed below.

[Optical Compensation Film]

The optical compensation film of the present invention contributes to widening viewing angles of good contrast and to reducing viewing-angle-dependent color shift of the liquid crystal display device, in particular those of OCB mode and VA mode. The optical compensation film of the present invention may be disposed between the polarizing plate on the observer's side and the liquid crystal cell, or between the polarizing plate on the back side and the liquid crystal cell, or to the both. For example, it may be integrated as an independent component into the liquid crystal display device, or may be integrated as a component of the polarizing plate, by imparting optical characteristics to the protective film protecting the polarizing film so as to allow it to function also as a transparent film. A preferable embodiment of the optical compensation film of the present invention is such as having a support composed of a polymer film (more preferably, cellulose acylate film), and an optically anisotropic layer provided thereon, and having a predetermined wavelength-dependence. The optical compensation film may comprise, between the polymer film and the optically anisotropic layer, an alignment layer controlling alignment of the liquid crystalline compound in the optically anisotropic layer. So far as the optical characteristics described later can be satisfied, the polymer film and the optically anisotropic layer may respectively be composed of two or more layers. First, the individual components of the optical compensation film of the present invention will be described in detail.

(Optically Anisotropic Layer)

The optical compensation film of the present invention comprises at least one optically anisotropic layer formed of a composition comprising at least one species of liquid crystalline compound. The optically anisotropic layer may directly be formed on the surface of a support such as cellulose acylate film, or may be formed on an alignment layer preliminarily formed on the support. The optical compensation film of the present invention can be produced also by transferring a liquid crystalline compound layer formed on a separate base onto the support such as cellulose acylate film, using a pressure-sensitive adhesive, general adhesive or the like.

Liquid crystalline compound used for forming the optically anisotropic layer includes rod-like liquid crystalline compound and disc-like liquid crystalline compound (disc-like liquid crystalline compound may occasionally be referred to as "discotic liquid crystalline compound", hereinafter). The rod-like liquid crystalline compound and the discotic liquid crystalline compound may be polymer liquid crystal or low-molecular-weight liquid crystal. It is no more necessary for the compound finally contained in the optically anisotropic layer to exhibit liquid crystallinity. When an optically anisotropic layer is produced by using low-molecular-weight liquid crystalline compound, the compound may be crosslinked in the process of forming the optically anisotropic layer, and consequently lose the liquid crystallinity. Such an embodiment is included in the present invention.

(Rod-Like Liquid Crystal Compound)

Examples of the rod-like liquid crystal compound, which can be used in the invention, include azomethines, azoxy compounds, cyanobiphenyls, cyanophenyl esters, benzoate esters, cyclohexanecarboxylphenyl esters, cyanophenylcyclohexanes, cyano-substituted phenylpyrimidines, alkoxy-substituted phenylpyrimidines, phenyldioxanes, tolans and alkenyl cyclohexyl benzonitriles; and also include metal complexes. Liquid crystal polymers comprising a repeating unit containing a rod-like liquid crystal moiety may also be used. In other words, the rod-like liquid crystal compound may bond to (liquid crystal) polymer.

Rod-like liquid crystal compounds are described in fourth, seventh and eleventh chapters of "Published Quarterly Chemical Review vol. 22 Chemistry of Liquid Crystals (Ekisho no Kagaku)" published in 1994 and edited by Japan Chemical Society; and in third chapter of "Handbook of liquid Crystal Devices (Ekisyo Debaisu Handobukku)" edited by the 142 th committee of Japan Society for the Promotion of Science.

The rod-like crystal compounds desirably have a birefringence index of 0.001 to 0.7.

The rod-like crystal compounds desirably have one or more polymerizable groups for fixing themselves in an alignment state. Preferred examples of the polymerizable group include unsaturated polymerizable groups and epoxy groups;

among those, unsaturated polymerizable groups are preferred and ethylene unsaturated polymerizable groups are most preferred.

(Discotic Liquid Crystalline Compound)

Examples of discotic liquid-crystal compounds include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2,655 (1994), J. Zhang et al.

Examples of the discotic liquid crystal compounds also include compounds having a discotic core and substituents, radiating from the core, such as a linear alkyl or alkoxy group or substituted benzoyloxy groups. Such compounds exhibit liquid crystallinity. It is preferred that molecules have rotational symmetries respectively or as a whole of molecular assembly to be aligned in an alignment state.

As described above, the discotic liquid crystal compound employed in preparing optically anisotropic layers is not required to maintain liquid crystallinity after contained in the optically anisotropic layers. For example, when a low-molecular-weight discotic liquid crystal compound, having a reacting group initiated by light and/or heat, is employed in preparation of an optically anisotropic layer, polymerization or cross-linking reaction of the compound is initiated by light and/or heat, and carried out, to thereby form the layer. The polymerized or cross-linked compounds may no longer exhibit liquid crystallinity. Preferred examples of the discotic liquid crystal compound are described in JPA No. hei 8-50206. The polymerization of a discotic liquid-crystal compound is described in Tokkai No. hei 8-27284.

In order to fix the discotic liquid crystalline molecule by a polymerization, a polymerizable group has to be bonded as a substituent to a disk-shaped core of the discotic liquid crystalline molecule. In a preferred compound, the disk-shaped core and the polymerizable group are preferably bonded through a linking group, whereby the aligned state can be maintained in the polymerization reaction. Typical examples of such compound include the discotic compound represented by a following formula (A).

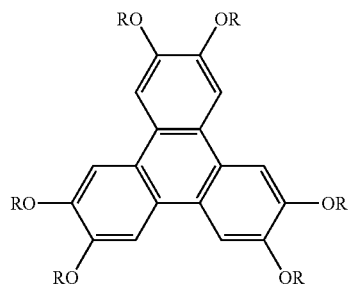

Formula (A)

[Formula 6]

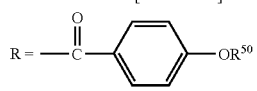

In the formula, $R^{50}$ represents an alkyl group which may have at least one substituent group, and preferably represents a linear or branched $C_{1-10}$ alkyl group having a terminal polymerizable group such as (meth)acryloyl or epoxy. Examples of the compound represented by the Formula (A) include the compounds having a group represented by the following formula as R.

[Formula 7]

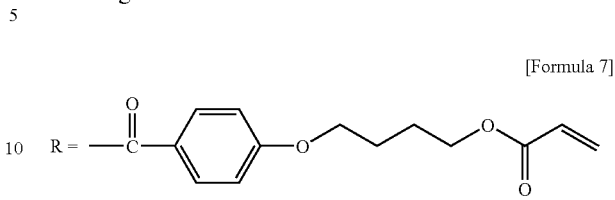

However, using the discotic liquid crystal compound represented by the formula (A), it might be difficult to prepare an optically anisotropic layer, exhibiting a wavelength-dependence of retardation at 400 nm and 500 nm, Re2(400) and Re2(550), equal to that generated in a liquid crystal cell at the same wavelengths in the black state. It is preferable to form the optically anisotropic layer using a composition comprising at least one species of compounds expressed by the formulae (DI) and (I) below, because the wavelength-dependence thereof can readily be adjusted within a range nearly equal to that of wavelength-dependence at the above-described wavelengths of the liquid crystal cell in the black state.

Formula (I)

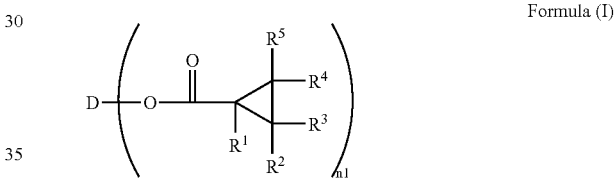

In the formula (I), D represents a disc-like core. The disc-like core is positioned at the center of the disc-like compound, and forms the disc plane thereof. The disc-like core is well known concept in molecular structure of disc-like liquid crystalline molecules. The disc-like liquid crystals (discotic liquid crystal) are described in various literatures (C. Destrade et al., Mol. Crysr. Liq. Cryst., vol. 71, page 111 (1981); "Kikan Kagaku Sosetsu No. 22, Ekisho no Kagaku" (Chemical Review No. 22, Chemistry of Liquid Crystal, quaterly), edited by The Chemical Society of Japan, Chapter 5, Chapter 10 Section 2 (1994); B. Kohne et al., Angew. Chem. Soc. Chem. Comm., page 1794 (1985); J. Zhang et al., J. Am. Chem. Soc., vol. 116, page 2655 (1994)).

Examples of the discotic core are shown below. In the formulae, Y means a following formula (VI). In the Formula (VI), $R^1$, $R^2$, $R^3$, $R^4$ and $R^5$ are same as those in the Formula (I) respectively; and their preferred examples are also same as those in the formula (I) respectively.

Formula (VI)

[Formula 9]

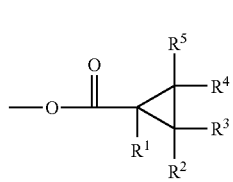

[Formula 10]
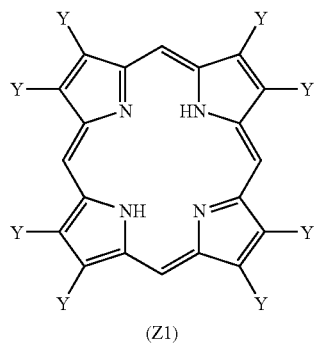
(Z1)
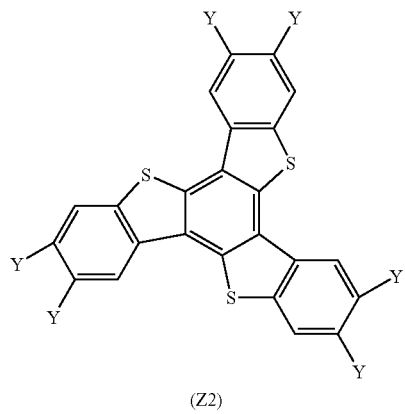
(Z2)
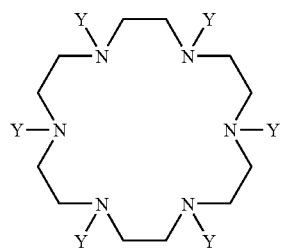
(Z3)
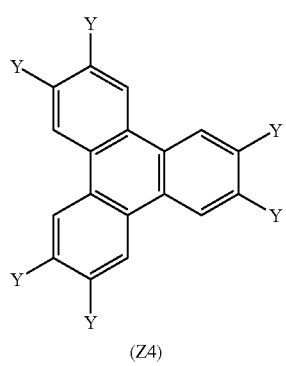
(Z4)
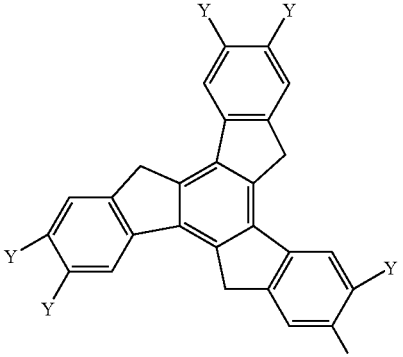
(Z5)
[Formula 11]
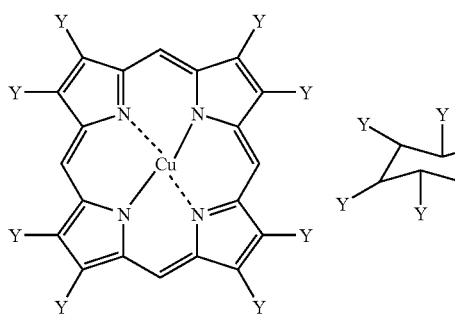 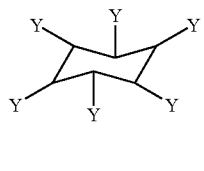
(Z7)  (Z8)
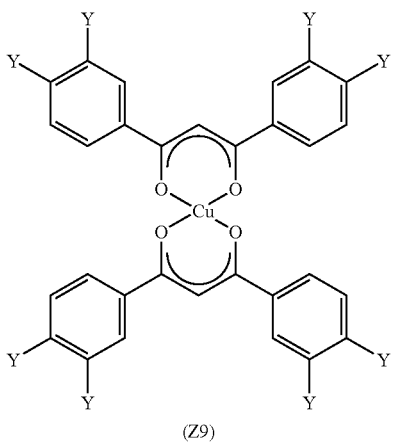
(Z9)
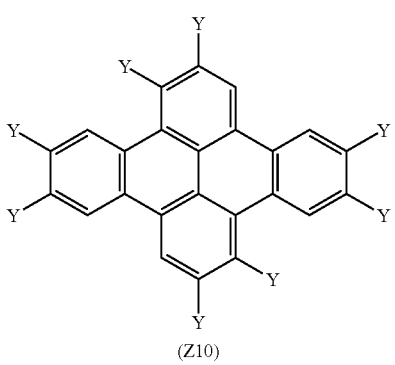
(Z10)

-continued
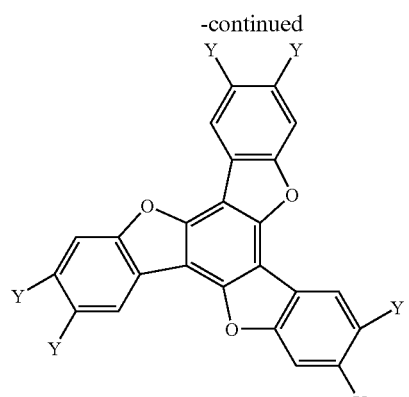
(Z6)
[Formula 11]
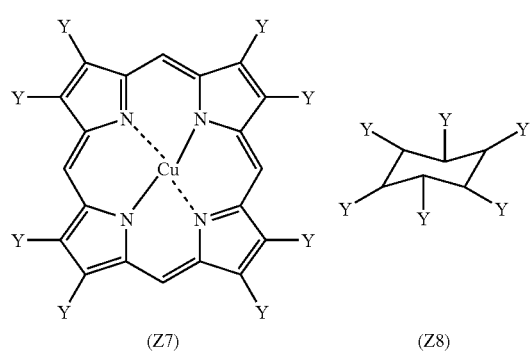
(Z7)  (Z8)
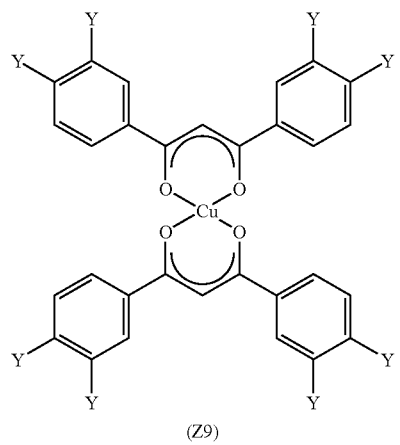
(Z9)
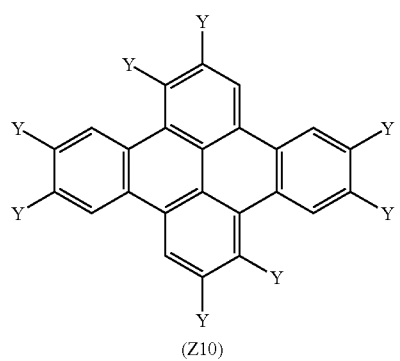
(Z10)
-continued
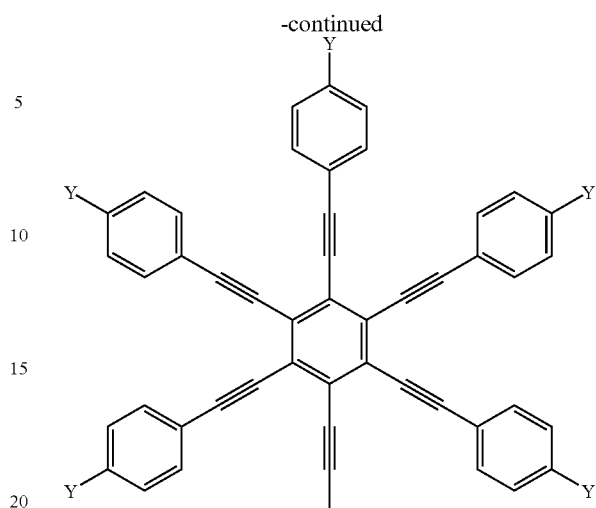
(Z11)
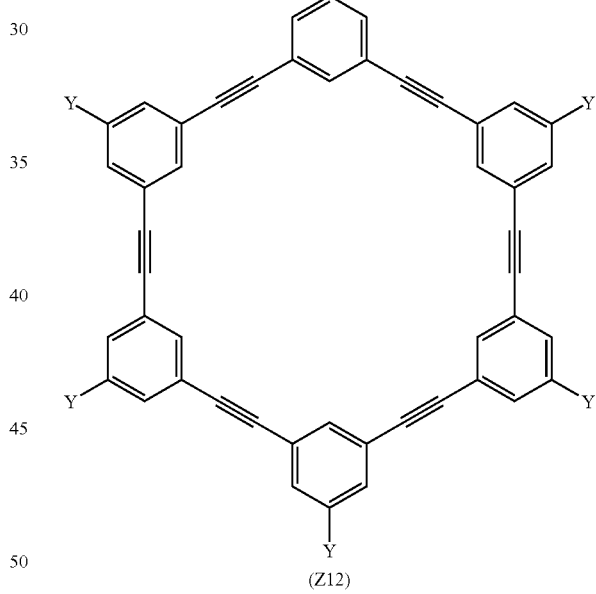
(Z12)
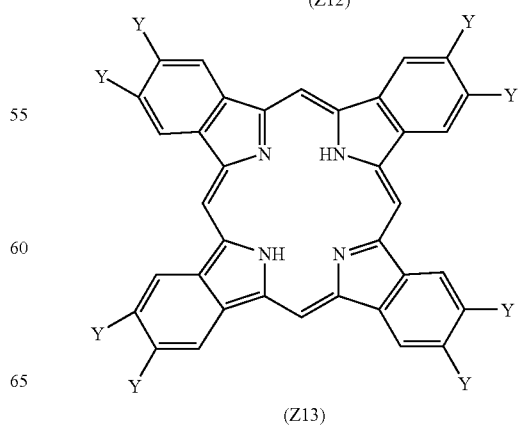
(Z13)

-continued

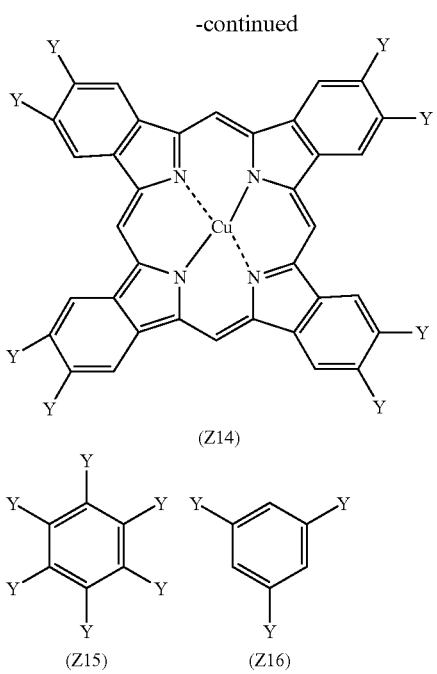

Especially, triphenylene (Z4) is preferable as a discotic core (D).

The discotic core (D) may have at least one substituent other than Y (the formula (VI)). Examples of the substituent that the discotic core may have include halogen atoms (e.g. fluorine, chlorine, bromine and iodine atoms), cyano, hydroxy, amino, carbamoyl, sulfamoyl, mercapto, ureido, alkyl group, substituted alkyl group, alkenyl group, substituted alkenyl group, alkynyl group, substituted alkynyl group, aryl group, substituted aryl group, heterocyclic group, alkoxy group, substituted alkoxy group, aryloxy group, substituted aryloxy group, acyl group, acyloxy group, alkoxycarbonyl group, substituted alkoxycarbonyl group, aryloxycarbonyl group, substituted aryloxycarbonyl group, substituted amino group, amide group, imido group, alkoxycarbonylamino group, substituted alkoxycarbonylamino group, aryloxycarbonylamino group, substituted aryloxycarbonylamino group, substituted carbamoyl group, sulfonamide group, substituted sulfamoyl group, alkylthio group, substituted alkylthio group, arylthio group, substituted arylthio group, alkylsulfonyl group, substituted alkylsulfonyl group, arylsulfonyl group, substituted arylsulfonyl group, alkylsulfinyl group, substituted alkylsulfinyl group, arylsulfinyl group, substituted arylsulfinyl group, substituted ureido group, phosphoric acid amide group, substituted silyl group, alkoxycarbonyloxy group, substituted alkoxycarbonyl group, aryloxycarbonyloxy group and aryloxycarbonyloxy group.

The alkyl group may have a cyclic or branched structure. The number of carbon atoms in the alkyl group preferably ranges from 1 to 30. The alkyl moiety in the substituted alkyl group is defined equally to the alkyl group; and its preferred examples are also same as those of the alkyl group. Examples of the substituent of the substituted alkyl group include those exemplified above as a substituent of the discotic core, except an alkyl group, a substituted alkyl group, an alkenyl group, a substituted alkenyl group, an alkynyl group and a substituted alkynyl group; and its preferred examples are also same as those of the substituent for the discotic core.

The alkenyl group may have a cyclic or branched structure. The number of carbon atoms in the alkenyl group preferably ranges from 2 to 30. The alkenyl moiety in the substituted alkenyl group is defined equally to the alkenyl group. Examples of the substituent of the substituted alkenyl group are same as those of the substituent for the substituted alkyl group. The alkynyl group may have a cyclic or branched structure. The number of carbon atoms in the alkynyl group preferably ranges from 2 to 30. The alkynyl moiety in the substituted alkynyl group is defined equally to the alkynyl group. Examples of the substituent of the substituted alkynyl group are same as those of the substituent for the substituted alkynyl group.

The number of carbon atoms in the aryl group preferably ranged from 6 to 30. The aryl moiety in the substituted aryl group is defined equally to the aryl group; and its preferred examples are same as those of the aryl group. Examples of the substituent of the substituted aryl group include those exemplified above as a substituent of the discotic core; and its preferred examples are also same as those of the substituent for the discotic core.

The heterocyclic group is preferably selected from 5- or 6-membered heterocyclic groups. The hetero ring may be condensed with another hetero ring, aliphatic ring or aromatic ring. The hetero atom(s) embedded in the hetero ring is preferably selected from nitrogen, oxygen and sulfur atoms. The heterocyclic group may have at least one substituent. Examples of the substituent are same as those exemplified as a substituent for the discotic core; and its preferred examples are same as those of the substituent for the discotic core.

The alkyl moiety in the alkoxy group or the substituted alkoxy group is defined equally to the alkyl group; and its preferred examples are same as those of the alkyl group. Examples of the substituent of the substituted alkoxy group are same as those exemplified above as a substituent for the alkyl group; and its preferred examples are same as those of the substituent for the alkyl group. The aryl moiety in the aryloxy group or the substituted aryloxy group is defined equally to the aryl group; and its preferred examples are same as those of the aryl group. Examples of the substituent of the substituted aryloxy group include those exemplified above as a substituent of the discotic core; and its preferred examples are same as those of the substituent for the discotic core.

The acyl group is formyl or the group represented by —CO—R where R represents an alkyl group, substituted alkyl group, alkenyl group, substituted alkenyl group, alkynyl group, substituted alkynyl group, aryl group or substituted aryl group.

The acyloxy group is formyloxy or the group represented by —O—CO—R, where R represents an alkyl group, substituted alkyl group, alkenyl group, substituted alkenyl group, alkynyl group, substituted alkynyl group, aryl group or substituted aryl group.

The alkyl moiety in the alkoxycarbonyl group or the substituted alkoxycarbonyl group is defined equally to the alkyl group. Examples of the substituent of the substituted alkoxycarbonyl group include those exemplified as a substituent of the substituted alkyl group; and its preferred examples are same as those of the substituent for the substituted alkyl group.

The aryl moiety in the aryloxycarbonyl group or the substituted aryloxycarbonyl group is defined equally to the aryl group; and its preferred examples are same as those of the aryl group. Examples of the substituent of the substituted aryloxycarbonyl group include those exemplified as a substituent of the discotic core; and its preferred examples are same as those of the substituent for the discotic core.

The substituted amino group is represented by —NH—R or —N(—R)$_2$, where R represents an alkyl group, substituted alkyl group, alkenyl group, substituted alkenyl group, alkynyl group, substituted alkynyl group, aryl group or substituted aryl group.

The amide group is represented by —NH—CO—R, where R represents an alkyl group, substituted alkyl group, alkenyl group, substituted alkenyl group, alkynyl group, substituted alkynyl group, aryl group or substituted aryl group.

The imido group is represented by —N(—CO—R)$_2$, where R represents an alkyl group, substituted alkyl group, alkenyl group, substituted alkenyl group, alkynyl group, substituted alkynyl group, aryl group or substituted aryl group.

The alkyl moiety in the alkoxycarbonylamino group or the substituted alkoxycarbonylamino group is defined equally to the alkyl group; and its preferred examples are same as those of the alkyl group. Examples of the substituent of the substituted alkoxycarbonylamino group include those exemplified above as a substituent of the substituted alkyl group.

The aryl moiety in the aryloxycarbonylamino group or the substituted aryloxycarbonylamino group is defined equally to the aryl group; and its preferred examples are same as those of the aryl group. Examples of the substituted aryloxycarbonylamino group include those exemplified above as a substituent for the discotic core.

The substituted carbamoyl group is represented by —CO—NH—R or —CO—N(—R)$_2$, where R represents an alkyl group, substituted alkyl group, alkenyl group, substituted alkenyl group, alkynyl group, substituted alkynyl group, aryl group or substituted aryl group.

The sulfonamide group is represented by —NH—SO$_2$—R, where R represents an alkyl group, substituted alkyl group, alkenyl group, substituted alkenyl group, alkynyl group, substituted alkynyl group, aryl group or substituted aryl group.

The substituted sulfamoyl group is represented by —SO$_2$—NH—R or —SO$_2$—N(—R)$_2$, where R represents an alkyl group, substituted alkyl group, alkenyl group, substituted alkenyl group, alkynyl group, substituted alkynyl group, aryl group or substituted aryl group.

The alkyl moiety in the alkylthio group or the substituted alkylthio group is defined equally to the alkyl group. Examples of the substituent of the substituted alkylthio group include those exemplified above as a substituent of the substituted alkyl group.

The aryl moiety in the arylthio group or the substituted arylthio group is defined equally to the aryl group; and its preferred examples are same as those of the aryl group. Examples of the substituent of the substituted arylthio group include those exemplified above as a substituent for the discotic core.

The alkyl moiety in the alkylsulfonyl group or the substituted alkylsulfonyl group is defined equally to the alkyl group; and its preferred examples are same as those of the alkyl group. Examples of the substituent of the substituted alkylsulfonyl group include those exemplified above as a substituent of the substituted alkyl group.

The aryl moiety in the arylsulfonyl group or the substituted arylsulfonyl group is defined equally to the aryl group; and its preferred examples are same as those of the aryl group. Examples of the substituent of the substituted arylsulfonyl group include those exemplified above as a substituent for the discotic core; and its preferred examples are same as those of the substituent for the discotic core.

The alkyl moiety in the alkylsulfinyl group or the substituted alkylsulfinyl group is defined equally to the alkyl group; and its preferred examples are same as those of the alkyl group. Examples of the substituent of the substituted alkylsulfinyl group include those exemplified above as a substituent of the substituted alkyl group; and its preferred examples are same as those of the substituent of the substituted alkyl group.

The aryl moiety of the arylsulfinyl group or the substituted aryl sulfinyl group is defined equally to the aryl group. Examples of the substituted alkylsulfinyl group include those exemplified above as a substituent for the discotic core; and its preferred examples are same as those of the substituent for the discotic core.

The substituted ureido group is represented by —NH—CO—NH—R or —NH—CO—N(—R)$_2$, where R represents an alkyl group, substituted alkyl group, alkenyl group, substituted alkenyl group, alkynyl group, substituted alkynyl group, aryl group or substituted aryl group.

The phosphoric acid amide group is represented by —NH—O—P(=O) (—OH)—O—R or —NH—OP(=O) (—O—R)$_2$, where R represents an alkyl group, substituted alkyl group, alkenyl group, substituted alkenyl group, alkynyl group, substituted alkynyl group, aryl group or substituted aryl group.

The substituted silyl group is represented by —SiH$_2$—R, —SiH(—R)$_2$ or —Si(—R)$_3$, where R represents an alkyl group, substituted alkyl group, alkenyl group, substituted alkenyl group, alkynyl group, substituted alkynyl group, aryl group or substituted aryl group.

The alkyl moiety in the alkoxycarbonyloxy group or the substituted alkoxycarbonyloxy group is defined equally to the alkyl group. Examples of the substituted alkoxy carbonyloxy group include those exemplified as a substituent of the substituted alkyl group; and its preferred examples are same as those of the substituent of the substituted alkyl group.

The aryl moiety in the aryloxycarbonyloxy group or the substituted aryloxycarbonyloxy group is defined equally to the aryl group; and its preferred examples are same as those of the aryl group. Examples of the substituent of the substitute aryloxycarbonyloxy group include those exemplified as a substituent for the discotic core; and its preferred examples are same as those of the substituent for the discotic core.

In the Formula (I), n1 is an integer from 3 to 20, is preferably from 3 to 15, more preferably from 3 to 12, much more preferably from 3 to 10, further much more preferably from 4 to 8, and most preferably 6.

In the Formula (I), $R^1$, $R^2$, $R^3$, $R^4$ and $R^5$ is a hydrogen atom or a substituent, and examples of the substituent include exemplified above as a substituent for the discotic core. Any two of $R^1$, $R^2$, $R^3$, $R^4$ and $R^5$ may bind to each other to form a ring such as an aliphatic or aromatic ring. Preferably, $R^1$, $R^2$, $R^3$ and $R^5$ respectively represent a hydrogen atom, a substituted or non-substituted alkyl group, cyano, a substituted or non-substituted alkoxycarbonyl, or a halogen atom.

There are cis and trans relations between a carbonyloxy group and $R^2$ or $R^3$, or a carbonyloxy group and $R^4$ or $R^5$. In the cis relation, the substituent takes a direction equal to the carbonyloxy group with respect to a cyclopropane plane; and in the trans relation, the substituent takes a direction equal to the carbonyloxy group with respect to a cyclopropane plane. And there is no limitation on the relation as long as it is not specified.

In a certain combination of $R^1$, $R^2$, $R^3$, $R^4$ and $R^5$, there are stereoisomers such as enantiomers and diastereomers of the compound represented by the formula (I); and there is no limitation on the stereoisomars as long as it is not specified.

The discotic compound represented by the formula (I) is preferably selected from the formula (II).

[Formula 12]

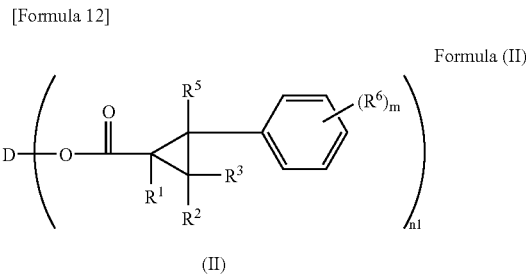

(II)

In the formula (II), D represents a discotic core. In the formula, n1 is an integer from 3 to 20. $R^1$, $R^2$, $R^3$ and $R^5$ represent a hydrogen atom or a substituent, or bind to each other to form a ring. In the formula, m is an integer from 1 to 5. $R^6$ represents a substituent, and if there is a plurality of $R^6$, they may be same or different each other, or bind to each other to form a ring.

In the formula (II), D, n1, $R^1$, $R^2$, $R^3$ and $R^5$ are defined equally to D, n1, $R^1$, $R^2$, $R^3$ and $R^5$ in the formula (I); and their preferred examples are defined equally as well.

In the formula (II), $R^6$ represents a substituent, and examples of the substituent include those exemplified above as a substituent for the discotic core. Preferred examples of $R^6$ include a halogen atom, substituted or non-substituted alkyl group, substituted or non-substituted alkoxy group, substituted or non-substituted alkoxycarbonyl, substituted or non-substituted aryl group, substituted or non-substituted aryloxy group, substituted or non-substituted alkoxycarbonyloxy group, substitute or non-substituted aryloxycarbonyloxy group, and substituted or non-substituted acyloxy group. It is more preferred that at least one of $R^6$ represents a substituted alkyl group, substituted alkoxy group, substituted alkoxycarbonyl group, substituted aryl group, substituted aryloxy group, substituted alkoxycarbonyloxy group, substituted aryloxycarbonyl group or substituted acyloxy group, which has at least one polymerizable group at the terminal position.

In the Formula (II), there is no limitation on the substituted position with $R^6$ as long as there is not specified. It is preferable that at least one $R^6$ is the para position. There are cis and trans relations between a carbonyloxy group and $R^5$. And there is no limitation on the relation as long as it is not specified. The cis relation is preferred.

The discotic compound of the invention, for example, the compound represented by the formula (I), may have a polymerizable group(s). The discotic compound having a polymerizable group, polymerizable discotic compound, can be fixed by polymerization in the state in which disk planes of their molecules are aligned.

If the compound represented by the formula is polymerizable, it is preferred that $R^4$ is a substituted alkyl group, substituted alkoxy group, substituted aryl group or substituted aryloxy group, each of which has a polymerizable group at the terminal position.

The polymerizable discotic compound is preferably represented by the formula (III).

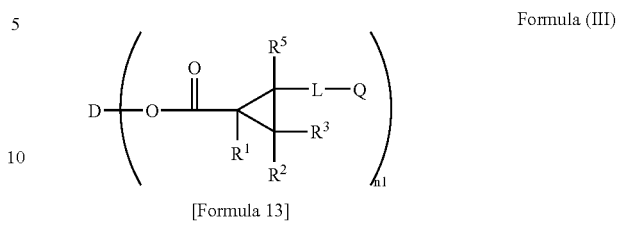

[Formula 13]

In the formula (III), D is a discotic core; n1 is an integer from 3 to 20; and $R^1$, $R^2$, $R^3$ and $R^5$ respectively represent a hydrogen atom or a substituent, or may bind to each other to form a ring.

In the formula (III), D, n1, $R^1$, $R^2$, $R^3$ and $R^5$ are defined equally to D, n1, $R^1$, $R^2$, $R^3$ and $R^5$ in the formula (I); and their preferred examples are defined equally as well.

In the formula (III), L represents a divalent linking group selected from the group consisting of an oxygen atom, a sulfur atom, a carbonyl group, a substitute or non-substituted alkylene group, a substituted or non-substituted arylene group, and any combinations thereof.

The alkylene group may have a cyclic or branched structure. The number of carbon atoms in the alkylene group preferably ranged from 1 to 30.

The alkylene moiety of the substituted alkylene group is defined equally to the alkylene group. Examples of the substituent of the substituted alkylene group include those exemplified above as a substituent from the discotic core regarding the formula (I), except an alkyl, substituted alkyl, alkenyl, substituted alkenyl, alkynyl and alkynyl groups.

The number of carbon atoms in the arylene group preferably ranges from 1 to 30. As the arylene group, phenylene and naphthylene are preferred, phenylene is more preferred, and p-phenylene is most preferred.

The arylene moiety in the substituted arylene group is defined equally to the arylene group. Examples of the substituent of the substituted arylene group include those exemplified above as a substituent for the discotic core regarding the formula (I).

In the formula (III), Q represents a polymerizable group. The polymerizable group is preferably an epoxy or ethylene unsaturated group, and most preferably an ethylene unsaturated group such as vinyl, 1-propenyl and isopropenyl.

According to the invention, especially preferred examples of the discotic compound are triphenylene compounds represented by the formula (IV).

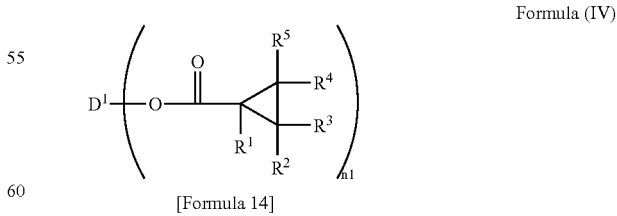

[Formula 14]

In the formula (IV), $D^1$ represents a triphenylene; n1 is an integer from 3 to 6; $R^1$, $R^2$, $R^3$, $R^4$ and $R^5$ respectively represent a hydrogen atom, a substituted or non-substituted $C_{1-20}$ alkyl group, a substituted or non-substituted $C_{3-20}$ alkenyl group, a substituted or non-substituted $C_{1-20}$ alkoxy group, a substituted or non-substituted $C_{3-20}$ alkenyloxy group, a substituted or non-substituted $C_{6-20}$ aryl group, or a substituted or non-substituted $C_{1-20}$ aryloxy group, a substituted or non-substituted $C_{1-20}$ alkoxycarbonyl group. The definition and examples of each group are defined equally to those in the formula (I), and preferred examples of each group are defined equally to those in the formula (I).

In the formula (IV), preferably, $R^1$, $R^2$, $R^3$ and $R^5$ respectively represent a hydrogen atom, methyl, ethyl, methyloxy, ethyloxy, cyano, halogen atom or substituted or non-substituted alkoxycarbonyl group.

In the formula (IV), preferably, $R^4$ represents a substituted or non-substituted $C_{6-20}$ aryl group. In the formula (IV), preferably, $R^4$ is trans position regarding the carbonyloxy group.

The triphenylene compound represented by the formula (IV) preferably has a polymerizable group(s). The triphenylene compound having a polymerizable group(s), polymerizable triphenylene compound, can be fixed by polymerization in a state in which disk planes of their molecules, tripehnylene, are aligned.

If the triphenylene compound represented by the formula (IV) has a polymerizable group(s), $R^4$ represents a substituted $C_{2-20}$ alkyl group, a substituted $C_{2-20}$ alkoxy group, a substituted $C_{6-20}$ aryl group or a substituted $C_{6-20}$ aryloxy group, each of which has a polymerizable group(s) at a terminal position.

There are stereoisomers such as enantiomers and diastereomers of the compound represented by the formula (IV), however, they are not distinguished from each other in the invention, and all stereoisomers fall in the scope. Namely, any stereoisomers are not classified by a structural description method.

Examples of the discotic compound represented by the formula (I) include those shown below. When each example is identified, it is indicated with a number (X) written alongside the example, by Example (x).

[Formula 15]

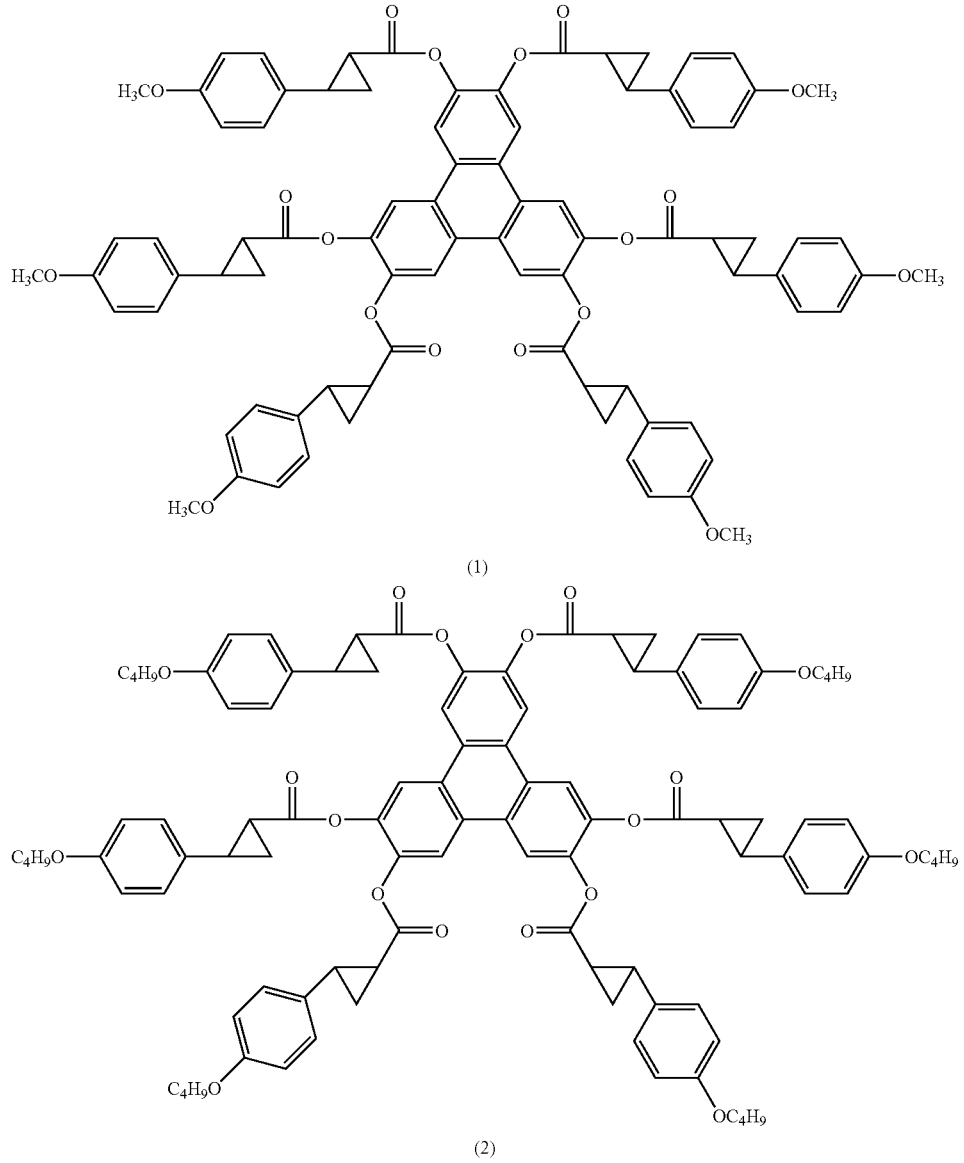

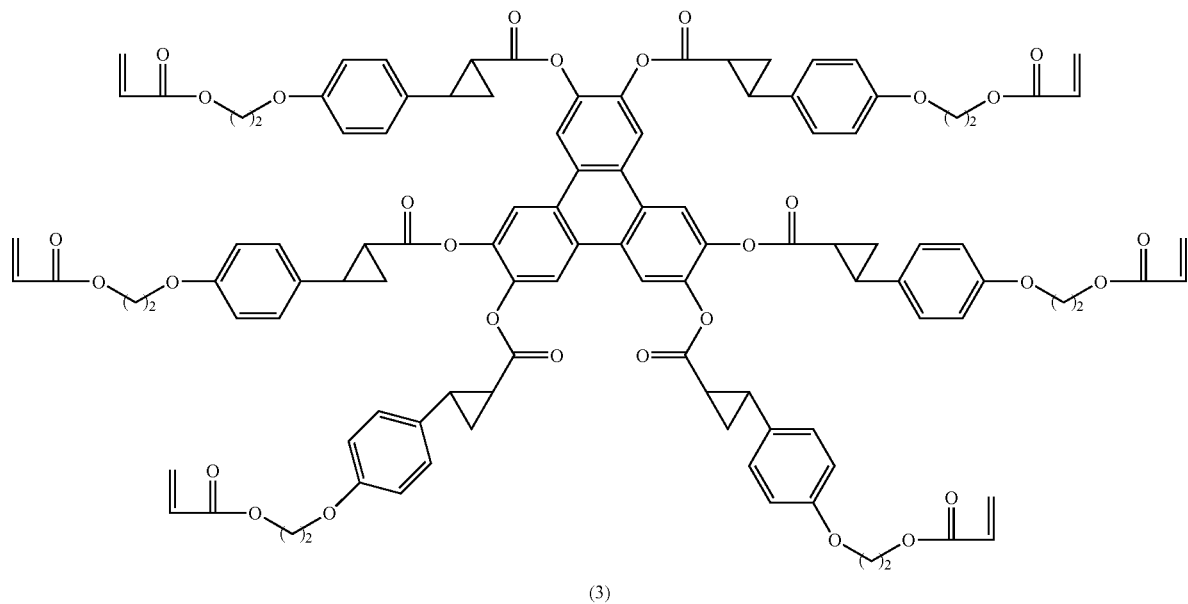
(3)
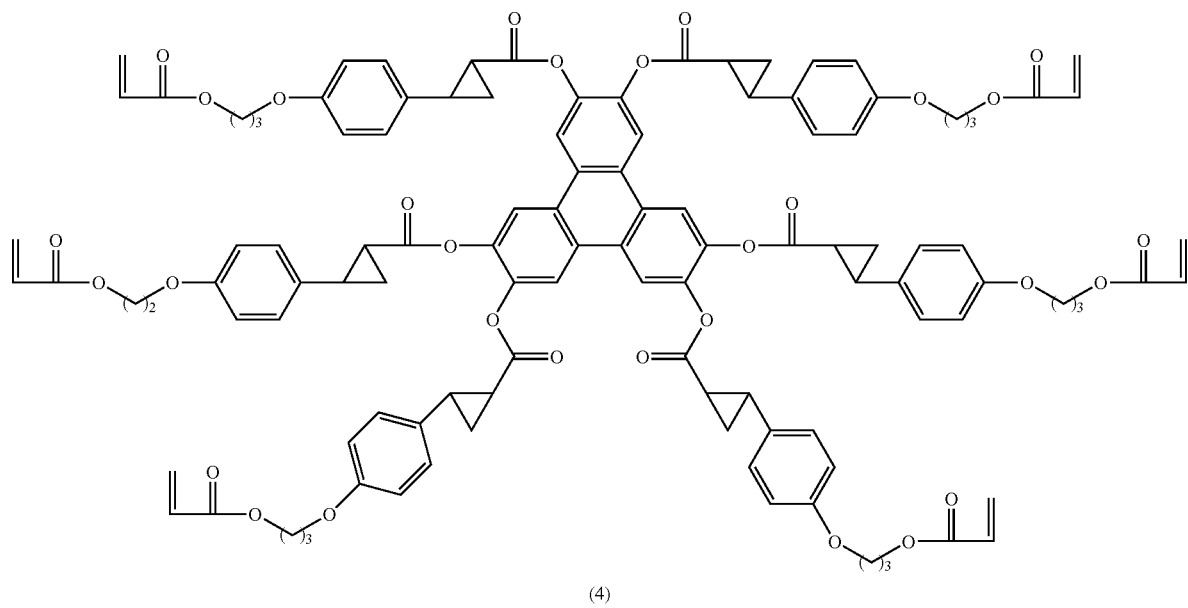
(4)

[Formula 16]
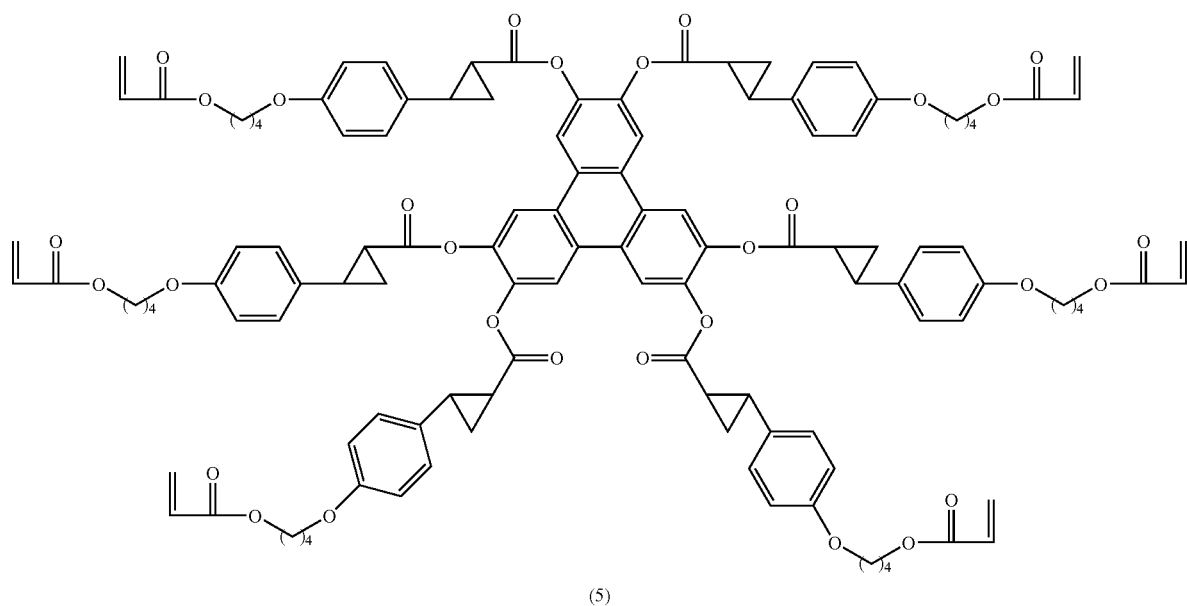
(5)
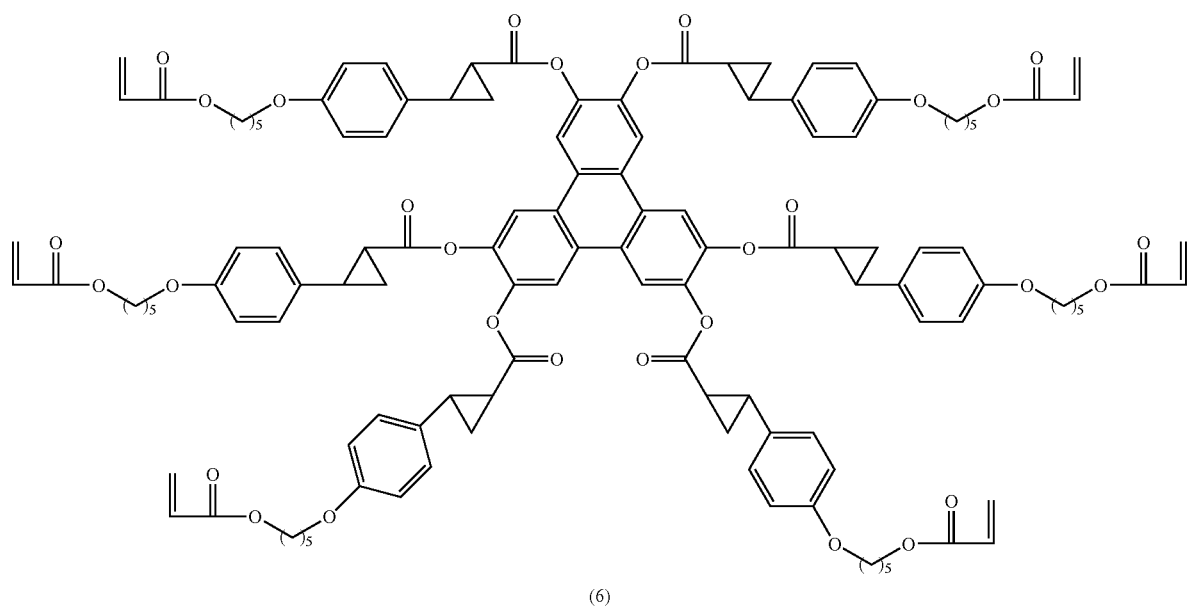
(6)

-continued
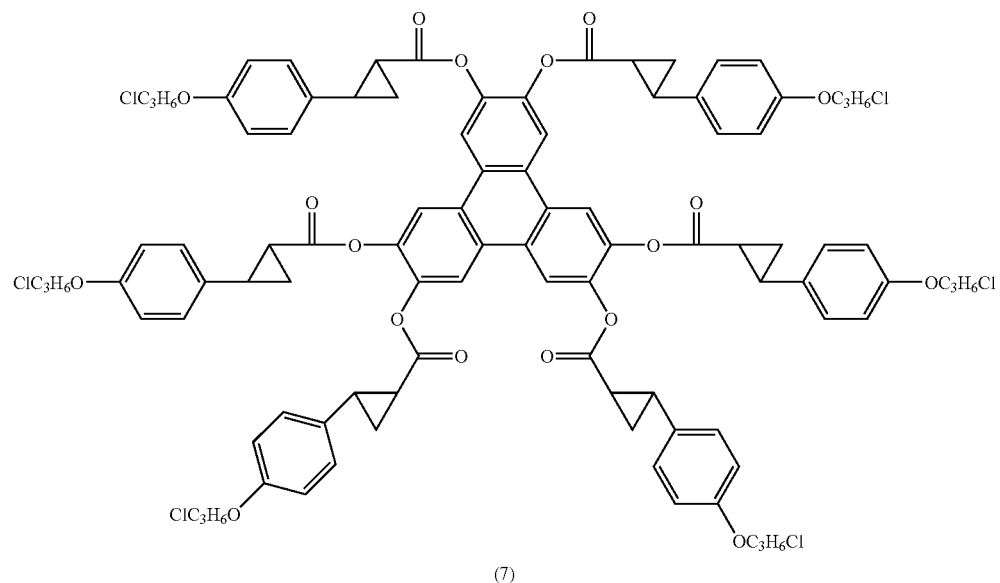
(7)
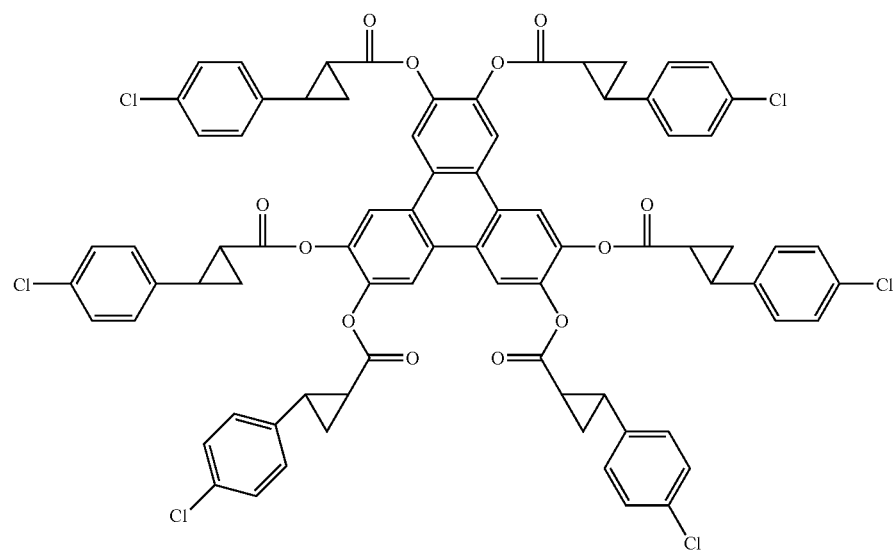
(8)

-continued
[Formula 17]
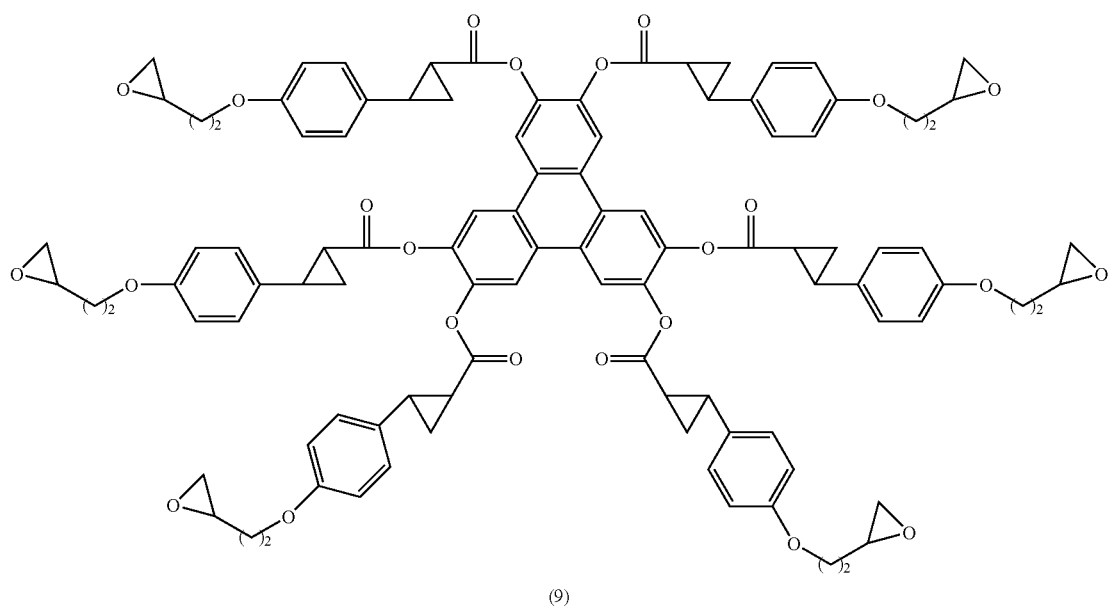
(9)
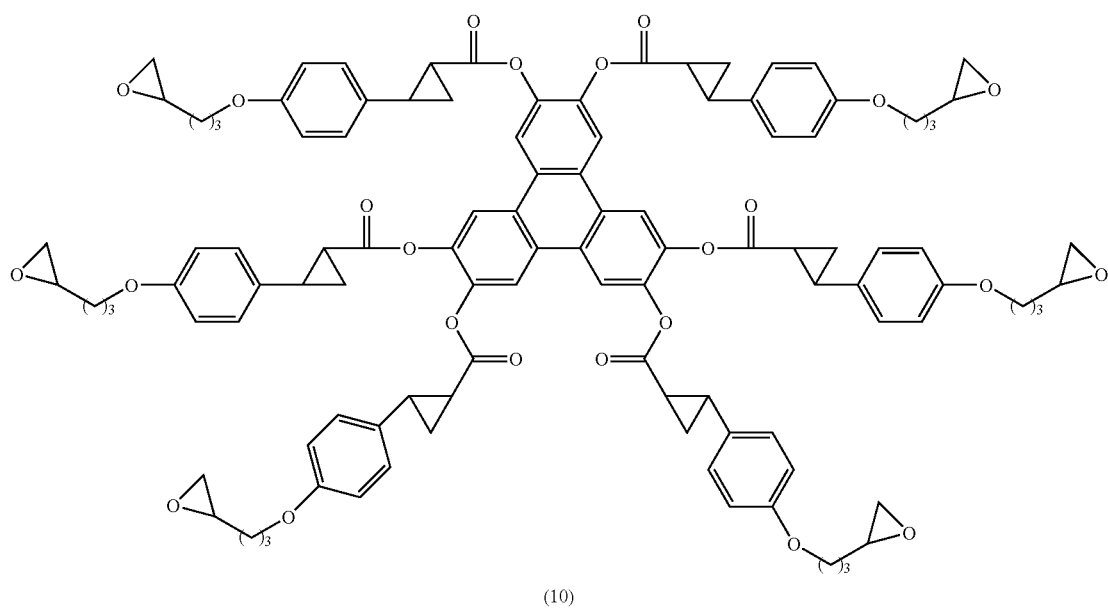
(10)

-continued
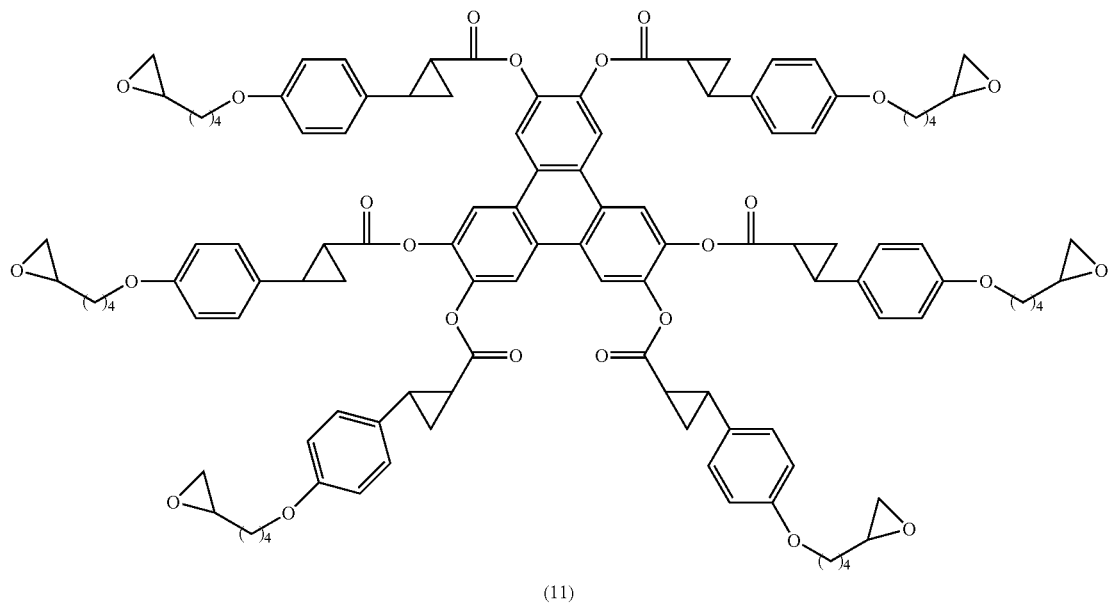
(11)
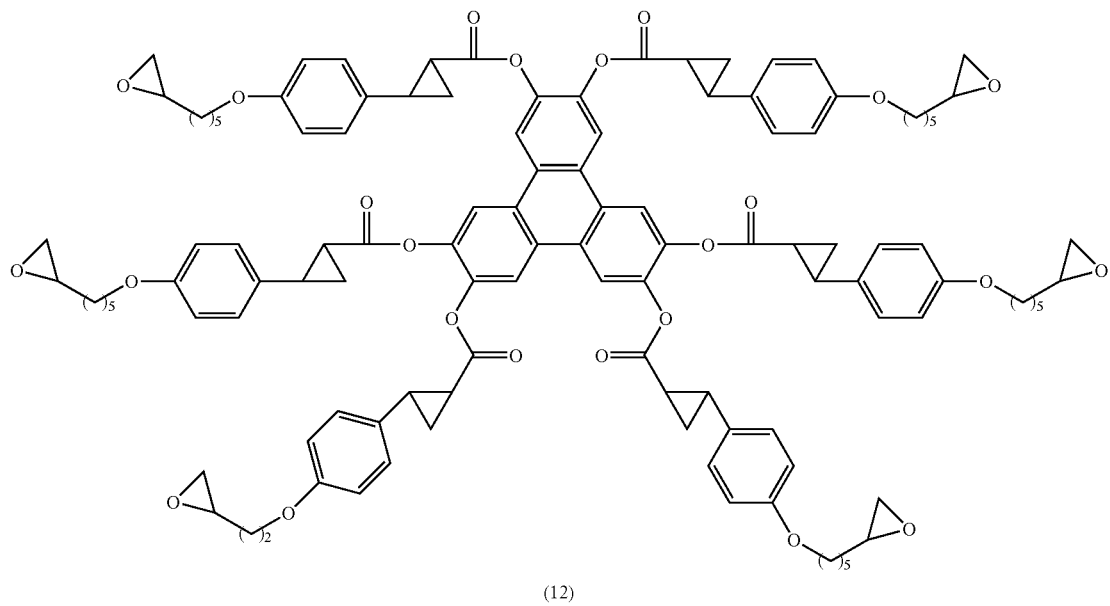
(12)

-continued
[Formula 18]
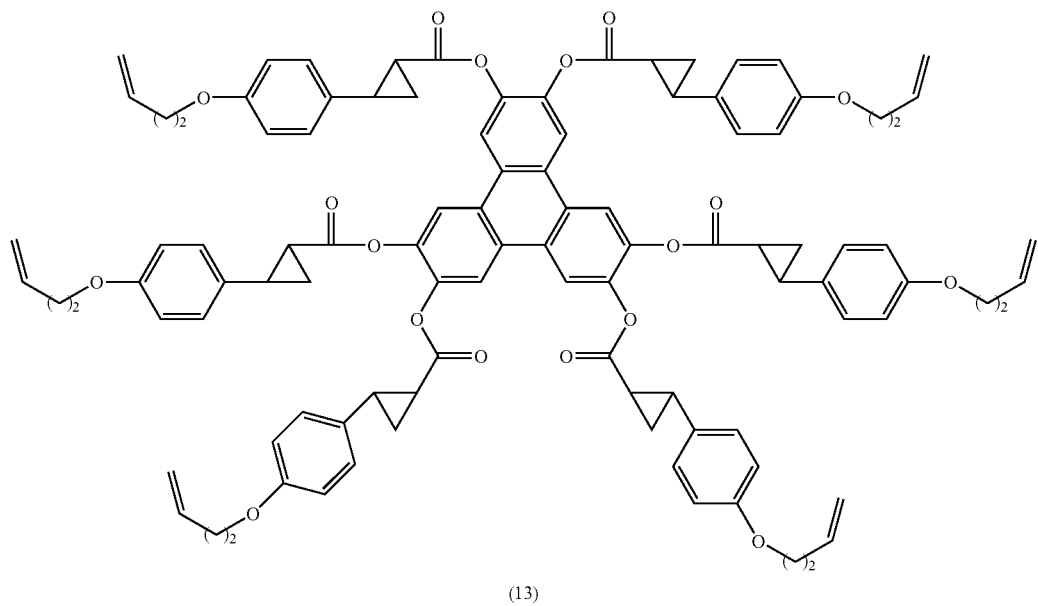
(13)
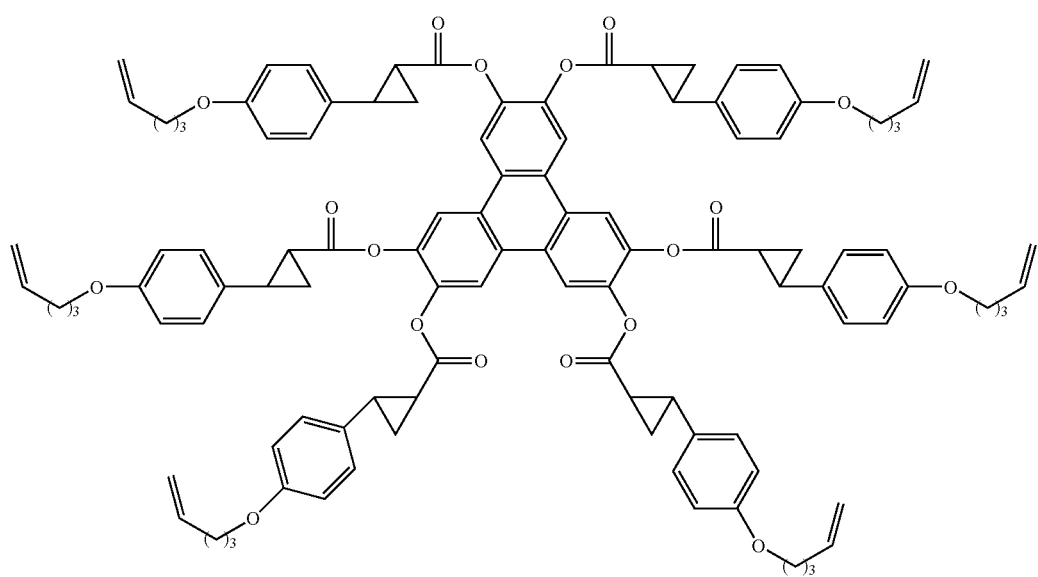
(14)

-continued
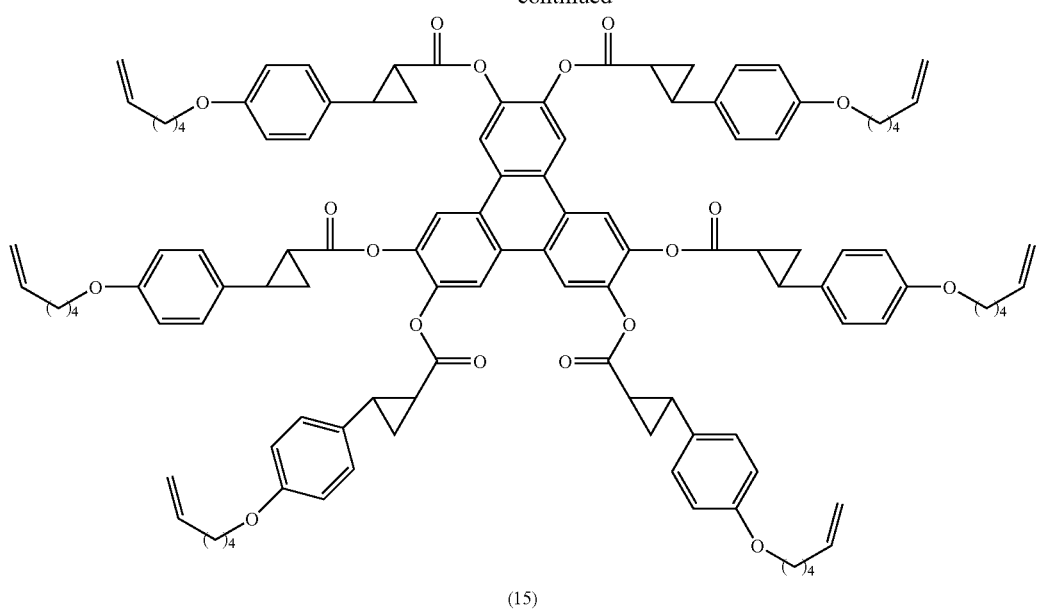
(15)
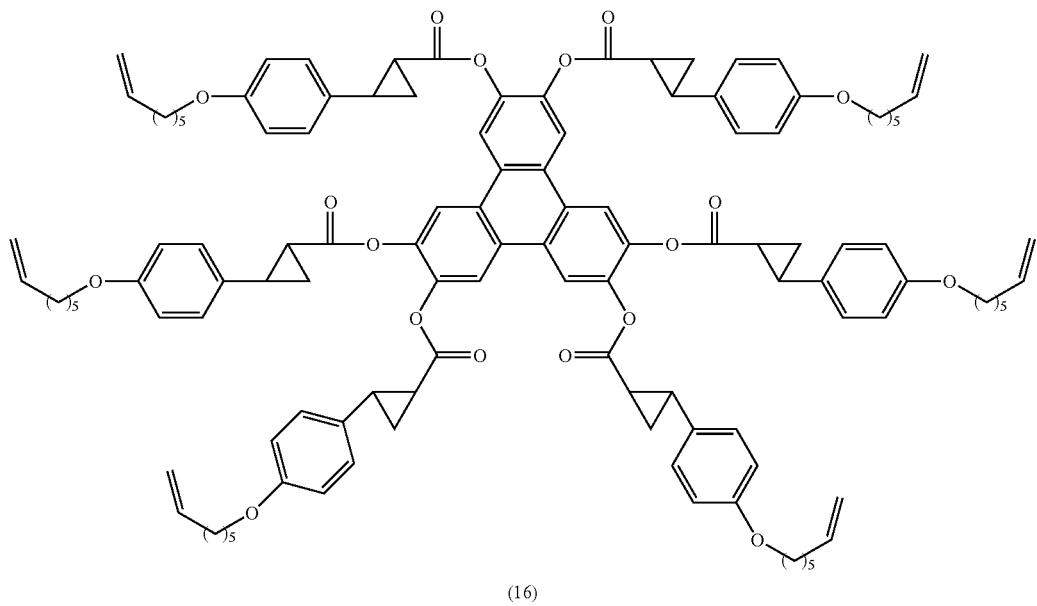
(16)

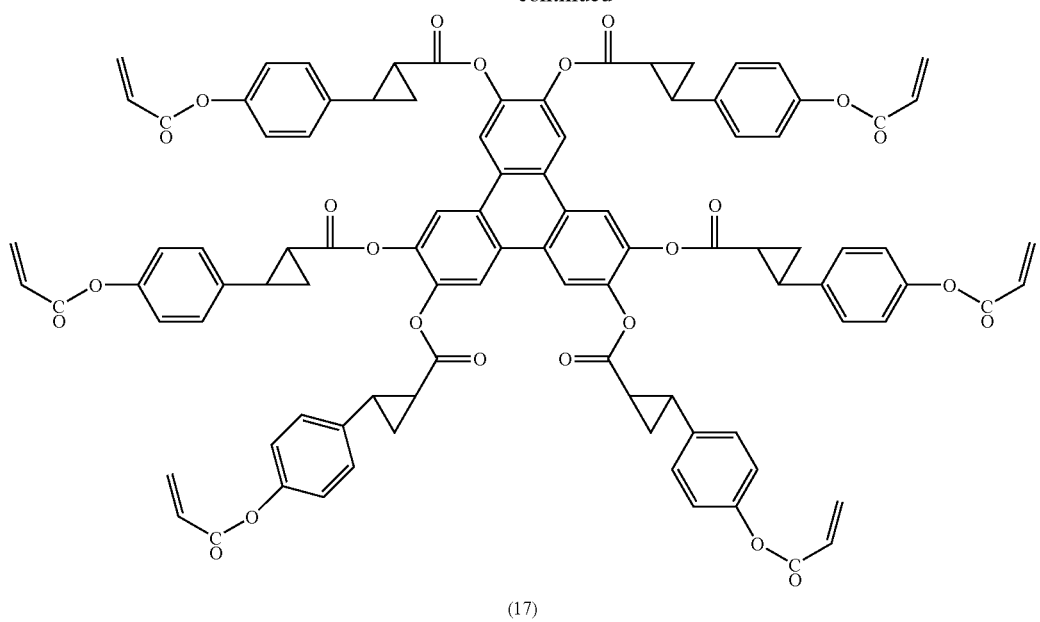
(17)
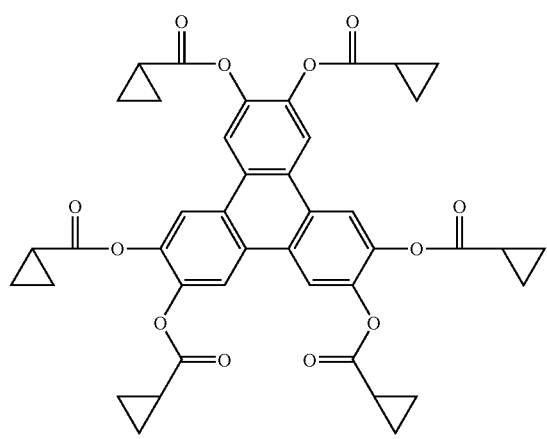
(18)
[Formula 19]
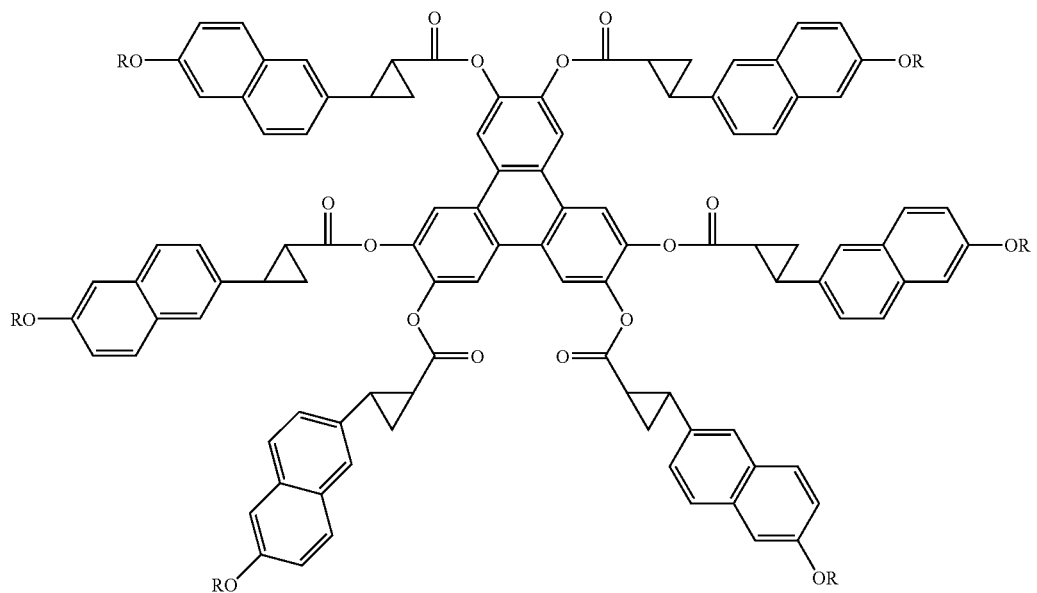

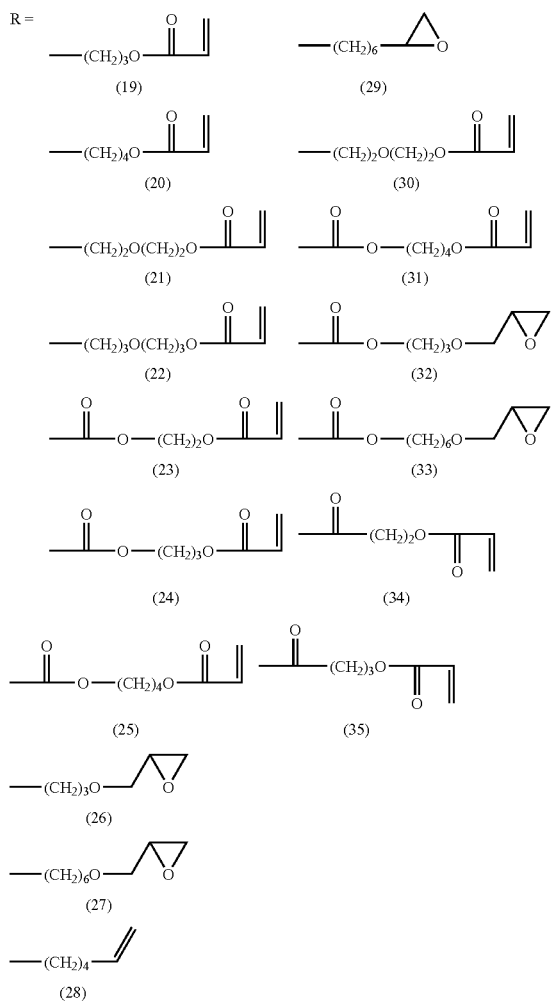
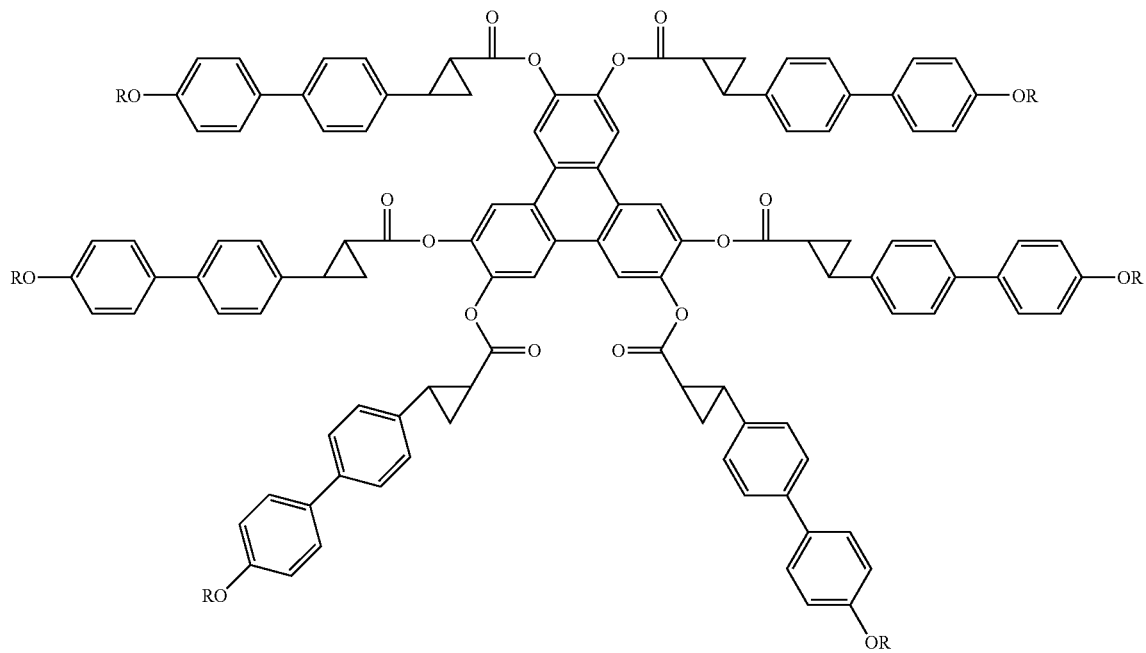

-continued
R =
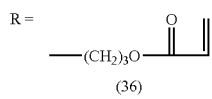
(36)
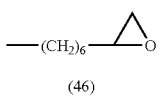
(46)
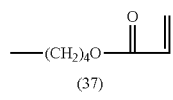
(37)
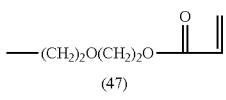
(47)
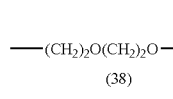
(38)
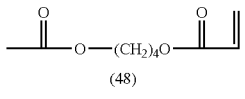
(48)
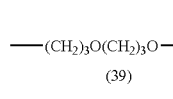
(39)
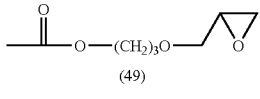
(49)
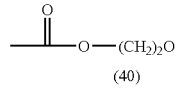
(40)
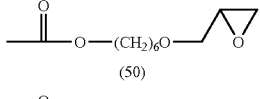
(50)
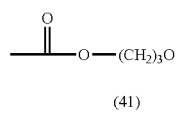
(41)
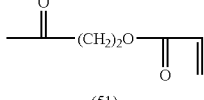
(51)
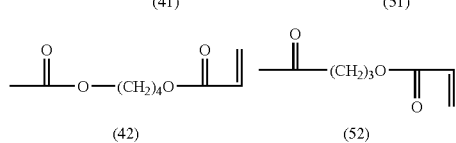
(42) (52)
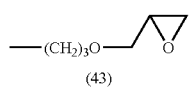
(43)
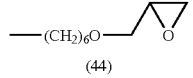
(44)
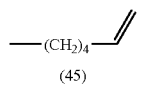
(45)
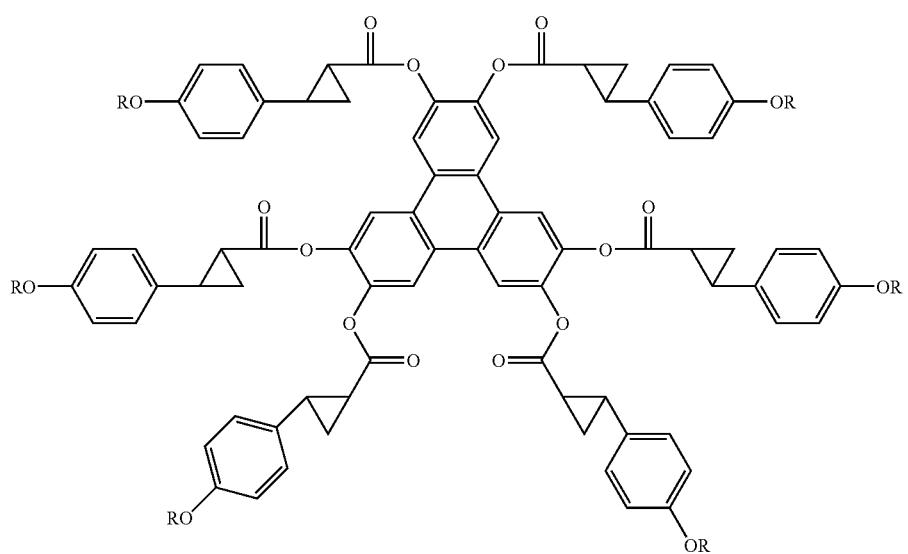

R =
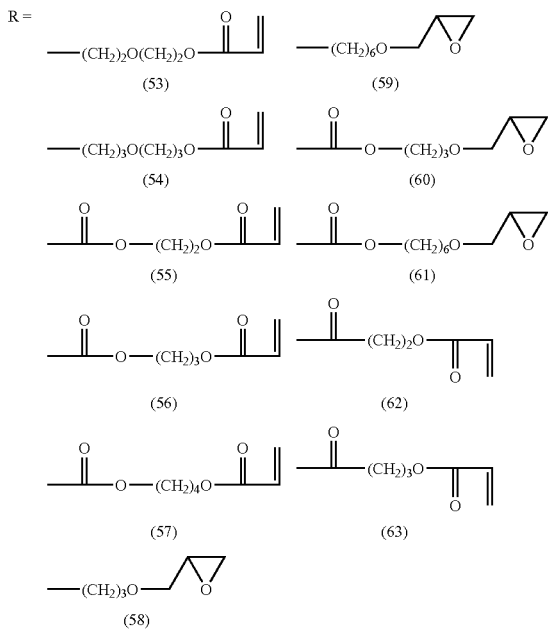
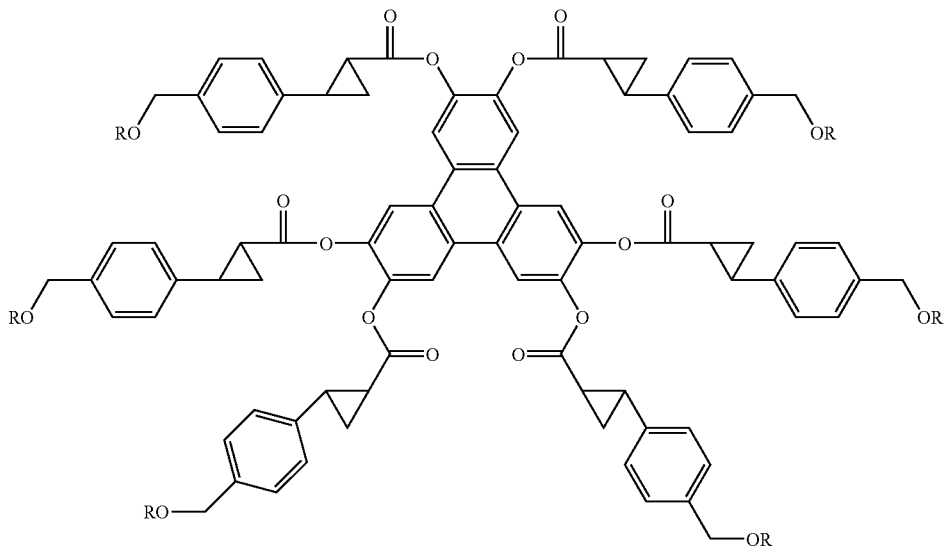
R =
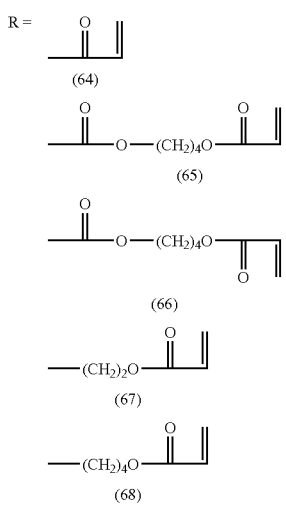

-continued
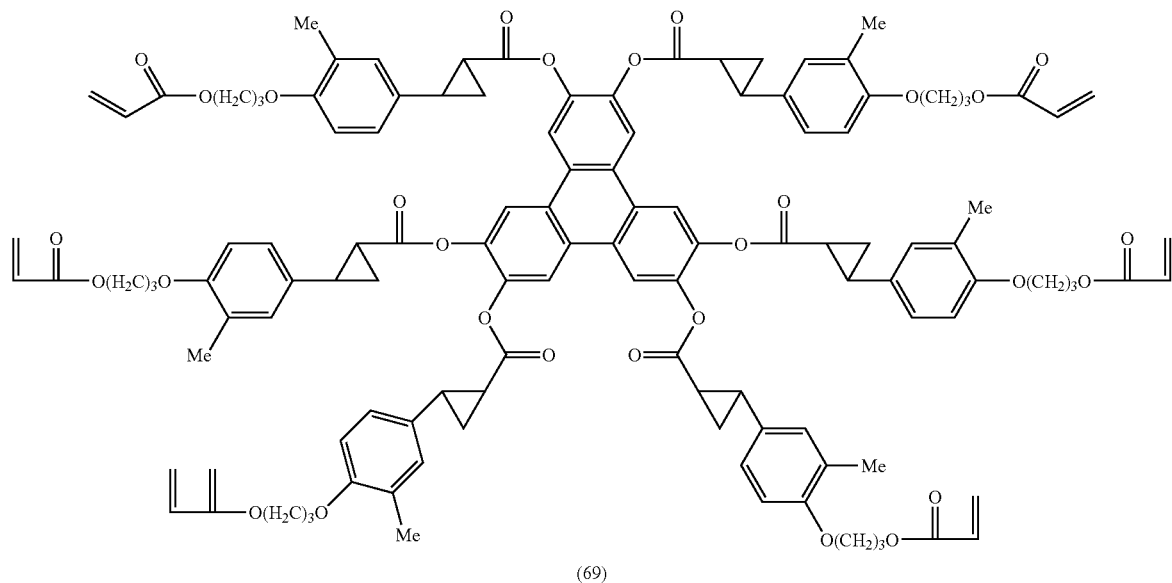
(69)
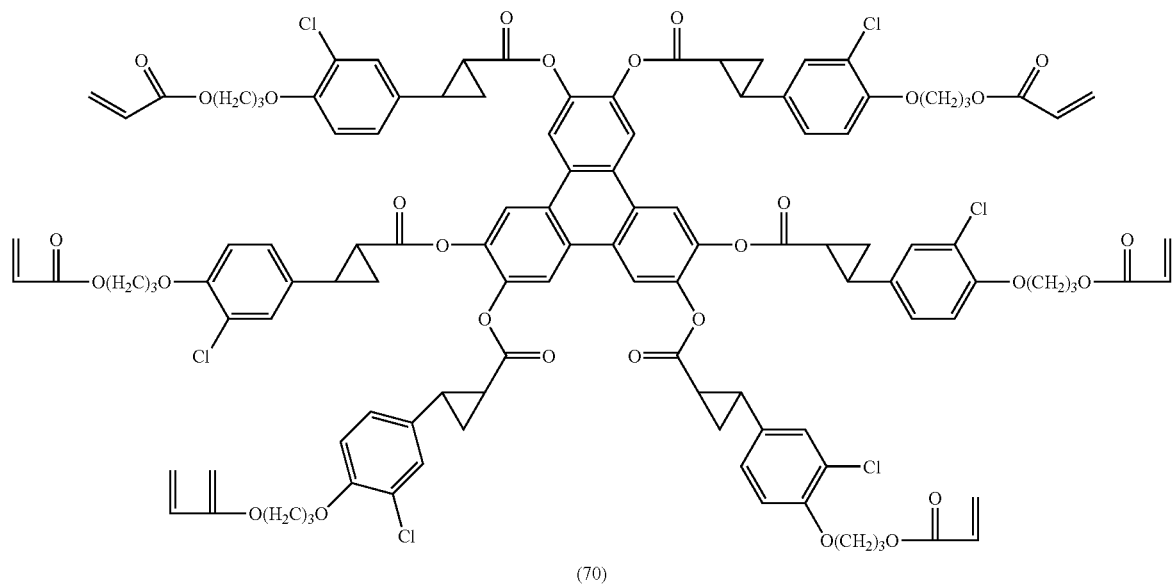
(70)

-continued
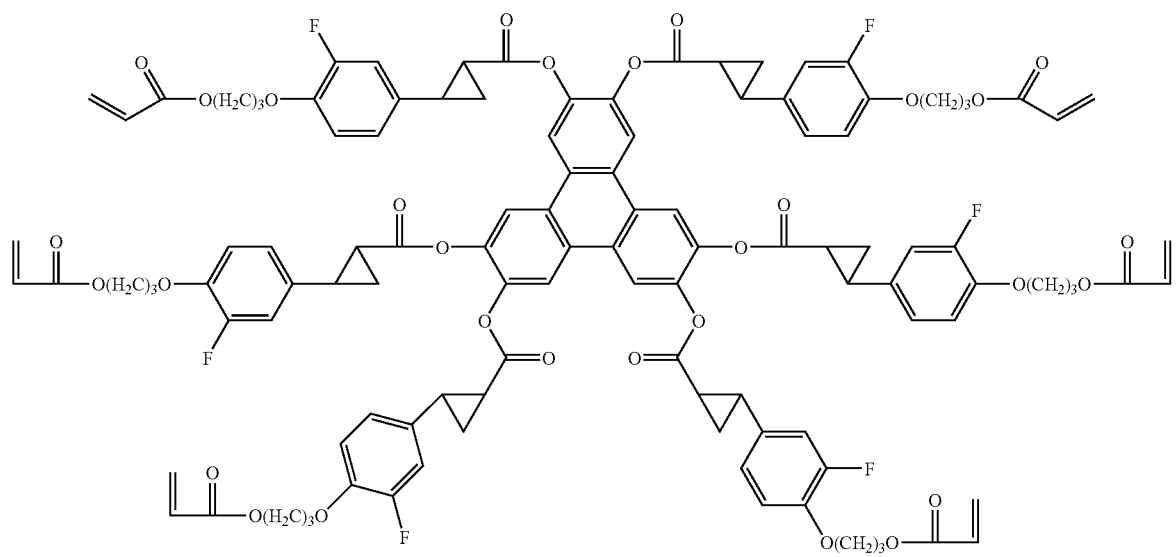
(71)
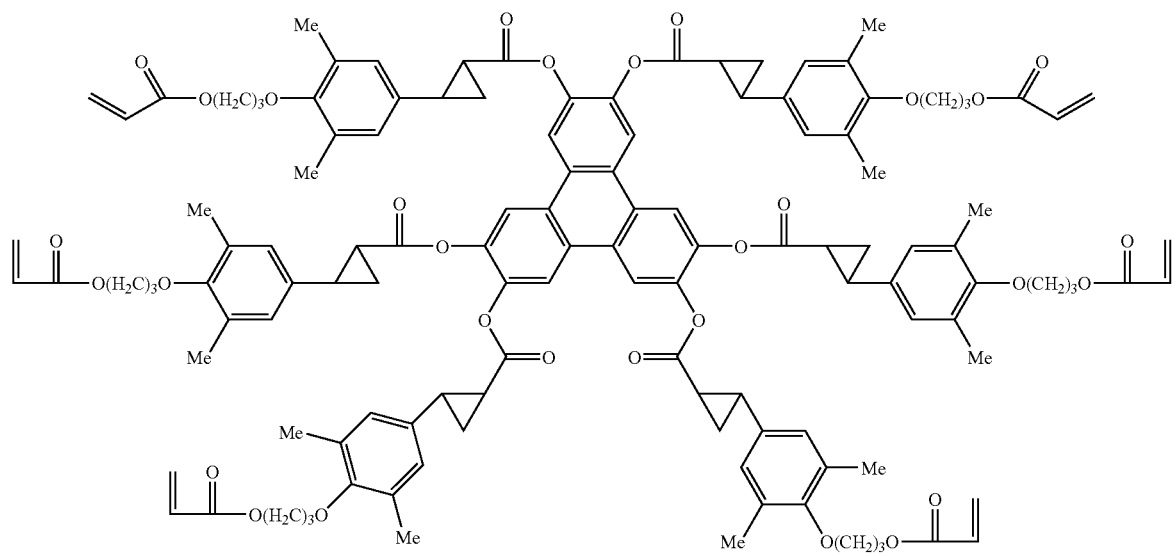
(72)

-continued
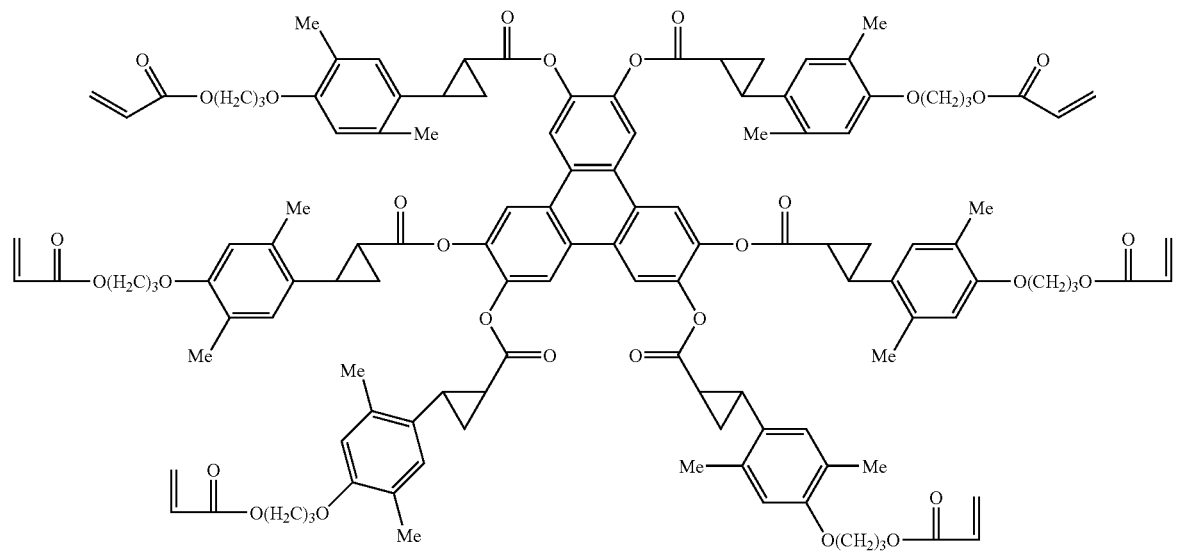
(73)
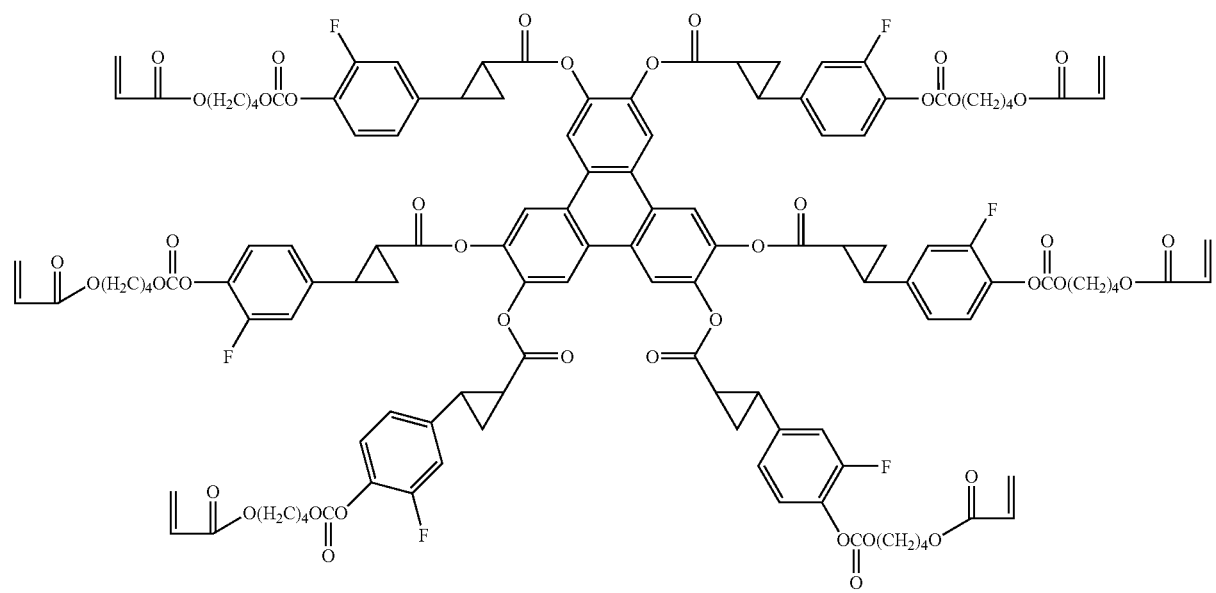
(74)

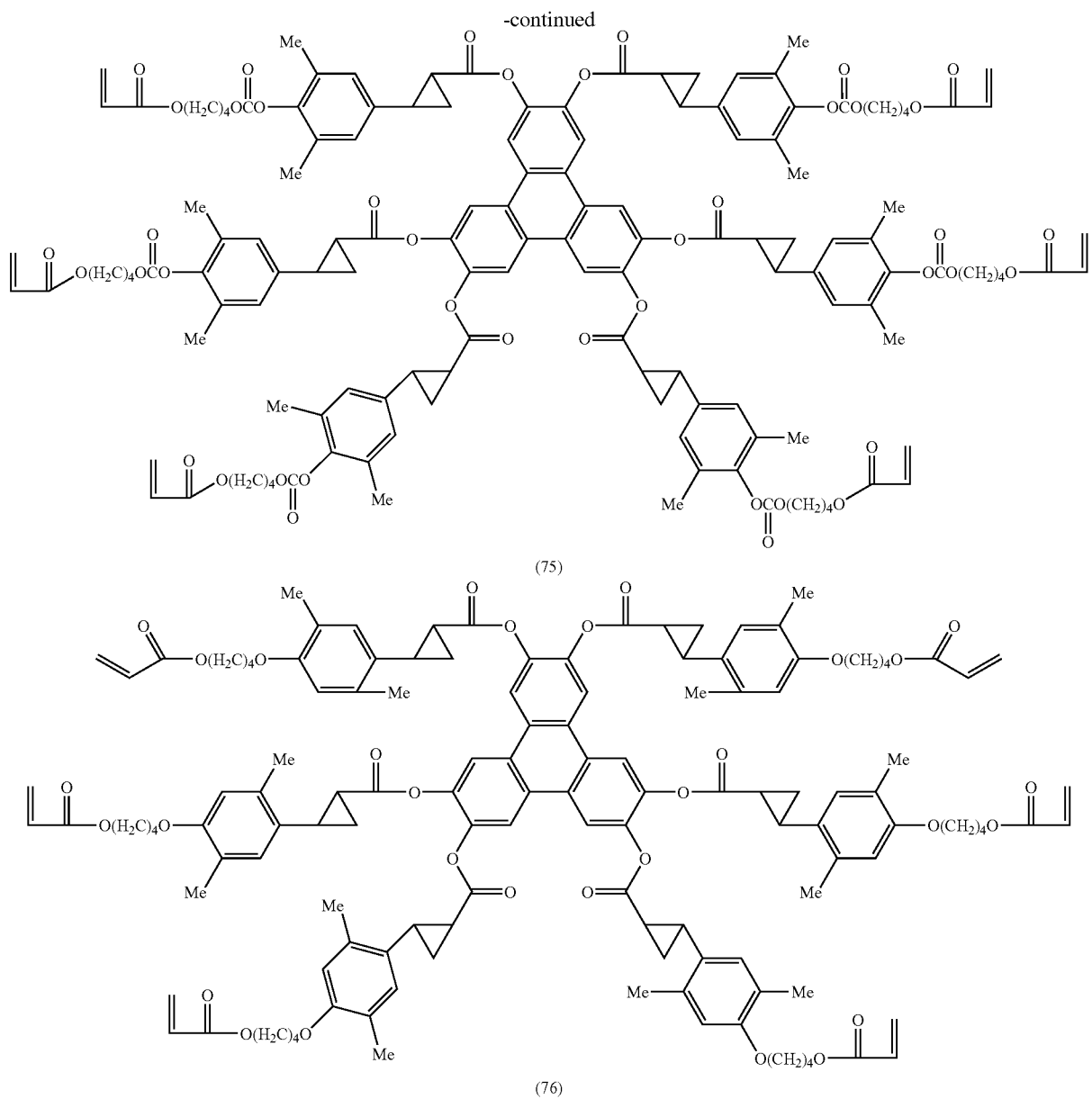

(75)

(76)

In the formula (DI), $Y^{11}$, $Y^{12}$ and $Y^{13}$ independently represent a methine or nitrogen atom.

When $Y^{11}$, $Y^{12}$ and $Y^{13}$ are methine, the hydrogen atoms in methane may be replaced with any substituent. Examples of the substituent of methine include an alkyl group, an alkoxy group, an aryloxy group, an acyl group, an alkoxycarbonyl group, an acyloxy group, an acylamino group, an alkoxycarbonylamino group, an alkylthio group, an arylthio group, halogen atoms and cyano. Among these, preferred are an alkyl group, an alkoxy group, an alkoxycarbonyl group, acyloxy group, halogen atoms and cyano; more preferred are a $C_{1-12}$ alkyl group, a $C_{1-2}$ alkoxy group, a $C_{2-12}$ alkoxycarbonyl group, a $C_{2-12}$ acyloxy group, halogen atoms, and cyano.

Preferably, all of $Y^{11}$, $Y^{12}$ and $Y^{13}$ are methine, more preferably non-substituted methine.

In the formula, $R^{11}$, $R^{12}$ and $R^{13}$ independently represent the group represented by the formula (DI-A), the formula (DI-B) or the formula (DI-C) below. For achieving the small wavelength dependence of retardation, preferred are the formula (DI-A) or the formula (DI-C); and more preferred is the formula (DI-A). The compounds satisfying $R^{11}=R^{12}=R^{13}$ are preferred.

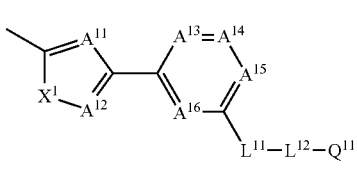

Formula (DI-A)

[Formula 22]

In the formula (DI-A), $A^{11}$, $A^{12}$, $A^{13}$, $A^{14}$, $A^{15}$ and $A^{16}$ independently represent methine or nitrogen atom.

Preferably, at least one of $A^{11}$ and $A^{12}$ represents nitrogen atom, and more preferably both represent nitrogen atom.

Preferably, at least three of $A^{13}$, $A^{14}$, $A^{15}$ and $A^{16}$ represent methine; more preferably all of them are methine. Preferred is non-substituted methine.

Examples of the substituent of methine represented by $A^{12}$, $A^{13}$ $A^{14}$, $A^{15}$ or $A^{16}$ include halogen atoms (fluorine atom, chlorine atom, bromine atom and iodine atom), cyano, nitro, a $C_{1-16}$ alkyl group, a $C_{2-16}$ alkenyl group, a $C_{2-16}$ alkynyl group, a $C_{1-16}$ alkyl halide group, a $C_{1-16}$ alkoxy group, a $C_{2-16}$ acyl group, a $C_{1-16}$ alkylthio group, a $C_{2-16}$ acyloxy group, a $C_{2-16}$ alkoxycarbonyl group, carbamoyl, a $C_{2-16}$ alkyl-substituted carbamoyl group and $C_{2-16}$ acylamino group. Among these, preferred are halogen atoms, cyano, a $C_{1-6}$ alkyl group, and a $C_{1-6}$ alkyl halide group; more preferred are halogen atoms, cyano, a $C_{1-4}$ alkyl group, and a $C_{1-4}$ alkyl halide group; and much more preferred are halogen atoms, a $C_{1-3}$ alkyl group, and trifluoromethyl.

In the formula, $X^1$ represents oxygen atom, sulfur atom, methylene or imino; and preferably oxygen atom.

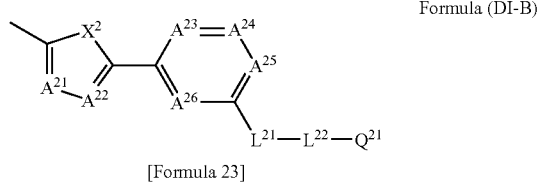

Formula (DI-B)

[Formula 23]

In the formula (DI-B), $A^{21}$, $A^{22}$, $A^{23}$, $A^{24}$, $A^{25}$ and $A^{26}$ independently represent methine or nitrogen atom.

Preferably, at least one of $A^{21}$ and $A^{22}$ represents nitrogen atom, and more preferably both represent nitrogen atom.

Preferably, at least three of $A^{23}$, $A^{24}$, $A^{25}$ and $A^{26}$ represent methine; more preferably all of them are methine.

Examples of the substituent of methine represented by $A^{22}$, $A^{23}$, $A^{24}$, $A^{25}$ or $A^{26}$ include halogen atoms (fluorine atom, chlorine atom, bromine atom and iodine atom), cyano, nitro, a $C_{1-16}$ alkyl group, a $C_{2-16}$ alkenyl group, a $C_{2-16}$ alkynyl group, a $C_{1-16}$ alkyl halide group, a $C_{1-16}$ alkoxy group, a $C_{2-16}$ acyl group, a $C_{1-6}$ alkylthio group, a $C_{2-16}$ acyloxy group, a $C_{2-16}$ alkoxycarbonyl group, carbamoyl, a $C_{2-16}$ alkyl-substituted carbamoyl group and $C_{2-16}$ acylamino group. Among these, preferred are halogen atoms, cyano, a $C_{1-6}$ alkyl group, and a $C_{1-6}$ alkyl halide group; more preferred are halogen atoms, cyano, a $C_{1-4}$ alkyl group, and a $C_{1-4}$ alkyl halide group; and much more preferred are halogen atoms, a $C_{1-3}$ alkyl group, and trifluoromethyl.

In the formula, $X^2$ represents oxygen atom, sulfur atom, methylene or imino; and preferably oxygen atom.

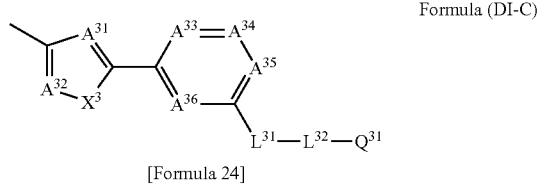

Formula (DI-C)

[Formula 24]

Formula (DI-C), $A^{31}$, $A^{32}$, $A^{33}$, $A^{34}$, $A^{35}$ and $A^{36}$ independently represent methine or nitrogen atom.

Preferably, at least one of $A^{31}$ and $A^{32}$ represents nitrogen atom, and more preferably both represent nitrogen atom.

Preferably, at least three of $A^{33}$, $A^{34}$, $A^{35}$ and $A^{36}$ represent methine; more preferably all of them are methine.

Examples of the substituent of methine represented by $A^{32}$, $A^{33}$ $A^{34}$, $A^{35}$ or $A^{36}$ include halogen atoms (fluorine atom, chlorine atom, bromine atom and iodine atom), cyano, nitro, a $C_{1-16}$ alkyl group, a $C_{2-16}$ alkenyl group, a $C_{2-16}$ alkynyl group, a $C_{1-16}$ alkyl halide group, a $C_{1-16}$ alkoxy group, a $C_{2-16}$ acyl group, a $C_{1-6}$ alkylthio group, a $C_{2-16}$ acyloxy group, a $C_{2-16}$ alkoxycarbonyl group, carbamoyl, a $C_{2-16}$ alkyl-substituted carbamoyl group and $C_{2-16}$ acylamino group. Among these, preferred are halogen atoms, cyano, a $C_{1-6}$ alkyl group, and a $C_{1-6}$ alkyl halide group; more preferred are halogen atoms, cyano, a $C_{1-4}$ alkyl group, and a $C_{1-4}$ alkyl halide group; and much more preferred are halogen atoms, a $C_{1-3}$ alkyl group, and trifluoromethyl.

In the formula, $X^3$ represents oxygen atom, sulfur atom, methylene or imino; and preferably oxygen atom.

$L^{11}$ in the formula (DI-A), L in the formula (DI-B) and $L^{31}$ in the formula (DI-C) independently represent —O—, —O—CO—, —CO—O—, —O—CO—O—, —S—, —NH—, —SO$_2$—, —CH$_2$—, —CH=CH— or —C≡C—. Preferably they independently represents —O—, —O—CO—, —CO—O—, —O—CO—O—, —CH$_2$—, —CH=CH—, or —C≡C—; more preferably, they independently represent —O—, —O—CO—, —CO—O—, —O—CO—O—, or —CH$_2$—. The hydrogen atom included in the group may be replaced with any substituent. Examples of such the substituent include halogen atoms, cyano, nitro, a $C_{1-6}$ alkyl group, a $C_{1-6}$ alkyl halide group, a $C_{1-6}$ alkoxy group, a $C_{2-6}$ acyl group, a $C_{1-6}$ alkylthio group, a $C_{2-6}$ acyloxy group, a $C_{2-6}$ alkoxycarbonyl group, carbamoyl, a $C_{2-6}$ alkyl-substituted carbamoyl group and $C_{2-6}$ acylamino group. Among these, preferred are halogen atoms and a $C_{1-6}$ alkyl group.

$L^{12}$ in the formula (DI-A), $L^{22}$ in the formula (DI-B) and $L^{32}$ in the formula (DI-C) independently represent a divalent group selected from the group consisting of —O—, —S—, —C(=O)—, —SO$_2$—, —NH—, —CH$_2$—, —CH=CH—, —C≡C— and any combinations thereof. Among these, the hydrogen atom in —NH—, —CH$_2$— or —CH=CH— may be replaced with any substituent. Examples of such the substituent include halogen atoms, cyano, nitro, a $C_{1-6}$ alkyl group, a $C_{1-6}$ alkyl halide group, a $C_{1-6}$ alkoxy group, a $C_{2-6}$ acyl group, a $C_{1-6}$ alkylthio group, a $C_{2-6}$ acyloxy group, a $C_{2-6}$ alkoxycarbonyl group, carbamoyl, a $C_{2-6}$ alkyl-substituted carbamoyl group and $C_{2-6}$ acylamino group. Among these, preferred are halogen atoms and a $C_{1-6}$ alkyl group.

Preferably, $L^{12}$, $L^{22}$ and $L^{32}$ are independently selected from the group consisting of —O—, —C(=O)—, —CH$_2$—, —CH=CH—, —C≡C— and any combinations thereof.

Preferably, the number of carbon atoms in $L^{12}$, $L^{22}$ or $L^{32}$ is independently from 1 to 20, and more preferably from 2 to 14. Preferably, they comprise from 1 to 16 of —CH$_2$— and more preferably from 2 to 12 of —CH$_2$—.

More preferably, $L^{12}$, $L^{22}$ and $L^{32}$ independently represent a $C_{1-20}$ divalent group selected from the group consisting of —O—, —S—, —C(=O)—, —SO$_2$—, —NH—, —CH$_2$—, —CH=CH—, —C≡C— and any combinations thereof. Preferably, they comprise from 1 to 16 of —CH$_2$— and more preferably from 2 to 12 of —CH$_2$—.

$Q^{11}$ in the formula (DI-A), $Q^{21}$ in the formula (DI-B), $Q^{31}$ in the formula (DI-C) independently represent a polymerizable group or hydrogen atom. The compound may be used for preparing optical films such as optical compensation films which are required to never change their retardation values even under heating, and in such a case, preferably, $Q^{11}$, $Q^{21}$ and $Q^{31}$ independently represent a polymerizable group.

Addition polymerization (its meaning includes ring-opening polymerization) or condensation polymerization is preferred. Namely, the polymerizable group is preferably selected from the function groups capable of addition or condensation polymerizations. Examples of the polymerizable group include those shown below.

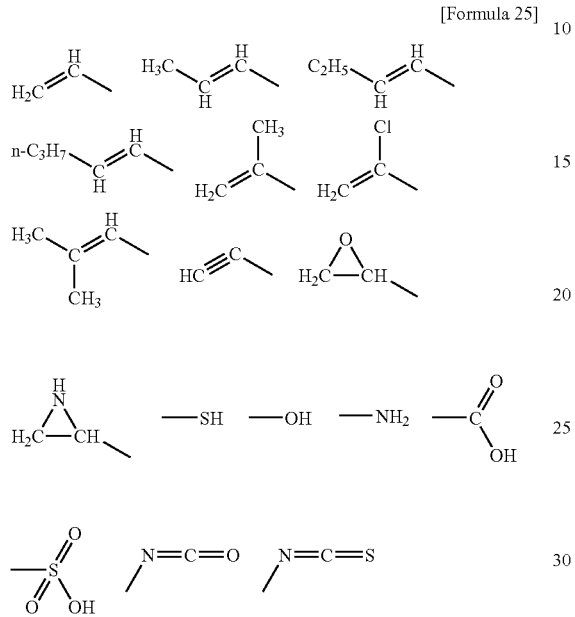

[Formula 25]

Further preferably, the polymerizable group is selected from the function groups capable of addition polymerizations. Examples of such the polymerizable group include polymerizable ethylene-unsaturated groups and ring-opening polymerizable groups.

Examples of the polymerizable ethylene-unsaturated group include the formulae (M-1) to (M-6) shown below.

[Formula 26]

(M-1) CH₂=CH—C(=O)—O—

(M-2) CH₂=C(CH₃)—C(=O)—O—

(M-3) CH₂=CH—C(=O)—N(R)—

(M-4) CH₂=C(CH₃)—C(=O)—N(R)—

(M-5) CH₂=CH—O—C(=O)—CH₃

(M-6) CH₂=CH—C₆H₄—CH₃ (p-methylstyrene)

In the formulae (M-3) and (M-4), R represents hydrogen atom or an alkyl group; and preferably hydrogen atom or methyl.

Among the formulae (M-1) to (M-6), the formulae (M-1) and (M-2) are preferred; and the formula (M-1) is more preferred.

Among examples of the ring-opening polymerizable group, cyclic ether groups are preferred; epoxy and oxetanyl are more preferred; and epoxy is mot preferred.

Examples of the compound represented by the formula (DI) include, however are not limited to, those shown below.

[Formula 27]

R group on benzene ring (1,3,5-trisubstituted)

R = 5-methyl-3-(4-X-phenyl)-1,2,4-oxadiazole

X = —OC₄H₉        D-1
    —OC₅H₁₁       D-2
    —OC₆H₁₃       D-3
    —OC₇H₁₅       D-4
    —OC₈H₁₇       D-5
    —OCH₂CH(CH₃)C₄H₉   D-6
    —O(CH₂)₂OCOCH=CH₂  D-7
    —O(CH₂)₃OCOCH=CH₂  D-8
    —O(CH₂)₄OCOCH=CH₂  D-9

-continued

—O(CH₂)₅OCOCH=CH₂
D-10
—O(CH₂)₆OCOCH=CH₂
D-11
—O(CH₂)₇OCOCH=CH₂
D-12
—O(CH₂)₈OCOCH=CH₂
D-13
—O(CH₂)₂CH(CH₃)OCOCH=CH₂
D-14
—O(CH₂)₃CH(CH₃)OCOCH=CH₂
D-15
—O(CH₂CH₂O)₂COCH=CH₂
D-16
—O(CH₂)₄OCOC=CH₂
          |
          CH₃
D-17
—O(CH₂)₄OCOCH=CHCH₃
D-18
—O(CH₂)₄OCH=CH₂
D-19

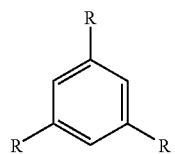
D-20

[Formula 28]

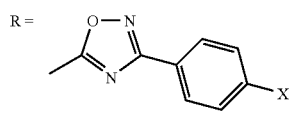

X = —OCOC₄H₉
D-21
   —OCOC₅H₁₁
D-22
   —OCOC₆H₁₃
D-23
   —OCO(CH₂)₂OCOCH=CH₂
D-24
   —OCO(CH₂)₃OCOCH=CH₂
D-25
   —OCO(CH₂)₄OCOCH=CH₂
D-26
   —OCO(CH₂)₅OCOCH=CH₂
D-27
   —OCO(CH₂)₆OCOCH=CH₂
D-28
   —OCO(CH₂)₇OCOCH=CH₂
D-29

—OCO(CH₂)₂CH(CH₃)OCOCH
D-30
—OCO(CH₂)₃OCOC=CH₂
          |
          CH₃
D-31
—OCO(CH₂)₄OCOCH=CH₂
D-32
—OCO(CH₂)₄OCH=CH₂
D-33
—OCO(CH₂)₄—CH—CH₂
              \ /
               O
D-34

[Formula 29]

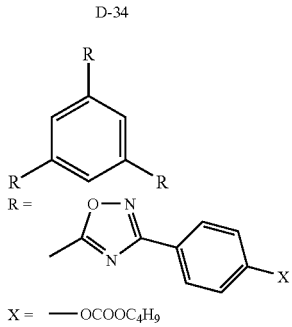

X = —OCOOC₄H₉
D-35
   —OCOOC₅H₁₁
D-36
   —OCOOC₆H₁₃
D-37
   —OCOO(CH₂)₂OCOCH=CH₂
D-38
   —OCOO(CH₂)₃OCOCH=CH₂
D-39
   —OCOO(CH₂)₄OCOCH=CH₂
D-40
   —OCOO(CH₂)₅OCOCH=CH₂
D-41
   —OCOO(CH₂)₆OCOCH=CH₂
D-42
   —OCOO(CH₂)₇OCOCH=CH₂
D-43
—OCOOCH(CH₃)CH₂CH₂OCOCH=CH₂
D-44
—OCOOC(CH₂CH₂O)₂COCH=CH₂
D-45
—OCOO(CH₂)₂OCOC=CH₂
          |
          CH₃
D-46
—OCOO(CH₂)₂OCOCH=CHCH₃
D-47
—OCOO(CH₂)₄OCH=CH₂
D-48
—OCOO(CH₂)₄—CH—CH₂
              \ /
               O
D-49

[Formula 30]

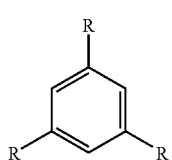

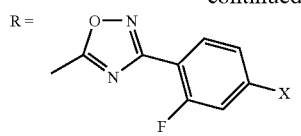

X =
—OC₄H₉
　D-50
—OC₅H₁₁
　D-51
—OC₆H₁₃
　D-52
—OC₇H₁₅
　D-53
—OC₈H₁₇
　D-54
—OCH₂CH(CH₃)C₄H₉
　D-55
—O(CH₂)₂OCOCH=CH₂
　D-56
—O(CH₂)₃OCOCH=CH₂
　D-57
—O(CH₂)₄OCOCH=CH₂
　D-58

—O(CH₂)₅OCOCH=CH₂
　D-59
—O(CH₂)₆OCOCH=CH₂
　D-60
—O(CH₂)₇OCOCH=CH₂
　D-61
—O(CH₂)₈OCOCH=CH₂
　D-62
—O(CH₂)₂CH(CH₃)OCOCH=CH₂
　D-63
—O(CH₂)₃CH(CH₃)OCOCH=CH₂
　D-64
—O(CH₂CH₂O)₂COCH=CH₂
　D-65
—O(CH₂)₄OCOC(CH₃)=CH₂
　D-66
—O(CH₂)₄OCOCH=CHCH₃
　D-67
—O(CH₂)₄OCH=CH₂
　D-68

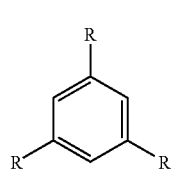
　D-69

[Formula 31]

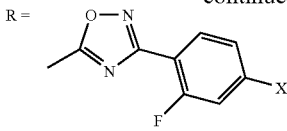

X =
—OCOC₄H₉
　D-70
—OCOC₅H₁₁
　D-71
—OCOC₆H₁₃
　D-72
—OCO(CH₂)₂OCOCH=CH₂
　D-73
—OCO(CH₂)₃OCOCH=CH₂
　D-74
—OCO(CH₂)₄OCOCH=CH₂
　D-75
—OCO(CH₂)₅OCOCH=CH₂
　D-76
—OCO(CH₂)₆OCOCH=CH₂
　D-77
—OCO(CH₂)₇OCOCH=CH₂
　D-78
—OCO(CH₂)₂CH(CH₃)OCOCH
　D-79
—OCO(CH₂)₂OCOC(CH₃)=CH₂
　D-80
—OCO(CH₂)₄OCOCH=CH₂
　D-81
—OCO(CH₂)₄OCH=CH₂
　D-82
—OCO(CH₂)₄—CH—CH₂
　　　　　　　\\O/
　D-83

[Formula 32]

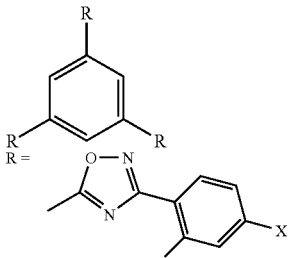

X =
—OCOOC₄H₉
　D-84
—OCOOC₅H₁₁
　D-85
—OCOOC₆H₁₃
　D-86
—OCOO(CH₂)₂OCOCH=CH₂
　D-87
—OCOO(CH₂)₃OCOCH=CH₂
　D-88
—OCOO(CH₂)₄OCOCH=CH₂
　D-89
—OCOO(CH₂)₅OCOCH=CH₂
　D-90
—OCOO(CH₂)₆OCOCH=CH₂
　D-91

-continued

—OCOO(CH$_2$)$_7$OCOCH=CH$_2$
D-92
—OCOOCH(CH$_3$)CH$_2$CH$_2$OCOCH=CH$_2$
D-93
—OCOOC(CH$_2$CH$_2$O)$_2$COCH=CH$_2$
D-94
—OCOO(CH$_2$)$_2$OCOC=CH$_2$
        |
        CH$_3$
D-95
—OCOO(CH$_2$)$_2$OCOCH=CHCH$_3$
D-96
—OCOO(CH$_2$)$_4$OCH=CH$_2$
D-97
—OCOO(CH$_2$)$_4$—CH—CH$_2$
              \\O/
D-98

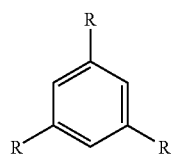

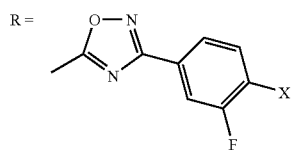

X = —OC$_4$H$_9$
D-99
—OC$_5$H$_{11}$
D-100
—OC$_6$H$_{13}$
D-101
—OC$_7$H$_{15}$
D-102
—OC$_8$H$_{17}$
D-103
—OCH$_2$CH(CH$_3$)C$_4$H$_9$
D-104
—O(CH$_2$)$_2$OCOCH=CH$_2$
D-105
—O(CH$_2$)$_3$OCOCH=CH$_2$
D-106
—O(CH$_2$)$_4$OCOCH=CH$_2$

-continued

D-107
—O(CH$_2$)$_5$OCOCH=CH$_2$
D-108
—O(CH$_2$)$_6$OCOCH=CH$_2$
D-109
—O(CH$_2$)$_7$OCOCH=CH$_2$
D-110
—O(CH$_2$)$_8$OCOCH=CH$_2$
D-111
—O(CH$_2$)$_2$CH(CH$_3$)OCOCH=CH$_2$
D-112
—O(CH$_2$)$_3$CH(CH$_3$)OCOCH=CH$_2$
D-113
—O(CH$_2$CH$_2$O)$_2$COCH=CH$_2$
D-114
—O(CH$_2$)$_4$OCOC=CH$_2$
           |
           CH$_3$
D-115
—O(CH$_2$)$_4$OCOCH=CHCH$_3$
D-116
—O(CH$_2$)$_4$OCH=CH$_2$
D-117

[Formula 33]

—O(CH$_2$)$_4$—CH—CH$_2$
           \\O/

D-118

[Formula 34]

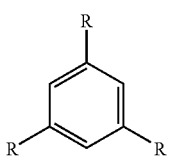

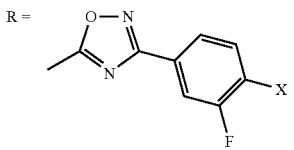

X = —OCOC$_4$H$_9$
D-119
—OCOC$_5$H$_{11}$
D-120
—OCOC$_6$H$_{13}$
D-121
—OCO(CH$_2$)$_2$OCOCH=CH$_2$
D-122
—OCO(CH$_2$)$_3$OCOCH=CH$_2$
D-123
—OCO(CH$_2$)$_4$OCOCH=CH$_2$
D-124
—OCO(CH$_2$)$_5$OCOCH=CH$_2$
D-125
—OCO(CH$_2$)$_6$OCOCH=CH$_2$
D-126

—OCO(CH₂)₇OCOCH=CH₂
D-127

—OCO(CH₂)₂CH(CH₃)OCOCH
D-128

—OCO(CH₂)₂OCOC=CH₂
          |
          CH₃
D-129

—OCO(CH₂)₄OCOCH=CH₂
D-130

—OCO(CH₂)₄OCH=CH₂
D-131

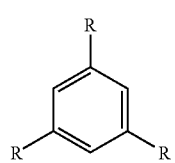
D-132

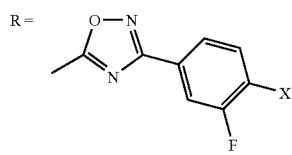

X= —OCOOC₄H₉
D-133
—OCOOC₅H₁₁
D-134
—OCOOC₆H₁₃
D-135
—OCOO(CH₂)₂OCOCH=CH₂
D-136
—OCOO(CH₂)₃OCOCH=CH₂
D-137
—OCOO(CH₂)₄OCOCH=CH₂
D-138
—OCOO(CH₂)₅OCOCH=CH₂
D-139
—OCOO(CH₂)₆OCOCH=CH₂
D-140
—OCOO(CH₂)₇OCOCH=CH₂
D-141
—OCOOCH(CH₃)CH₂CH₂OCOCH=CH₂
D-142
—OCOOC(CH₂CH₂O)₂COCH=CH₂
D-143
—OCOO(CH₂)₂OCOC=CH₂
                  |
                  CH₃
D-144
—OCOO(CH₂)₂OCOCH=CHCH₃
D-145
—OCOO(CH₂)₄OCH=CH₂
D-146

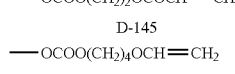
D-147

[Formula 36]

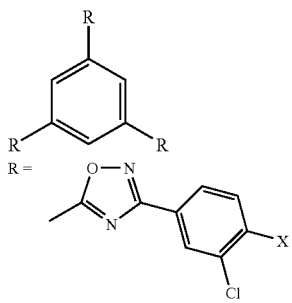

X= —OC₆H₁₃
D-148
—OCOC₅H₁₁
D-149
—OCOOC₄H₉
D-150
—O(CH₂)₄OCOCH=CH₂
D-151
—O(CH₂)₆OCOCH=CH₂
D-152
—OCO(CH₂)₃OCOCH=CH₂
D-153
—OCO(CH₂)₄OCOCH=CH₂
D-154
—OCOO(CH₂)₂OCOCH=CH₂
D-155
—OCOO(CH₂)₄OCOCH=CH₂
D-156

[Formula 37]

X= —OC₆H₁₃
D-157
—OCOC₅H₁₁
D-158
—OCOOC₄H₉
D-159
—O(CH₂)₄OCOCH=CH₂
D-160
—O(CH₂)₆OCOCH=CH₂
D-161
—OCO(CH₂)₃OCOCH=CH₂
D-162
—OCO(CH₂)₄OCOCH=CH₂
D-163
—OCOO(CH₂)₂OCOCH=CH₂
D-164
—OCOO(CH₂)₄OCOCH=CH₂
D-165

-continued

[Formula 38]

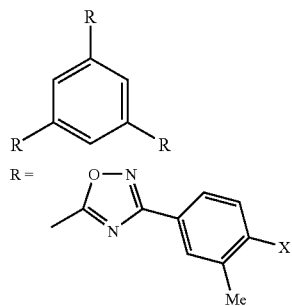

R =

X = —OC₆H₁₃
D-166
—OCOC₅H₁₁
D-167
—OCOOC₄H₉
D-168
—O(CH₂)₄OCOCH=CH₂
D-169
—O(CH₂)₆OCOCH=CH₂
D-170
—OCO(CH₂)₃OCOCH=CH₂
D-171
—OCO(CH₂)₄OCOCH=CH₂
D-172
—OCOO(CH₂)₂OCOCH=CH₂
D-173
—OCOO(CH₂)₄OCOCH=CH₂
D-174

[Formula 37]

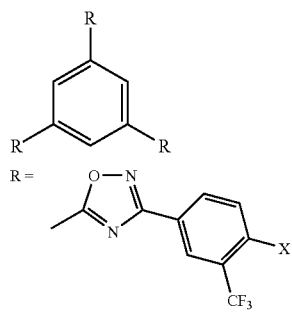

R =

X = —OC₆H₁₃
D-175
—OCOC₅H₁₁
D-176
—OCOOC₄H₉
D-178
—O(CH₂)₄OCOCH=CH₂
D-179
—O(CH₂)₆OCOCH=CH₂
D-180
—OCO(CH₂)₃OCOCH=CH₂
D-181
—OCO(CH₂)₄OCOCH=CH₂
D-182
—OCOO(CH₂)₂OCOCH=CH₂
D-183
—OCOO(CH₂)₄OCOCH=CH₂
D-184

-continued

[Formula 38]

R =

X = —OC₆H₁₃
D-185
—OCOC₅H₁₁
D-186
—OCOOC₄H₉
D-187
—O(CH₂)₄OCOCH=CH₂
D-188
—O(CH₂)₆OCOCH=CH₂
D-189
—OCO(CH₂)₃OCOCH=CH₂
D-190
—OCO(CH₂)₄OCOCH=CH₂
D-191
—OCOO(CH₂)₂OCOCH=CH₂
D-192
—OCOO(CH₂)₄OCOCH=CH₂
D-193

[Formula 37]

R =

X = —OC₆H₁₃
D-194
—OCOC₅H₁₁
D-195
—OCOOC₄H₉
D-196
—O(CH₂)₄OCOCH=CH₂
D-197
—O(CH₂)₆OCOCH=CH₂
D-198
—OCO(CH₂)₃OCOCH=CH₂
D-199
—OCO(CH₂)₄OCOCH=CH₂
D-200
—OCOO(CH₂)₂OCOCH=CH₂
D-201
—OCOO(CH₂)₄OCOCH=CH₂
D-202

-continued

[Formula 38]

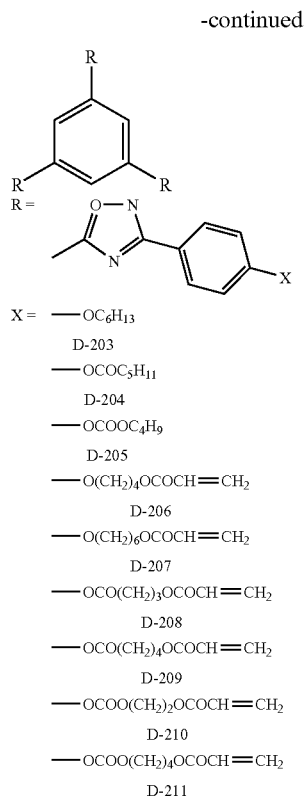

X = —OC$_6$H$_{13}$
D-203
—OCOC$_5$H$_{11}$
D-204
—OCOOC$_4$H$_9$
D-205
—O(CH$_2$)$_4$OCOCH=CH$_2$
D-206
—O(CH$_2$)$_6$OCOCH=CH$_2$
D-207
—OCO(CH$_2$)$_3$OCOCH=CH$_2$
D-208
—OCO(CH$_2$)$_4$OCOCH=CH$_2$
D-209
—OCOO(CH$_2$)$_2$OCOCH=CH$_2$
D-210
—OCOO(CH$_2$)$_4$OCOCH=CH$_2$
D-211

[Formula 43]

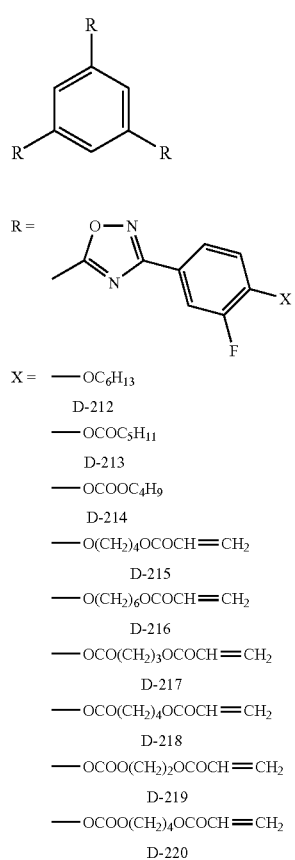

X = —OC$_6$H$_{13}$
D-212
—OCOC$_5$H$_{11}$
D-213
—OCOOC$_4$H$_9$
D-214
—O(CH$_2$)$_4$OCOCH=CH$_2$
D-215
—O(CH$_2$)$_6$OCOCH=CH$_2$
D-216
—OCO(CH$_2$)$_3$OCOCH=CH$_2$
D-217
—OCO(CH$_2$)$_4$OCOCH=CH$_2$
D-218
—OCOO(CH$_2$)$_2$OCOCH=CH$_2$
D-219
—OCOO(CH$_2$)$_4$OCOCH=CH$_2$
D-220

-continued

[Formula 44]

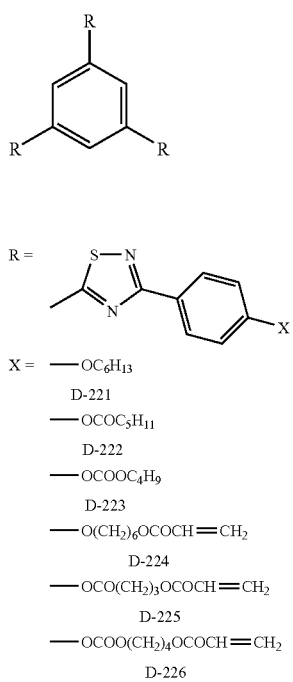

X = —OC$_6$H$_{13}$
D-221
—OCOC$_5$H$_{11}$
D-222
—OCOOC$_4$H$_9$
D-223
—O(CH$_2$)$_6$OCOCH=CH$_2$
D-224
—OCO(CH$_2$)$_3$OCOCH=CH$_2$
D-225
—OCOO(CH$_2$)$_4$OCOCH=CH$_2$
D-226

[Formula 45]

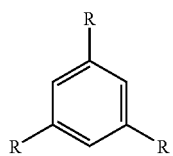

R =

X = —OC$_6$H$_{13}$
D-227
—OCOC$_5$H$_{11}$
D-228
—OCOOC$_4$H$_9$
D-229
—O(CH$_2$)$_6$OCOCH=CH$_2$
D-230
—OCO(CH$_2$)$_3$OCOCH=CH$_2$
D-231
—OCOO(CH$_2$)$_4$OCOCH=CH$_2$
D-232

[Formula 46]

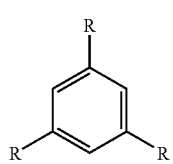

-continued
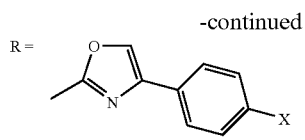
X = —OC$_6$H$_{13}$
D-233
—OCOC$_5$H$_{11}$
D-234
—OCOOC$_4$H$_9$
D-235
—O(CH$_2$)$_6$OCOCH=CH$_2$
D-236
—OCO(CH$_2$)$_3$OCOCH=CH$_2$
D-237
—OCOO(CH$_2$)$_4$OCOCH=CH$_2$
D-238
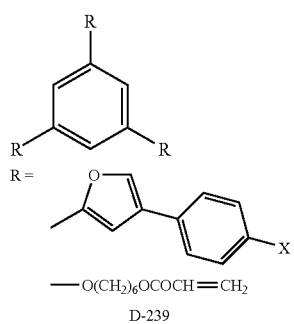
—O(CH$_2$)$_6$OCOCH=CH$_2$
D-239
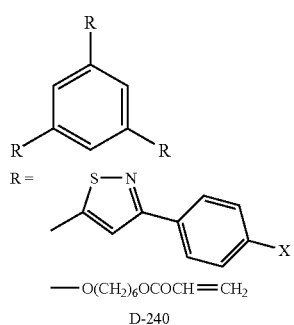
—O(CH$_2$)$_6$OCOCH=CH$_2$
D-240
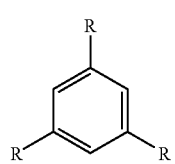
R =
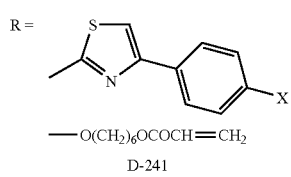
—O(CH$_2$)$_6$OCOCH=CH$_2$
D-241
-continued
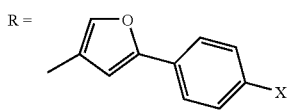
—O(CH$_2$)$_6$OCOCH=CH$_2$
D-242
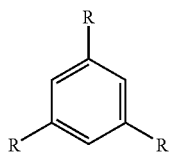
R =
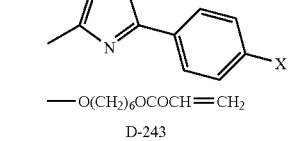
—O(CH$_2$)$_6$OCOCH=CH$_2$
D-243
[Formula 47]
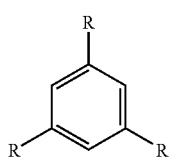
R =
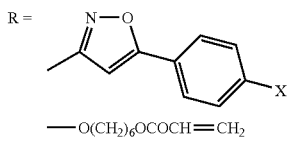
—O(CH$_2$)$_6$OCOCH=CH$_2$
D-244
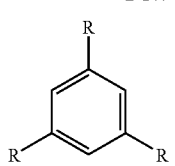
R =
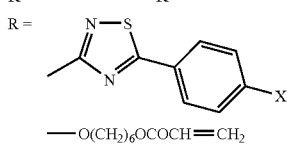
—O(CH$_2$)$_6$OCOCH=CH$_2$
D-245
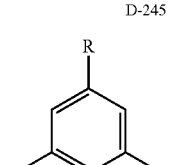
R =
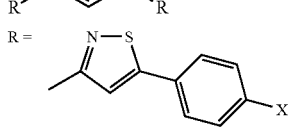
—O(CH$_2$)$_6$OCOCH=CH$_2$
D-246
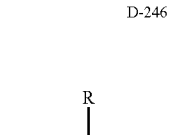
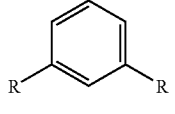

R =
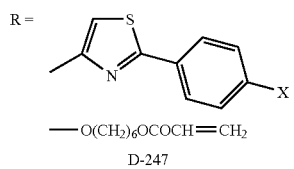
—O(CH₂)₆OCOCH=CH₂
D-247
[Formula 48]
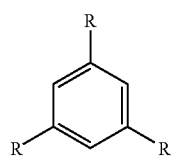
R =
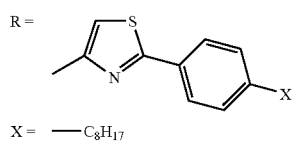
X = —C₈H₁₇
D-248
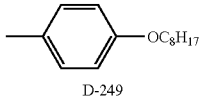
D-249
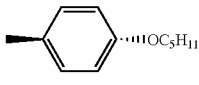
D-250
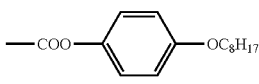
D-251
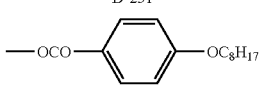
D-252
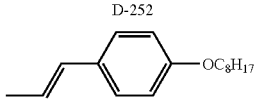
D-253
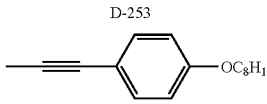
D-254
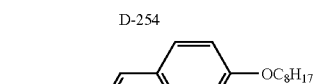
D-255
—(CH₂)₂OCOCH=CH₂
D-256
—COO(CH₂)₄OCOCH=CH₂
D-257
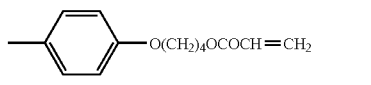
D-258
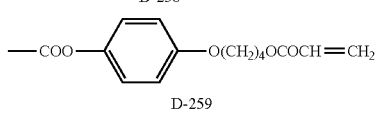
D-259
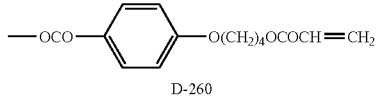
D-260
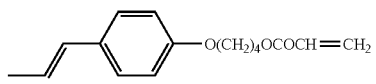
D-261
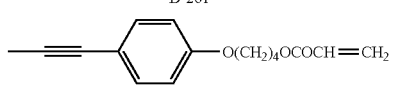
D-262
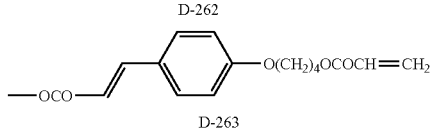
D-263
[Formula 49]
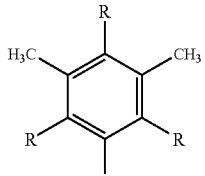
R =
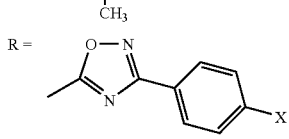
X = —O(CH₂)₂OCOCH=CH₂
D-264
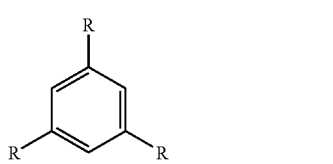
R =
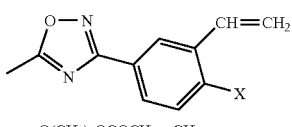
—O(CH₂)₂OCOCH=CH₂
D-265
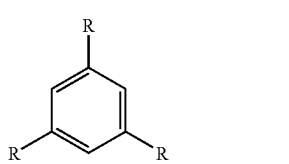
R =
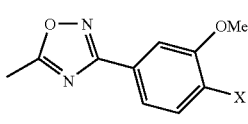
—O(CH₂)₂OCOCH=CH₂
D-266

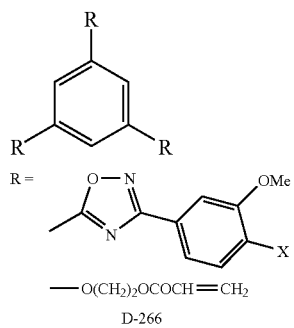
D-266
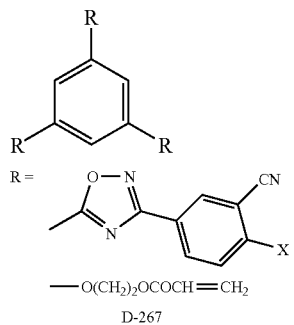
D-267
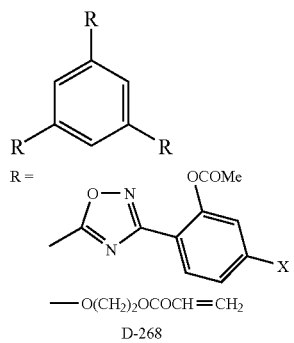
D-268
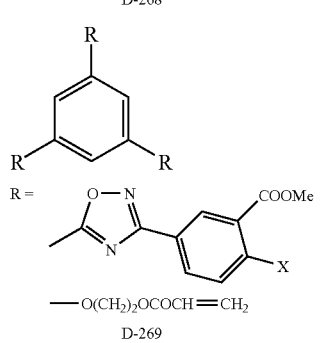
D-269
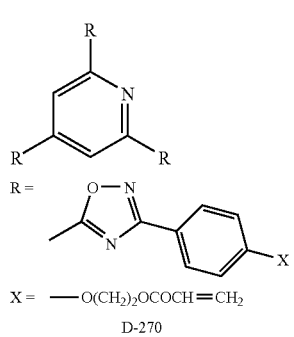
D-270
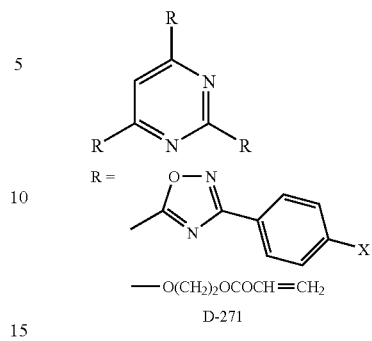
D-271
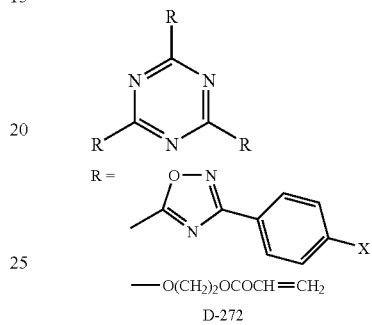
D-272
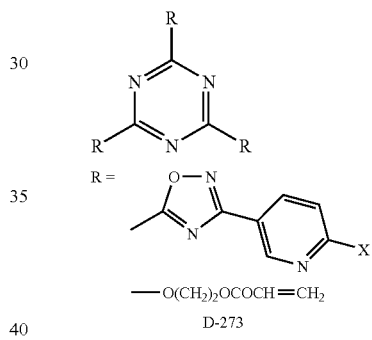
D-273
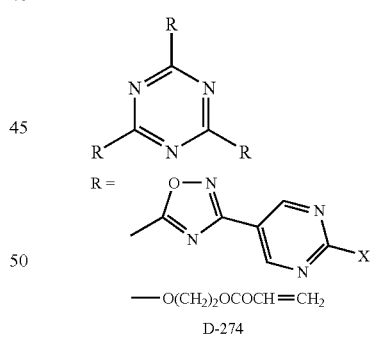
D-274
[Formula 50]
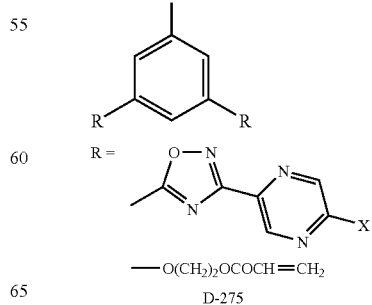
D-275

-continued
[Formula 51]
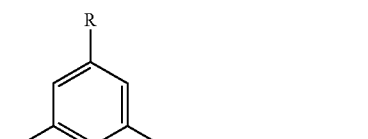
R =
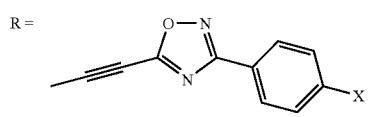
X = —O(CH₂)₂OCOCH=CH₂
D-276
—OC₆H₁₃
D-277
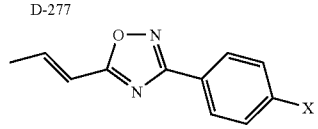
X = —O(CH₂)₂OCOCH=CH₂
D-278
—OC₆H₁₃
D-279
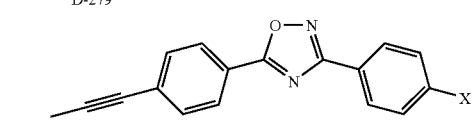
X = —O(CH₂)₂OCOCH=CH₂
D-280
—OC₆H₁₃
D-281
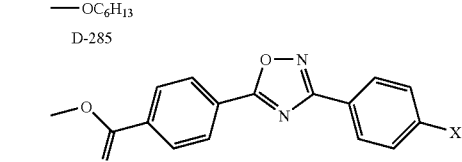
X = —O(CH₂)₂OCOCH=CH₂
D-282
—OC₆H₁₃
D-283
-continued
[Formula 52]
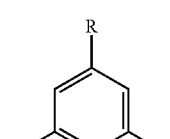
R =
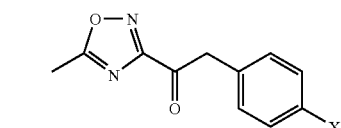
X = —O(CH₂)₂OCOCH=CH₂
D-276
—OC₆H₁₃
D-277
X = —O(CH₂)₂OCOCH=CH₂
D-278
—OC₆H₁₃
D-279
X = —O(CH₂)₂OCOCH=CH₂
D-280
—OC₆H₁₃
D-281
X = —O(CH₂)₂OCOCH=CH₂
D-282
—OC₆H₁₃
D-283
[Formula 53]
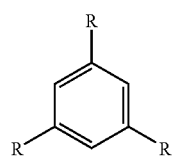

-continued

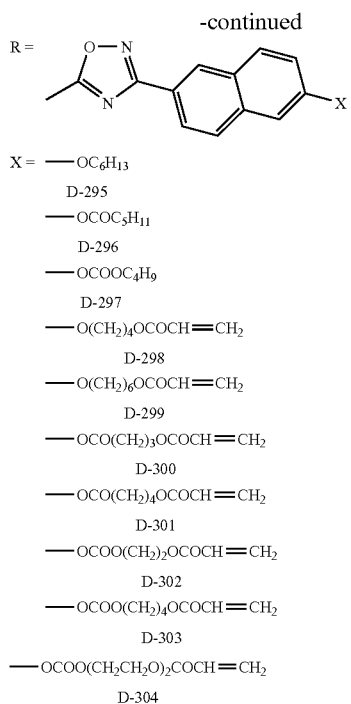

R =

X= —OC$_6$H$_{13}$
D-295
—OCOC$_5$H$_{11}$
D-296
—OCOOC$_4$H$_9$
D-297
—O(CH$_2$)$_4$OCOCH=CH$_2$
D-298
—O(CH$_2$)$_6$OCOCH=CH$_2$
D-299
—OCO(CH$_2$)$_3$OCOCH=CH$_2$
D-300
—OCO(CH$_2$)$_4$OCOCH=CH$_2$
D-301
—OCOO(CH$_2$)$_2$OCOCH=CH$_2$
D-302
—OCOO(CH$_2$)$_4$OCOCH=CH$_2$
D-303
—OCOO(CH$_2$CH$_2$O)$_2$COCH=CH$_2$
D-304

[Formula 54]

R =

X= —OC$_6$H$_{13}$
D-305
—OCOC$_5$H$_{11}$
D-306
—OCOOC$_4$H$_9$
D-307
—O(CH$_2$)$_4$OCOCH=CH$_2$
D-308
—O(CH$_2$)$_6$OCOCH=CH$_2$
D-309
—OCO(CH$_2$)$_3$OCOCH=CH$_2$
D-310
—OCO(CH$_2$)$_4$OCOCH=CH$_2$
D-311
—OCOO(CH$_2$)$_2$OCOCH=CH$_2$
D-312
—OCOO(CH$_2$)$_4$OCOCH=CH$_2$
D-313
—OCOO(CH$_2$CH$_2$O)$_2$COCH=CH$_2$
D-314

-continued

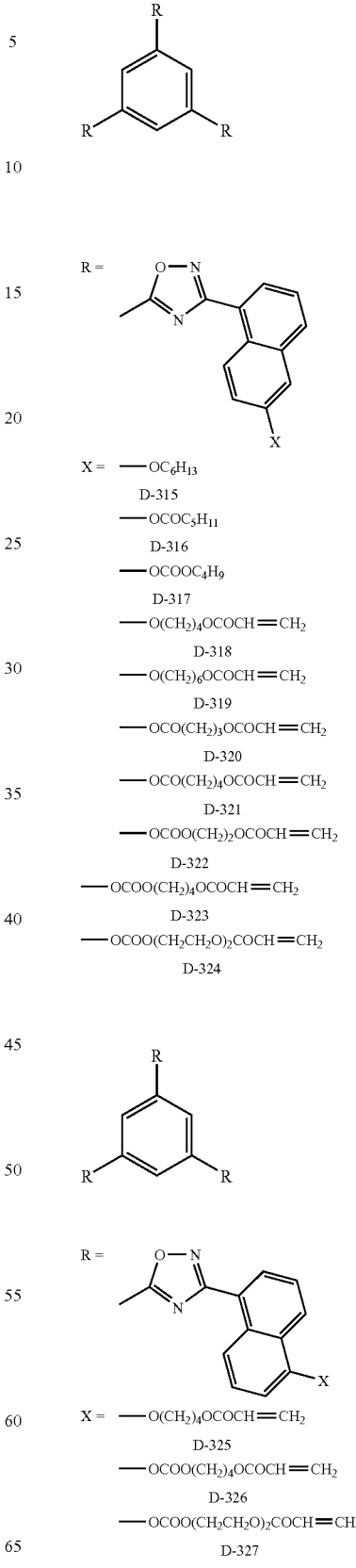

[Formula 55]

R =

X= —OC$_6$H$_{13}$
D-315
—OCOC$_5$H$_{11}$
D-316
—OCOOC$_4$H$_9$
D-317
—O(CH$_2$)$_4$OCOCH=CH$_2$
D-318
—O(CH$_2$)$_6$OCOCH=CH$_2$
D-319
—OCO(CH$_2$)$_3$OCOCH=CH$_2$
D-320
—OCO(CH$_2$)$_4$OCOCH=CH$_2$
D-321
—OCOO(CH$_2$)$_2$OCOCH=CH$_2$
D-322
—OCOO(CH$_2$)$_4$OCOCH=CH$_2$
D-323
—OCOO(CH$_2$CH$_2$O)$_2$COCH=CH$_2$
D-324

X= —O(CH$_2$)$_4$OCOCH=CH$_2$
D-325
—OCOO(CH$_2$)$_4$OCOCH=CH$_2$
D-326
—OCOO(CH$_2$CH$_2$O)$_2$COCH=CH$_2$
D-327

-continued

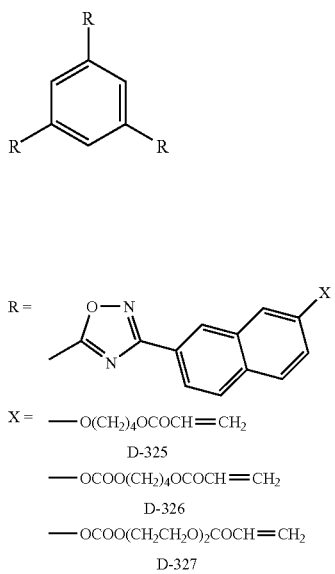

X= —O(CH$_2$)$_4$OCOCH=CH$_2$
D-325
—OCOO(CH$_2$)$_4$OCOCH=CH$_2$
D-326
—OCOO(CH$_2$CH$_2$O)$_2$COCH=CH$_2$
D-327

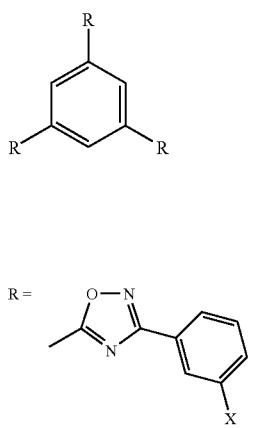

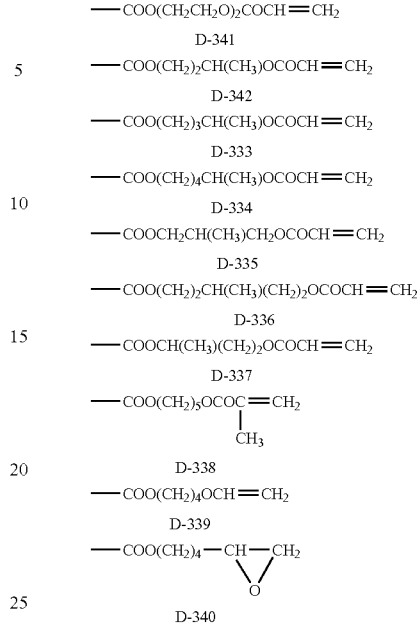

X= —COOC$_4$H$_9$
D-331
—COOC$_5$H$_{11}$
D-332
—COOC$_6$H$_{13}$
D-333
—COO(CH$_2$)$_2$OCOCH=CH$_2$
D-334
—COO(CH$_2$)$_3$OCOCH=CH$_2$
D-335
—COO(CH$_2$)$_4$OCOCH=CH$_2$
D-336
—COO(CH$_2$)$_5$OCOCH=CH$_2$
D-337
—COO(CH$_2$)$_6$OCOCH=CH$_2$
D-338
—COO(CH$_2$)$_7$OCOCH=CH$_2$
D-339
—COO(CH$_2$)$_8$OCOCH=CH$_2$
D-340

-continued
—COO(CH$_2$CH$_2$O)$_2$COCH=CH$_2$
D-341
—COO(CH$_2$)$_2$CH(CH$_3$)OCOCH=CH$_2$
D-342
—COO(CH$_2$)$_3$CH(CH$_3$)OCOCH=CH$_2$
D-333
—COO(CH$_2$)$_4$CH(CH$_3$)OCOCH=CH$_2$
D-334
—COOCH$_2$CH(CH$_3$)CH$_2$OCOCH=CH$_2$
D-335
—COO(CH$_2$)$_2$CH(CH$_3$)(CH$_2$)$_2$OCOCH=CH$_2$
D-336
—COOCH(CH$_3$)(CH$_2$)$_2$OCOCH=CH$_2$
D-337
—COO(CH$_2$)$_5$OCOC=CH$_2$
      |
      CH$_3$
D-338
—COO(CH$_2$)$_4$OCH=CH$_2$
D-339
—COO(CH$_2$)$_4$—CH—CH$_2$
              \ /
               O
D-340

The liquid crystalline compound used for preparing the optically anisotropic layer preferably exhibits a liquid crystal phase showing a desirable mono-domain property. A poor level of mono-domain property makes the resultant structure poly-domain-like, results in alignment defect at the boundary of the adjacent domains, and causes scattering of light. A good level of mono-domain property makes the retardation plate more likely to have large transmittance of light.

Columnar phase and discotic nematic phase (ND phase) can be exemplified as the liquid crystal phase developed by the liquid crystalline compound used for preparing the optically anisotropic layer. Of these liquid crystal phases, the discotic nematic phase (ND phase) showing a desirable mono-domain property is most preferable.

The liquid crystalline compound used for preparing the optically anisotropic layer preferably exhibits the liquid crystal phase within the range from 20° C. to 300° C., the range being more preferably from 40° C. to 280° C., and most preferably from 60° C. to 250° C. It is to be understood that examples of the liquid crystal phase developed at 20° C. to 300° C. also include any liquid crystal phases having the liquid-crystallinity temperature range which lies over 20° C. (for example, the range between 10° C. and 22° C.), and lies over 300° C. (for example, the range between 298° C. and 310° C.). The same is applicable to the ranges from 40° C. to 280° C. and from 60° C. to 250° C.

According to the present invention, molecules of the rod-like compound or the disc-like compound in the optically anisotropic layer are preferably fixed so as to keep the aligned state. The mean alignment direction of the molecular symmetry axis of the liquid crystalline compound at the interface on the cellulose acylate film side crosses the in-plane slow axis of the cellulose acylate film at an angle approximately 45°. It is to be understood that, in this description, "approximately 45°" means a range of 45°±5°, preferably 42 to 48°, and more preferably 43 to 47°. The mean alignment direction of the molecular symmetry axis of the liquid crystalline compound in the optically anisotropic layer is preferably 43° to 47° away from the longitudinal direction of the support (that is, direction of the fast axis of the support).

The mean alignment direction of the molecular symmetry axis of the liquid crystalline compound is adjustable generally by selecting the liquid crystalline compound or the material composing the alignment layer, or by selecting direction of rubbing. According to the invention, the optically anisotropic layer may be produced on an alignment layer which is produced by a rubbing treatment, and in such a case, the optically anisotropic layer, in which the mean alignment direction of the molecular symmetry axis of the liquid crystalline compound at least at the interface with a support inclined 45° away from the slow axis of the support, can be prepared by using an alignment layer which is produced by a rubbing treatment carried out in the direction 45° inclined away from the slow axis of the polymer film (preferably cellulose acylate film) which serves as the support. More specifically, a web-form optical compensation film can continuously be produced by continuously applying a coating liquid for forming to an alignment layer on the surface of the web-form polymer film so as to form a layer, by continuously rubbing the surface of the layer in the direction inclined 45° away from the longitudinal direction so as to produce an alignment layer, and by continuously applying a coating liquid for forming an optically anisotropic layer, containing a liquid crystalline compound to thus-produced alignment layer, making molecules of the liquid crystalline compound aligned and fixed in this state. The optical compensation film produced in a form of web is then cut according to a desired geometry, before being integrated into the liquid crystal display device.

As for the mean alignment direction of the molecular symmetry axis of the liquid crystalline on the surface side (air side), the mean alignment direction of the molecular symmetry axis of the liquid crystalline on the air interface side is preferably adjusted as being inclined approximately 45° away from the slow axis of the support such as a cellulose acylate film, more preferably 42° to 48°, and still more preferably 43° to 47°. The mean alignment direction of alignment of the molecular symmetry axis of the liquid crystalline compound on the air interface side is adjustable generally by selecting species of liquid crystalline compound or additives used together with the liquid crystalline compound. Examples of the additives used together with the liquid crystalline compound include plasticizer, surfactant, polymerizable monomer and polymer. Also variation degree in the alignment direction of the molecular symmetry axis is adjustable by selecting the liquid crystalline compound and the additives, similarly to as described in the above. It is preferable in particular for the surfactant to be compatible with control of surface tension of the above-described coating liquid.

The plasticizer, the surfactant and the polymerizable monomer used together with the liquid crystalline compound are preferably such as those compatible with discotic liquid crystalline compound, and capable of causing variation in the tilt angle of the liquid crystalline compound, or not inhibiting the alignment. The polymerizable monomer (for example, compounds having a vinyl group, vinyloxy group, acryloyl group and methacryloyl group) are preferable. Amount of addition of the above-described compounds generally falls within the range from 1 to 50% by mass of the liquid crystalline compound, preferably in the range from 5 to 30% by mass. Mixing of a monomer having 4 or more polymerizable reactive functional groups can further improve close contactness between the alignment layer and the optically anisotropic layer.

For the case where the discotic liquid crystalline compound is used as the liquid crystalline compound, it is preferable to use a polymer having a certain level of compatibility with the discotic liquid crystalline compound and being capable of varying the tilt angle of the discotic liquid crystalline compound.

Examples of such polymer include cellulose esters. Examples of the cellulose ester include cellulose acetate, cellulose acetate propionate, hydroxypropyl cellulose and cellulose acetate butyrate. The amount of addition of the polymer falls within the range from of 0.1 to 10% by mass of the discotic liquid crystalline compound, so as not to inhibit alignment of the discotic liquid crystalline compound, more preferably in the range from 0.1 to 8% by mass, and still more preferably in the range from 0.1 to 5% by mass.

Discotic/nematic liquid crystal phase-solid phase transition temperature of the discotic liquid crystalline compound preferably falls within the range from 70 to 300° C., and more preferably 70 to 170° C.

In the present invention, the optically anisotropic layer has at least in-plane optical anisotropy. The in-plane retardation Re of the optically anisotropic layer is preferably 5 to 200 nm, and more preferably 10 to 100 nm. The in thickness-direction retardation Rth of the optically anisotropic layer is preferably 20 to 400 nm, and more preferably 50 to 200 nm. The thickness of the optically anisotropic layer is preferably 0.1 to 20 μm, more preferably 0.5 to 15 μm, and still more preferably 1 to 10 μm.

According to the present invention, wavelength-dependence of the optically anisotropic layer may be adjusted as being equal to wavelength-dependence at 400 nm and 550 nm of liquid crystal cell in the black state. As described in the above, an OCB mode liquid crystal cell, for example, generally has a $\alpha 1 = Re1(400)/Re1(550)$ of 1.0 to 1.2 or around in the black state. In view of satisfying the aforementioned relational expression (1), it is therefore preferable to adjust $\alpha 2 = Re2(400)/Re2(550)$ of the optically anisotropic layer to 0.9 to 1.3 or around, more preferably smaller than 1.2, and still more preferably smaller than 1.18.

One exemplary method of adjusting wavelength-dependence of the optically anisotropic layer is a method of preparing the optically anisotropic layer using a composition comprising two or more liquid crystalline compounds of which wavelength-dependence is different from each other. For example, it is preferable to prepare the optically anisotropic layer using a composition comprising a discotic liquid crystalline compound represented by the above-described formula (A) and at least one species of liquid crystalline compound represented by the above-described formula (DI). Although preferable range of molar ratio of the discotic liquid crystalline compound represented by the formula (A) and the compound represented by the formula (DI) varies depending on species of the compounds to be employed, it is generally preferable that the ratio is equal to or smaller than 10/90, and more preferably equal to or smaller than 5/95.

Wavelength dependence of a liquid crystalline compound it self can be measured based on retardation of a film of cured the compound while molecules are kept in any state of hybrid alignment, horizontal alignment and vertical alignment. Preferably, a plurality of liquid crystalline compounds of which wavelength-dependence measured by such method is different from each other are employed, and more preferably, those having $\alpha 2$ values independently measured by such method of 1.2 or larger and smaller than 1.2, are employed.

Replacing the above-described method, or adding to the above-described method, adjusting ratio of mixing of the liquid crystalline compound and the non-liquid crystalline compound may be carried out for adjusting wavelength-dependence of the optically anisotropic layer within the preferred range. It is preferable to use at least one species of the compounds represented by the formula (I) or the formula (DI) as the liquid crystalline compound, and at least one species of compound represented by the formula (I) or the formula (DI) showing no liquid crystallinity alone. Preferable molar ratio of the liquid crystalline compound and the non-liquid crystalline compound varies depending on species of the compounds to be adopted, wherein it is generally preferable to adjust the content of the non-liquid crystalline compound to 10% or below, and more preferably 5% or below.

Replacing two above-described methods, or adding to at least one of two above-described methods, adjusting viscosity of the composition in the process of aligning the liquid crystalline molecules may be carried out for adjusting wavelength-dependence of the optically anisotropic within the preferable range. More specifically, when the optically anisotropic layer is produced by aligning molecules of the liquid crystalline compound in the composition at T° C., the composition is preferably prepared so as to adjust the viscosity at T° C. thereof to 1,500 mPa·s or smaller. The viscosity at T° C. is more preferably equal to or smaller than 1,200 mPa·s, and still more preferably equal to or smaller than 1,000 mPa·s. By aligning liquid crystalline molecules within such viscosity range, time necessary for the alignment can be reduced, and productivity of the film can desirably be improved.

(Support)

The optical compensation film of the present invention may comprise a support. The support is preferably selected from polymer films. It is also preferable for the support to be transparent, and more specifically to have a transmittance of light of 80% or above. Examples of polymer composing the polymer film include cellulose ester (e.g., cellulose acetate, cellulose diacetate), norbornene-base polymer and polymethyl methacrylate. Also commercially available polymers (norbornene-base polymer are available under the trade names of Arton and Zeonex) may be used.

Among these, cellulose ester film is preferable, and lower aliphatic acid ester of cellulose is further preferable. The lower aliphatic acid herein means any aliphatic acid having 6 or smaller number of carbon atoms. The number of carbon atoms of 2 (cellulose acetate), 3 (cellulose propionate) or 4 (cellulose butyrate) is particularly preferable. Cellulose acetate is particularly preferable. Mixed aliphatic acid esters such as cellulose acetate propionate and cellulose acetate butyrate are also adoptable.

Even polymers likely to exhibit birefringence, such as conventionally known polycarbonate and polysulfone are adoptable to the optical film of the present invention, if expression of birefringence is controlled by modifying the molecules, as described in International Patent WO00/26705.

When the optical compensation film of the present invention is used for the polarizing plate protective film or the retardation film, cellulose acetate having a degree of acetylation of 55.0 to 62.5% is preferably used as the polymer film. The degree of acetylation is more preferably 57.0 to 62.0%.

The degree of acetylation means amount of acetic acid bound to a unit mass of cellulose. The degree of acetylation can be determined by measurement and calculation of degree of acetylation conforming to ASTM:D-817-91 (test methods of cellulose acetate, etc.).

Viscosity-average degree of polymerization (DP) of the cellulose acetate is preferably 250 or above, and more preferably 290 or above. Cellulose acetate preferably has a narrow molecular weight distribution in terms of Mw/Mn (Mw is weight-average molecular weight, and Mn is number-average molecular weight) determined by gel permeation chromatography. Specific value of Mw/Mn is preferably 1.0 to 1.7, more preferably 1.0 to 1.65, and most preferably 1.0 to 1.6.

Cellulose acetate shows a tendency of being less likely to be substituted at the 6-position, rather than being uniformly substituted at the 2-position, 3-position and 6-position of cellulose. The polymer film used in the present invention more preferably has the degree of substitution at the 6-position equivalent to, or larger than the degrees of substitution at the 2-position and the 3-position.

Ratio of the degree of substitution at the 6-position relative to the total degree of substitution at the 2-, 3- and 6-positions is preferably 30 to 40%, more preferably 31 to 40%, and most preferably 32 to 40%. The degree of substitution at the 6-position is preferably 0.88 or above.

The degree of substitution at the individual positions can be measured by NMR.

Cellulose acetate having a large degree of substitution at the 6-position can be synthesized, referring to the methods described in Japanese Laid-Open Patent Publication No. H11-5851, exemplary synthesis described in paragraphs [0043] to [0044], exemplary synthesis 2 described in paragraphs [0048] to [0049], and exemplary synthesis described in paragraphs [0051] to [0052].

The support preferably has Re3/Rth3(450 nm), which is ratio of Re3 to Rth3 at 450 nm, 0.4 to 0.95 times as small as ratio Re3/Rth3(550 nm) at 550 nm, and has Re3/Rth3 (650 nm) at 650 nm 1.05 to 1.9 times as large as Re3/Rth3(550 nm). For the case where the a cellulose acetate film is employed as a support, the cellulose acetate film having such optical characteristics can be produced by adding a retardation enhancer described below to the film.

(Retardation Enhancer)

The term "retardation enhancer" in this description means an "additive" capable of making Re retardation value measured at 550 nm of a cellulose acylate film containing such additive larger by 20 nm or more than Re retardation value measured at 550 nm of a cellulose acylate film (in an unstretched state) similarly produced only except that such additive is not used. Increase of the retardation value is preferably equal to or more than 30 nm, more preferably equal to or more than 40 nm, and most preferably equal to or more than 60 nm.

The retardation enhancer is preferably selected from compounds having at least two aromatic rings. The retardation enhancer is preferably used within the range from 0.01 to 20 parts by mass per 100 parts by mass of polymer, more preferably from 0.1 to 10 parts by mass, still more preferably 0.2 to 5 parts by mass, and most preferably from 0.5 to 2 parts by mass. Two or more retardation enhancers may be used in combination.

The retardation enhancer preferably has a maximum absorption in the wavelength region from 250 to 400 nm, and substantially no absorption in the visible light region.

Specific examples of the retardation enhancer can be exemplified by those described on pages 6 to 18 of Japanese Laid-Open Patent Publication No. 2001-166144.

(Alignment Layer)

The optical compensation film of the present invention may comprise an alignment layer between the support and the optically anisotropic layer. The alignment layer may be used only in the process of producing the optically anisotropic layer, in such a way that the optically anisotropic layer is formed on the alignment layer, and thereafter only the optically anisotropic layer is transferred onto the support.

In the present invention, the alignment layer is preferably a layer composed of a cross-linked polymer. The polymer adoptable to the alignment layer may be those capable of polymerizing by themselves, or may be those crosslinkable with the aid of a crosslinking agent. The alignment layer can be formed by allowing polymers, having functional groups naturally or later introduced therein, to react with each other with the aid of light, heat or PH change; or, by crosslinking the polymers using a crosslinking agent, which is a highly reactive compound, so as to introduce linking group derived from the crosslinking agent between the polymers.

The alignment layer composed of a crosslinked polymer can be formed generally by applying a coating liquid which contains polymer or a mixture of polymer and a crosslinking agent to the support, followed by heating or the like.

In the process of rubbing described later, it is preferable to preliminarily raise the degree of crosslinkage so as to suppress dusting from the alignment layer. Defining now the degree of crosslinkage as a value $(1-(Ma/Mb))$ obtained by subtracting ratio $(Ma/Mb)$ of amount of crosslinking agent $(Mb)$ remained after the crosslinkage relative to the amount of crosslinking agent $(Ma)$ added to the coating liquid, from 1, the degree of crosslinkage is preferably 50% to 100%, more preferably 65% to 100%, and still more preferably 75% to 100%.

In the present invention, polymers adoptable to the alignment layer may be either of those capable of crosslinking themselves, or those crosslinkable by a crosslinking agent. Polymer having both functions may be used of course. Examples of the polymers include polymers such as polymethyl methacrylate, acrylate/methacrylate copolymer, styrene/maleimide copolymer, polyvinyl alcohol and modified polyvinyl alcohol, poly(N-methylol acrylamide), styrene/vinyltoluene copolymer, chlorosulfonated polyethylene, nitro cellulose, polyvinyl chloride, chlorinated polyolefin, polyester, polyimide, vinyl acetate/vinyl chloride copolymer, ethylene/vinyl acetate copolymer, carboxymethyl cellulose, gelatin, polyethylene, polypropylene and polycarbonate, and compounds such as silane coupling agent. Examples of preferable polymers include water-soluble polymers such as poly (N-methylol acrylamide), carboxymethyl cellulose, gelatin, polyvinyl alcohol and modified polyvinyl alcohol, among which gelatin, polyvinyl alcohol and modified polyvinyl alcohol are preferable, and polyvinyl alcohol and modified polyvinyl alcohol are particularly preferable.

When polyvinyl alcohol and modified polyvinyl alcohol are coated directly onto the surface of the cellulose acylate film or the like as the support, methods of providing a hydrophilic undercoat layer, or of carrying out saponification as described in the description of Japanese Patent Application No. 2000-369004 are preferably adopted.

Among the polymers exemplified in the above, polyvinyl alcohol or modified polyvinyl alcohol is preferable.

Known polyvinyl alcohols have the degree of saponification of 70 to 100%, wherein those having the degree of saponification of 80 to 100% are generally preferable, and those having the degree of saponification of 82 to 98% are more preferable. The degree of polymerization preferable falls in the range from 100 to 3000.

Modified polyvinyl alcohol include those modified by copolymerization (for example, COONa, $Si(OX)_3$, $N(CH_3)_3$.Cl, $C_9H_{19}COO$, $SO_3Na$, $C_{12}H_{25}$ or the like is introduced as a modifying group), those modified by chain transfer (for example, COONa, SH, $SC_{12}H_{25}$ or the like is introduced as a modifying group), those modified by block polymerization (for example, COOH, $CONH_2$, COOR, $C_6H_5$ or the like is introduced as a modifying group). The degree of polymerization preferably falls in the range from 100 to 3000. Among these, unmodified or modified polyvinyl alcohol having a degree of saponification of 80 to 100% is preferable, and unmodified or alkylthio-modified polyvinyl alcohol having a degree of saponification 85 to 95% is more preferable.

As the modified polyvinyl alcohol used for the alignment layer, a reaction product of a compound represented by the formula (6) below and polyvinyl alcohol is preferable.

Formula (6):

[Formula 59]

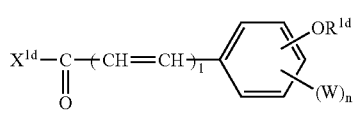

In the formula, $R^{1d}$ represents a non-substituted alkyl group, or an alkyl group substituted by an acryloyl group, methacryloyl group or epoxy group, W represents a halogen atom, alkyl group or alkoxy group, $X^{1d}$ represents an atomic group necessary for forming activated ester, acid anhydride or acid halide, l represents 0 or 1, and n expresses an integer from 0 to 4.

As the modified polyvinyl alcohol used for the alignment layer, also a reaction product of a compound represented by the formula (7) below and polyvinyl alcohol is also preferable.

Formula (7):

[Formula 60]

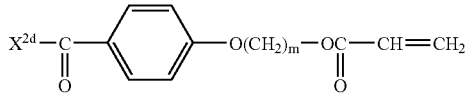

In the formula, $X^{2d}$ represents an atomic group necessary for forming an activated ester, acid anhydride or acid halide, and m represents an integer from 2 to 24.

The polyvinyl alcohol employed to be reacted with the compounds expressed by the aforementioned formula (6) and formula (7) include the unmodified polyvinyl alcohol and those modified by copolymerization, which are modified products of polyvinyl alcohol such as those modified by chain transfer, those modified by block polymerization, and so forth. Preferable examples of the specific modified polyvinyl alcohol are detailed in Japanese Laid-Open Patent Publication No. H8-338913.

When a hydrophilic polymer such as polyvinyl alcohol or the like is used for the alignment layer, it is preferable, from the viewpoint of hardness of the film, to control moisture content of the film, wherein 0.4% to 2.5% is preferable, and 0.6% to 1.6% is more preferable. The moisture content can be measured by a commercially available moisture meter based on the Karl Fischer's method.

The alignment layer preferably has a thickness of 10 μm or smaller.

The optical compensation film of the present invention may be integrated into a liquid crystal display device or the like, after being integrated with the polarizing plate by bonding to the polarizing film. In this case, it is preferable that the support of the optical compensation film, which is composed of a polymer film or the like, also serves as a protective film of the polarizing film, in terms of reducing the thickness of the liquid crystal display device.

[Polarizing Plate]

The polarizing plate is obtained generally by dying the polarizing film, typically composed of a polyvinyl alcohol film, using iodine, by stretching, and by being stacked with protective films on both surfaces thereof. The polarizing plate is disposed outside the liquid crystal cell. In the present invention, a pair of polarizing plates each composed of a polarizing film and a pair of protective films holding the polarizing film in between are preferably disposed so as to hold the liquid crystal cell in between. Alternatively, as described in the above, the protective film disposed on the liquid crystal cell side may be the optical compensation film of the present invention.

<<Adhesive>>

The adhesive used between the polarizing film and the protective film is not specifically limited, wherein PVA-base resin (including PVA modified with acetoacetyl group, sulfonic acid group, carboxyl group, oxyalkylene group or the like) and aqueous solution of boron compound can be exemplified, and among these, PVA-base resin is preferable. Thickness of the adhesive layer is preferably 0.01 to 10 μm in the dried state, and 0.05 to 5 μm is particularly preferable.

<<Consecutive Producing Process of Polarizing film and Transparent Protective Film>>

Process of producing the polarizing plate applicable to the present invention includes a drying process allowing the stretched polarizing film-forming film to shrink and to lower the volatile content, and preferably includes a process of bonding a transparent protective film on at least one surface thereof after or during the drying, followed by post-heating. In the embodiment where the transparent protective film also serves as a support of the optically anisotropic layer which functions as a transparent film, it is preferable to bond the transparent support having the transparent protective film on one surface, and the optically anisotropic layer on the opposite surface thereof, followed by the post-heating. Specific examples of bonding include a method of bonding, in the course of drying process of the film, the transparent protective film to the polarizing film using an adhesive while holding both ends of the film, followed by slitting of both ends thereof; and a method of bonding the transparent protective film to the polarizing film which has been released, after being dried, from the holder at both ends thereof and slit on both ends thereof. The slitting may be carried out by any general method such as those using a cutting tool such as cutter, and using laser beam. The bonded product is preferably heated after the bonding, in order to dry the adhesive, or to improve the polarization performance. Heating conditions may vary depending on the adhesive used herein, wherein heating at 30° C. or above is preferable, 40° C. to 100° C. is more preferable, and 50° C. to 90° C. is still more preferable. It is more preferable to carry out these processes in a through-producing line, in view of performance and production efficiency.

<<Performance of Polarizing Plate>>

Optical characteristics and durability (short-term and long-term storabilities) of the polarizing plate relevant to the present invention, composed of the transparent protective film, the polarizer and the transparent support, preferably has performances equivalent to, or superior to those of a commercially-available, super-high-contrast product (for example, HLC2-5618 from Sanritz Corporation). More specifically, the polarizing plate preferably has a transmittance of visible light of 42.5% or more, a degree of polarization $\{(Tp-Tc)/(Tp+Tc)\}^{1/2}$ of 0.9995 or more (where, Tp is parallel transmittance, and Tc is orthogonal transmittance), shows a rate of change of transmittance, before and after the polarizing plate was placed under an environment of 60° C., 90% RH for 500 hours, and under a dry environment at 80° C. for 500 hours, of 3% or below on the basis of absolute value, more preferably 1% or below, and shows a rate of change of degree of polarization of 1% or below on the basis of absolute value, and more preferably 0.1% or below.

EXAMPLES

Paragraphs below will more specifically describe the present invention referring to Examples and Comparative Examples. Any materials, reagents, amount and ratio of use and operations shown in Examples may appropriately be modified without departing from the spirit of the present invention. It is therefore understood that the present invention is by no means limited to specific Examples below.

Example 1

Preparation of Optical Compensation Film (Samples 001 to 010)

<Preparation of Cellulose Acetate Film>

Individual ingredients of a cellulose acetate solution composition, shown below, were placed into a mixing tank, stirred under heating so as to dissolve them, to thereby prepare a cellulose acetate solution.

| (Composition of Cellulose Acetate Solution) | |
|---|---|
| Cellulose acetate, degree of acetylation 60.9% | 83 parts by mass |
| Cellulose acetate, degree of acetylation 55.0% | 17 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 318 parts by mass |
| Methanol (second solvent) | 47 parts by mass |

In a separate mixing tank, 16 parts by mass of retardation enhancer shown below, 0.1 to 32 parts by mass of dispersion adjusting agent UV-102 shown below, 87 parts by mass of methylene chloride and 13 parts by mass of methanol were placed, stirred under heating, to thereby prepare a retardation controlling agent solution.

Thirty-six parts by mass of the aforementioned retardation controlling (enhancing) agent solution was added to 474 parts by mass of cellulose acetate solution, and thoroughly stirred to thereby prepare a dope. The amount of addition of the retardation controlling agent was 5.0 parts by mass per 100 parts by mass of cellulose acetate.

[Formula 61]

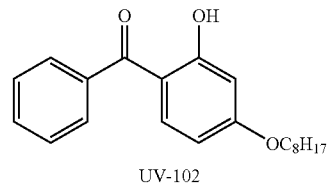

UV-102

[Formula 62]

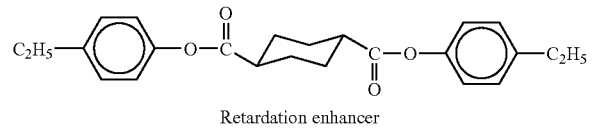

Retardation enhancer

The obtained dope was cast using a band casting machine. The film having a residual solvent content of 15% by mass was transversely stretched at 130° C., using a tenter by a factor of stretching of 3 to 100%, to thereby manufacture a cellulose acetate film (80 μm thick)

The produced cellulose acetate film (optical compensation film) was measured for Re retardation value and Rth retardation value using an ellipsometer (M-150, from JASCO Corporation).

By adding 0.1 to 10% by mass of the above-described dispersion adjusting agent UV-102 under a factor of stretching of 3 to 100% according to the method described in the above, cellulose acetate films PK-1 and PK-2 shown in Table 1, having Re values in the range from 0 to 50 nm, and Rth values in the range from 70 to 400 nm were respectively obtained.

TABLE 1

| | Wavelength 450 nm | | | Wavelength 550 nm | | | Wavelength 650 nm | | | Re450/Rth450 | Re650/Rth650 |
|---|---|---|---|---|---|---|---|---|---|---|---|
| | Re(nm) | Rth(nm) | Re/Rth | Re(nm) | Rth(nm) | Re/Rth | Re(nm) | Rth(nm) | Re/Rth | Re550/Rth550 | Re550/Rth550 |
| PK-1 | 47 | 165 | 0.28 | 45 | 160 | 0.28 | 43 | 157 | 0.27 | 1.01 | 0.97 |
| PK-2 | 35 | 167 | 0.21 | 45 | 160 | 0.28 | 56 | 148 | 0.38 | 0.75 | 1.35 |

(Preparation of Optically Anisotropic Layer)

To the surface of the triacetyl cellulose film (PK-1) produced as described in the above, a 1.0 N potassium hydroxide solution (solvent:water/isopropanol/propylene glycol=69.2 parts by mass/15 parts by mass/15.8 parts by mass) was applied by an amount of 10 ml/m$^2$, the film was kept at approximately 40° C. for 30 seconds, the alkali solution was wiped off, the film was washed with pure water, and water droplets were removed using an air knife. The film was then dried at 100° C. for 15 seconds.

(Preparation of Alignment Layer)

To the surface of the above-described triacetyl cellulose film PK-1 (alkali treated surface), a coating liquid for forming alignment layer having a composition shown below was applied by an amount of 28 ml/m$^2$ using a #16 wire bar coater. The coated film was dried under hot air at 60° C. for 60 seconds, and further under hot air at 90° C. for 150 seconds, to thereby obtain a film.

| Composition of Alignment layer Coating Liquid | |
|---|---|
| Modified polyvinyl alcohol, below | 10 parts by mass |
| Water | 371 parts by mass |
| Methanol | 119 parts by mass |
| Glutaraldehyde (cross-linking agent) | 0.5 parts by mass |
| Citrate ester (AS3, from Sankyo Chemical Co., Ltd.) | 0.35 parts by mass |

[Formula 63]

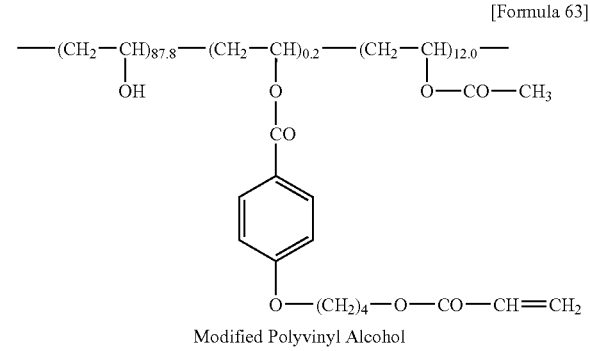

Modified Polyvinyl Alcohol (Rubbing Treatment)

The above-described triacetyl cellulose film PK-1 was allowed to travel at a speed of 20 m/min, a rubbing roll (300 mm in diameter) was set so as to effect rubbing in the direction 45° away from the longitudinal direction, allowed to rotate at 650 rpm so as to rub the surface of the film formed on PK-1, and thereby the alignment layer was formed. Length of contact with the rubbing roll was adjusted to 18 mm.

(Forming of Optically Anisotropic Layer)

A coating liquid for forming optically anisotropic layer having a composition shown below was continuously applied to the rubbed surface of the alignment layer, fed at a speed of 20 m/min, while rotating a #3.0 wire bar at 391 rpm in the same direction with the direction of feeding of the film.

| | |
|---|---|
| Discotic liquid crystalline compound (A) | 91.00 parts by mass |
| Ethylene oxide-modified trimethylolpropane triacrylate (V#360, from Osaka Organic Chemical Industry, Ltd.) | 9.00 parts by mass |
| Cellulose acetate butyrate (CAB531-1, from Eastman Chemical Company) | 1.00 part by mass |
| Photo-polymerization initiator (Irgacure 907, from Ciba Geigy AG) | 3.00 parts by mass |
| Sensitizer (Kayacure DETX, from Nippon Kayaku Co., Ltd.) | 1.00 part by mass |
| Fluoroaliphatic-group-containing copolymer (Megafac F780, from Dainippon Ink and Chemicals, Inc.) | 0.22 parts by mass |
| Methyl ethyl ketone | 226.34 parts by mass |

[Formula 64]
Discotic Liquid Crystalline Compound (A)

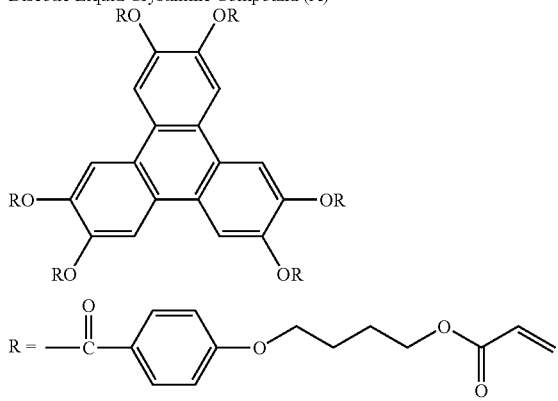

The solvent was dried in the process of continuous heating from room temperature to 100° C., and the product was then heated in a 120° C. drying zone for approximately 120 seconds, under an air blow rate on the surface of the discotic liquid crystal compound layer adjusted to 2.5 m/sec, so as to align the discotic liquid crystal compound. Next, the product was transferred to a 80° C. drying zone, and ultraviolet radiation was irradiated using an ultraviolet irradiation device (UV lamp: output=160 W/cm, length of emission=1.6 m) at a luminance of 600 mW for 4 seconds, while keeping the surface temperature of the film at approximately 100° C., so as to proceed crosslinking reaction to thereby fix the discotic liquid crystal compound to that alignment. The product was then allowed to cool to room temperature, and taken up in a cylindrical form to give a roll. The rolled-up optical compensation film (Sample 001) was thus produced.

A portion of thus-produced, rolled-up optical compensation film (Sample 001) was cut, and used as a sample for measurement of optical characteristics. Retardation value Re2(550 nm) of the optically anisotropic layer measured at 550 nm under an environment of 25° C., 55% RH was 30.0 nm, and retardation value Re2 (400 nm) measured at 400 nm was 45.0 nm. The $\alpha 2$ (=Re2(400 nm)/Re2(550 nm)) value was 1.5. It was found that the angle (tilt angle) between the disc plane of the discotic liquid crystal compound in the optically anisotropic layer and the surface of the substrate continuously varied in the depth-wise direction of the layer, showing a mean value of 30°. The mean alignment direction of the molecular symmetry axis of the optically anisotropic layer, which was peeled off from the sample, was measured as 45° away from the longitudinal direction of the optical compensation film. Viscosity of a liquid crystal mixture for coating, having a formulation same as that used for producing sample 001, measured using a type E viscometer, was 700 mPa·s at a temperature for alignment of 120° C.

Sample 002 was produced similarly to as Sample 001, except that the optically anisotropic layer was formed using a coating liquid for forming the optically anisotropic layer having the formulation below.

| | |
|---|---|
| Exemplary compound (4) | 100.00 parts by mass |
| Cellulose acetate butyrate (CAB531-1, from Eastman Chemical Company) | 1.00 part by mass |
| Photo-polymerization initiator (Irgacure 907, from Ciba Geigy AG) | 3.00 parts by mass |
| Sensitizer (Kayacure DETX, from Nippon Kayaku Co., Ltd.) | 1.00 part by mass |
| Fluoroaliphatic-group-containing copolymer (Megafac F780, from Dainippon Ink and Chemicals, Inc.) | 0.22 parts by mass |
| Methyl ethyl ketone | 226.34 parts by mass |

Also Samples 003 to 009 were similarly produced, except that 100 parts by mass of the exemplary compound (4) used for Sample 002 was replaced with the liquid crystal compounds shown in Table 2 below.

Still also Sample 010 was produced similarly to as Sample 002, except that triacetyl cellulose film PK-1 was replaced with triacetyl cellulose film PK-2.

As for these samples, retardation and viscosity of the liquid crystal mixture for coating were measured similarly to as Sample 001. Results were shown in Table 2 below.

Example 2

Preparation of Polarizing Plate

<Preparation of Polarizing Plate>

A stretched polyvinyl alcohol film was allowed for absorption of iodine to thereby manufacture the polarizing film, and the optical compensation film (Sample 001) produced in Example 1 was bonded to one surface of the polarizing film, using a polyvinyl alcohol-base adhesive. The transmission axis of the polarizing film and the slow axis of the retardation plate were aligned in parallel with each other.

A commercially-available cellulose triacetate film (Fujitac TD80UF, from FUJIFILM Corporation) was saponified, and bonded on the opposite side of the polarizing film, using a polyvinyl alcohol-base adhesive. The polarizing plate was thus produced.

Polarizing plates were similarly produced except that Sample 001 was replaced respectively with sample 002 to sample 011.

Example 3

On-Device Evaluation in Liquid Crystal Display Device (Production of Bend-Aligned Liquid Crystal Cell)

A polyimide film was provided as an alignment layer to a glass substrate having ITO electrodes formed thereon, and the alignment layer was rubbed. Two thus-obtained glass substrates were opposed so as to align the direction of rubbing in parallel with each other, and the cell gap was adjusted to 4.0 µm. A liquid crystalline compound (ZLI1132, from MERCK) having $\Delta n$ of 0.1396 was injected into the gap, to thereby produce a bend-aligned liquid crystal cell.

Two produced polarizing plates were bonded to the bend-aligned cell so as to hold it in between, while making the optically anisotropic layers of the polarizing plates contacted with the cell substrates, and making the direction of rubbing of the liquid crystal cell aligned anti-parallel to the direction of rubbing of the optically anisotropic layer contacted therewith.

A rectangular wave voltage of 55 Hz was applied to the liquid crystal cell, while adopting a normally-white mode with a white level of 2 V and a black level of 5 V. Voltage causing a minimum transmittance in the front view, that is, black state voltage, was determined. Retardation (Re1) of the liquid crystal cell before being bonded with the polarizing plates was measured at 400 nm and 550 nm, while applying the black state voltage determined in the above. It was found that $\alpha 1$=Re1(400 nm)/Re1(550 nm) was 1.2.

Regarding each liquid crystal cell combined with each of the polarizing plates produced using each of the above-described Samples 001 to 011, transmittance (%) in the black state at a viewing angle of [azimuth=0° and polar angle=60°], and color shift $\Delta x$ between viewing angles [azimuth=0° and polar angle=60°] and [azimuth=180°, polar angle=60°] were determined. Results are shown in Table 2.

TABLE 2

| Sample | α2/α1 | α2 | Liquid crystalline compound 1 | | Liquid crystalline compound 2 | | Support | η (mPa·s) | Ripening temperature Temp (°C.) | Time of alignment Time(s) | Transmittance % | Color shift Δx | Remarks |
|---|---|---|---|---|---|---|---|---|---|---|---|---|---|
| 001 | 1.25 | 1.5 | Compound (A) | 91 parts by mass | — | — | PK-1 | 700 | 120 | 120 | 0.03 | 0.110 | Comparative Example |
| 002 | 1.02 | 1.22 | Compound (4) | 100 parts by mass | — | — | PK-1 | 6000 | 108 | 2000 | 0.02 | 0.080 | Comparative Example |
| 003 | 1.11 | 1.33 | Compound (A) | 50 parts by mass | D-337 | 50 parts by mass | PK-1 | 2000 | 120 | 1200 | 0.03 | 0.100 | Comparative Example |
| 004 | 0.96 | 1.15 | D-337 | 80 parts by mass | D-112 | 20 parts by mass | PK-1 | 600 | 115 | 45 | 0.01 | 0.054 | Invention |
| 005 | 0.97 | 1.16 | D-337 | 50 parts by mass | D-112 | 50 parts by mass | PK-1 | 600 | 115 | 45 | 0.01 | 0.055 | Invention |
| 006 | 1.02 | 1.22 | D-337 | 80 parts by mass | Compound (A) | 20 parts by mass | PK-1 | 1200 | 100 | 300 | 0.02 | 0.080 | Invention |
| 007 | 0.99 | 1.19 | D-337 | 90 parts by mass | Compound (A) | 10 parts by mass | PK-1 | 900 | 110 | 150 | 0.01 | 0.076 | Invention |
| 008 | 1.09 | 1.31 | D-337 | 50 parts by mass | D-218 | 50 parts by mass | PK-1 | 700 | 120 | 60 | 0.02 | 0.085 | Invention |
| 009 | 0.98 | 1.18 | D-92 | 100 parts by mass | — | — | PK-1 | 2000 | 90 | 1800 | 0.01 | 0.071 | Comparative Example |
| 010 | 0.99 | 1.19 | D-337 | 50 parts by mass | D-112 | 50 parts by mass | PK-2 | 600 | 115 | 45 | 0.01 | 0.030 | Invention |
| 011 | 0.96 | 1.16 | D-337 | 90 parts by mass | Compound (4) | 10 parts by mass | PK-1 | 990 | 110 | 150 | 0.01 | 0.062 | Invention |

(Note)
Transmittance: transmittance (%) in the black state as viewed at an angle of view of [azimuth = 0° and polar angle = 60°].
Color shift: color shift Δx between angles of view of [azimuth = 0° and polar angle = 60°] and [azimuth = 180° and polar angle = 60°]

It is understandable from the results shown in Table 2 that the liquid crystal display devices of Examples which satisfy the Expression (1) $0.9 \leq \alpha2/\alpha1 \leq 1.1$ in the above were low in the transmittance in the black state, and small in color shift. All of the liquid crystal display devices of Examples showed excellent characteristics including low transmittance in the black state, and small in color shift, as compared with the liquid crystal display device of Comparative Example suffering from large mismatching of wavelength-dependence between the liquid crystal cell and the optically anisotropic layer.

From comparison between Sample 002 and Sample 0010, it is also understandable that use of cellulose acylate film PK-2 as a support, having wavelength-dependence fallen within a predetermined range, was more successful in moderating the viewing-angle-dependent color shift.

It is also understandable from the results shown in Table 2 that the optically anisotropic layer satisfying the equation in the above can be produced by using a plurality of liquid crystalline compounds of which wavelength-dependence is different from each other, by using a liquid crystalline compound represented by a predetermined structural formula, and/or by adjusting viscosity of the coating liquid when the liquid crystalline molecules are aligned.

Example 4

Preparation of Polymer Base

The composition below was placed in a mixing tank, stirred under heating at 30° C. so as to dissolve the individual ingredients, to thereby prepare a cellulose acetate solution.

| Composition of Cellulose Acetate Solution (parts by mass) | Inner layer | Outer layer |
|---|---|---|
| Cellulose acetate, degree of acetylation 60.9% | 100 | 100 |
| Triphenyl phosphate (plasticizer) | 7.8 | 7.8 |
| Biphenyl diphenyl phosphate (plasticizer) | 3.9 | 3.9 |
| Methylene chloride (first solvent) | 293 | 314 |
| Methanol (second solvent) | 71 | 76 |
| 1-Butanol (third solvent) | 1.5 | 1.6 |
| Silica particle (AEROSIL R972, from Nippon Aerosil Co., Ltd.) | 0 | 0.8 |
| Retardation enhancer, shown below | 1.7 | 0 |

[Formula 65]
Retardation enhancer

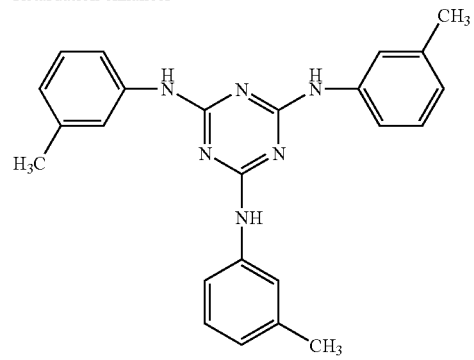

The obtained inner-layer-forming dope and the outer-layer-forming dope were cast using a triple layer co-casting die onto a drum cooled to 0° C. The film with a residual solvent content of 70% by mass was peeled off from the drum, fixed at both ends thereof using a pin tenter, dried at 80° C. while keeping the ratio of drawing in the travel direction to 110%, and dried at 110° C. after the residual solvent content fallen to 10%. The film was then dried at 140° C. for 30 minutes, to thereby produce a cellulose acetate film (outer layer: 3 μm, inner layer: 74 μm, outer layer: 3 μm) with a residual solvent content of 0.3% by mass. Optical characteristics of thus-produced cellulose acetate film were measured.

Width of thus-obtained polymer base was found to be 1,340 mm, and the thickness was found to be 80 μm. Retardation value (Re) measured at 500 nm using an ellipsometer (M-150, from JASCO Corporation) was 6 nm. Retardation value (Rth) measured at 500 nm in the thickness-wise direction was 83 nm.

The produced polymer base was immersed in a 2.0 N potassium hydroxide solution (25° C.) for 2 minutes, neutralized with sulfuric acid, rinsed with pure water, and dried.

The alignment layer was formed on the polymer base, similarly to as Sample 001 in Example 1. The alignment layer was subjected to a rubbing treatment before the coating liquid for forming optically anisotropic layer was applied. Peripheral speed of the rubbing roll in the rubbing was adjusted to 5.0 m/second, the angle of rubbing was adjusted to 6°, and the pushing pressure towards the resin layer for forming the alignment layer was adjusted to $9.8 \times 10^{-3}$ Pa.

bonded to the liquid crystal cell one by one on the observer's side and on the back light side thereof, while directing the optical compensation films to the liquid crystal cell side, using a pressure sensitive adhesive. The transmission axis of the polarizing plate on the observer's side and the transmission axis of the polarizing plate on the back light side were disposed so as to achieve O-mode.

Angle of view of thus-produced liquid crystal display device was measured over the range from the black state (L1) to the white state (L8), using a measuring instrument (BM-5A, from TOPCON Corporation). The viewing angle was determined as a range ensuring a ratio of contrast (transmittance in the white state/transmittance in the black state) of 10 or larger in the vertical and transverse directions, and causing no grayscale inversion on the black side (inversion in L1 and L2). Results of the measurement were shown in Table 3.

(Evaluation of Viewing Angle Dependence of Hue on Liquid Crystal Display Device Panel)

Entire surface of the display panel of the liquid crystal display device was turned into the black state, and shift in the hue as viewed in the normal direction and in the direction of 60° upward was evaluated ($\Delta u'v'1 \leq 0.045$ was represented by ○, and $\Delta u'v' > 0.045$ was represented by x). It is to be noted that $\Delta u'v'$ was decided using color difference on CIE1976 UCS chromaticity diagram as an index.

TABLE 3

| Sample | α2/α1 | α2 | Liquid crystalline compound 1 | | Liquid crystalline compound 2 | | Viewing angle (°) Top-Bottom | Viewing angle (°) Right-Left | Upward viewing angle color shift | Remarks |
|---|---|---|---|---|---|---|---|---|---|---|
| 101 | 1.25 | 1.5 | Compound (A) | 91 parts by mass | — | — | 160 | 160 | Δ | Comparative Example |
| 102 | 0.96 | 1.15 | D-337 | 80 parts by mass | D-112 | 20 parts by mass | 160 | 160 | ○ | Invention |
| 103 | 0.99 | 1.19 | D-337 | 90 parts by mass | Compound (A) | 10 parts by mass | 160 | 160 | ○ | Invention |

Samples 101, 102 and 103 of the optical compensation film were respectively formed similarly to as Samples 001, 004 and 007, except that the support of the optically anisotropic layer was altered to the above-described polymer film having the alignment layer thereon, and various characteristics of the optically anisotropic layer were similarly measured.

(Production of Polarizing Plate)

The optical compensation film produced in the above was bonded to one surface of the polarizer, using a polyvinyl alcohol-base adhesive. A triacetyl cellulose film (TD-80U: from FUJIFILM Corporation) of 80 um thick was saponified, and bonded to the opposite surface of the polarizer, using a polyvinyl alcohol-base adhesive.

The transmission axis of the polarizer and the slow axis of the polymer base, which is a support of the optical compensation film, were aligned in parallel with each other. The transmission axis of the polarizer and the slow axis of the triacetyl cellulose film were aligned normal to each other. The polarizing plate was thus produced.

(Evaluation in TN Liquid Crystal Cell)

A pair of polarizing plates provided to a liquid crystal display device (AQUOS LC20C1S, from SHARP Corporation) using a TN-type liquid crystal cell were peeled off, and instead the polarizing plates produced in the above were It is understandable from the results shown in Table 3 that the samples of the present invention were effective also in the TN-mode liquid crystal display device.

INDUSTRIAL APPLICABILITY

The present invention is to enable compensation of a liquid crystal cell, in particular OCB-type or TN-type liquid crystal cell, in the black state in the normal direction and in any viewing angle direction almost over the entire wavelength range, by using the optical compensation film of which wavelength-dependence of retardation is adapted to that of the liquid crystal cell in the black state. As a consequence, the liquid crystal display device of the present invention is distinctively improved in light leakage in the normal and oblique directions in the black state, in darkness in the normal direction, and viewing angle dependence of contrast. According to the liquid crystal display device of the present invention, it is possible to reduce light leakage in the normal and oblique directions in the black state, almost over the entire range of visible light region, and is therefore largely improved in viewing-angle-dependent color shift in the black state which is one of remaining problems.

Figure 1:
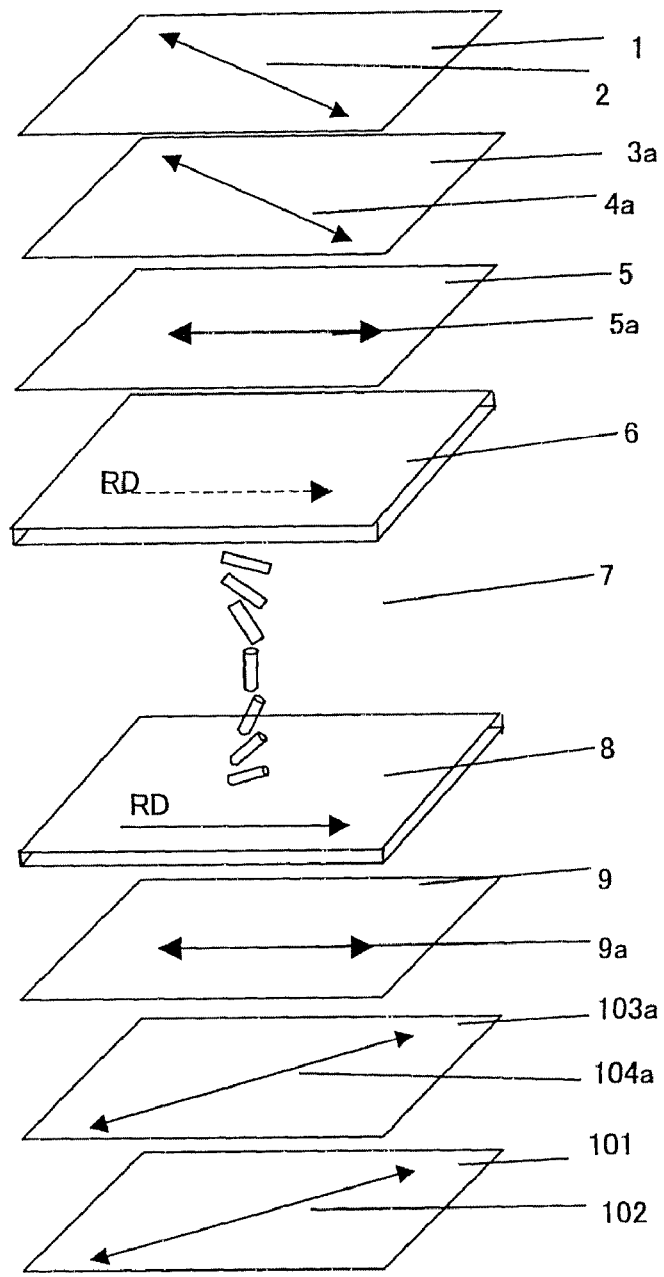
FIG. 1 It is a schematic drawing showing an example of an OCB-mode liquid crystal display device.
Figure 1:
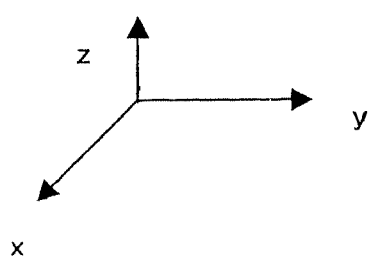
Figure 2:
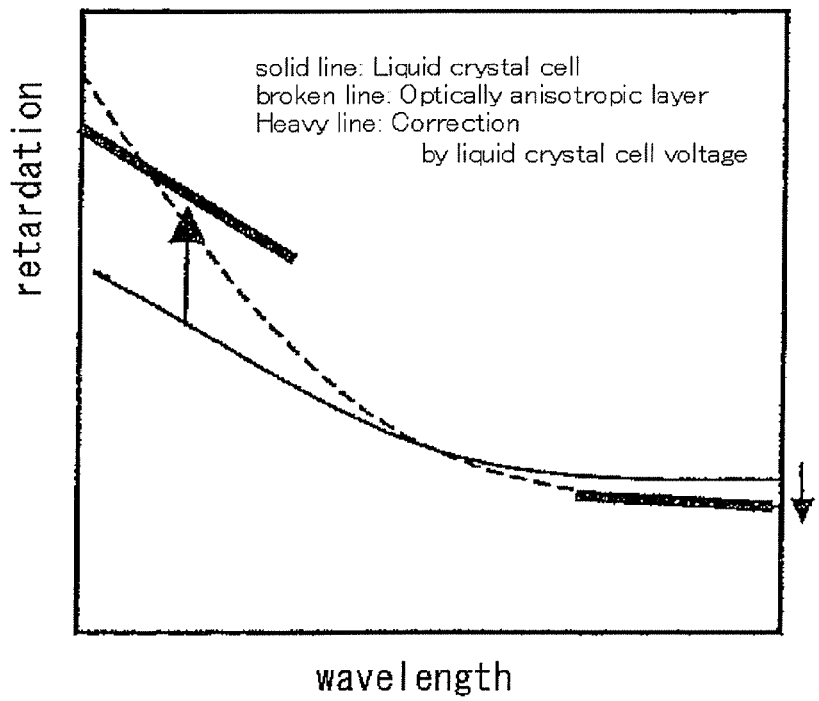
FIG. 2 It is a schematic drawing explaining a method of adapting wavelength-dependence characteristics of a liquid crystal cell to wavelength-dependence characteristics of an optically anisotropic layer.
Figure 2:
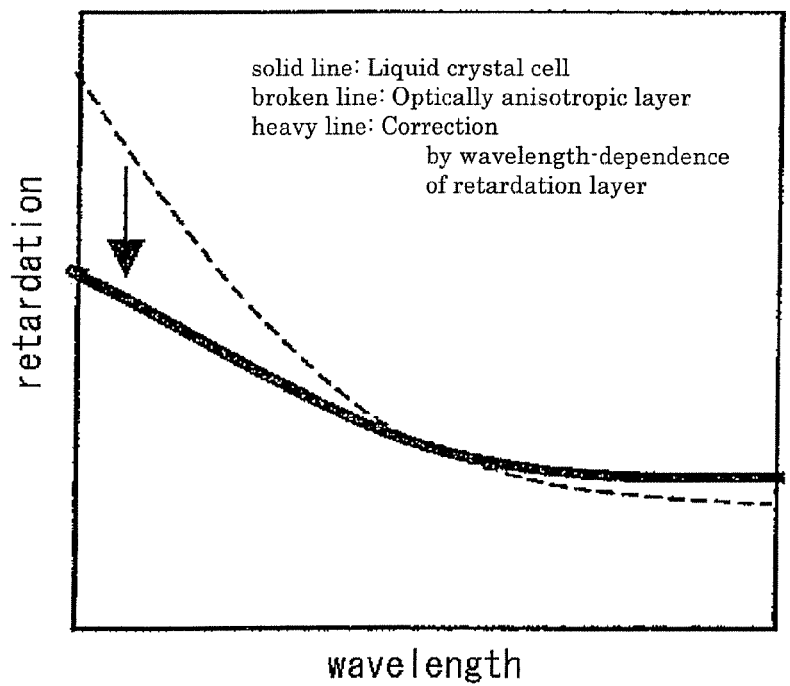

| DESCRIPTION OF THE SYMBOLS | |
|---|---|
| 1, 101 | Polarizing film |
| 2, 102 | Transmission axis |
| 3a, 103a | Polymer film (Support of Optically anisotropic layer or Protective film of Polarizing film) |
| 4a, 104a | Slow axis |
| 5, 9 | Optically anisotropic layer |
| 5a, 9a | Mean alignment direction |
| 6, 8 | Substrate |
| 7 | Liquid crystal layer |
| RD | Rubbing direction |

The invention claimed is:

1. An optical compensation film comprising at least one optically anisotropic layer formed of a composition comprising two or more species of liquid crystalline compounds which differ in wavelength-dependence from each other,
wherein a ratio α2, which is a ratio of a retardation value at 400 nm to a retardation value at 550 nm value, of said optically anisotropic layer is smaller than 1.2,
wherein said optically anisotropic layer is a layer formed of a composition comprising at least one species of liquid crystalline compounds represented by a formula (DI) or a formula (I) below:

Formula (DI)

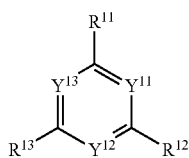

where, in the formula (DI), $Y^{11}$, $Y^{12}$ and $Y^{13}$ independently represent methine or nitrogen atom, $R^{11}$, $R^{12}$ and $R^{13}$ independently represent the group represented by the formula (DI-A), the formula (DI-B) or the formula (DI-C) below:

Formula (DI-A)

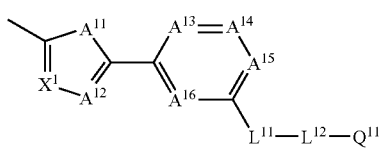

(where, in the formula (DI-A), $A^{11}$, $A^{12}$, $A^{13}$, $A^{14}$, $A^{15}$ and $A^{16}$ independently represent methine or nitrogen atom, $X^1$ represents an oxygen atom, sulfur atom, methylene or imino, $L^{11}$ represents —O—, —O—CO—, —CO—O—, —O—CO—O—, —S—, —NH—, —SO$_2$—, —CH$_2$, —CH=CH— or —C≡C—, $L^{12}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substituent, $Q^{11}$ independently represents a polymerizable group or hydrogen atom);

Formula (DI-B)

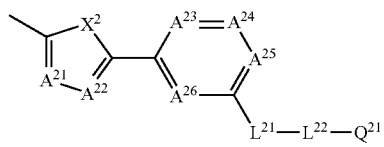

(where, in the formula (DI-B), $A^{21}$, $A^{22}$, $A^{23}$, $A^{24}$, $A^{25}$ and $A^{26}$ independently represent methine or nitrogen atom, $X^2$ represents an oxygen atom, sulfur atom, methylene or imino, $L^{21}$ represents —O—, —O—CO—, —CO—O—, —O—CO—O—, —S—, —NH—, —SO$_2$—, —CH$_2$, —CH=CH— or —C≡C—, $L^{22}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substituent, $Q^{21}$ independently represents a polymerizable group or hydrogen atom);

Formula (DI-C)

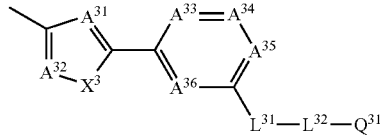

(where, in the formula (DI-C), $A^{31}$, $A^{32}$, $A^{33}$, $A^{34}$, $A^{35}$ and $A^{36}$ independently represent methine or nitrogen atom, $X^3$ represents an oxygen atom, sulfur atom, methylene or imino, $L^{31}$ represents —O—, —O—CO—, —CO—O—, —O—CO—O—, —S—, —NH—, —SO$_2$—, —CH$_2$, —CH=CH— or —C≡C—, $L^{32}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substitutive group, $Q^{31}$ independently represents a polymerizable group or hydrogen atom);

Formula (I)

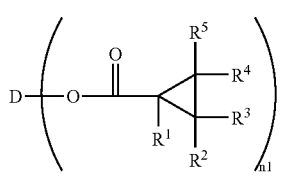

where, in the formula (I), D represents a triphenylene, n1 represents an integer from 3 to 6, $R^1$, $R^2$, $R^3$, $R^4$ and $R^5$ independently represent a hydrogen atom, substituted or non-substituted $C_{1-20}$ alkyl group, substituted or non-substituted $C_{3-20}$ alkenyl group, substituted or non-substituted $C_{1-20}$ alkoxy group, substituted or non-substituted $C_{3-20}$ alkenyloxy group, substituted or non-substituted $C_{6-20}$ aryl group, substituted or non-substituted $C_{6-20}$ aryloxy group, or substituted or non-substituted $C_{1-20}$ alkoxycarbonyl group.

2. The optical compensation film of claim 1, further comprising a support having Re/Rth(450 nm), which is ratio of Re to Rth at 450 nm, 0.4 to 0.95 times as small as Re/Rth(550 nm), which is ratio of Re to Rth at 550 nm, and having Re/Rth(650 nm), which is ratio of Re to Rth at 650 nm, 1.05 to 1.9 times as large as Re/Rth(550 nm).

3. A method of producing an optical compensation film comprising:

applying a composition comprising at least one species of liquid crystalline compound to a surface, and aligning molecules of said liquid crystalline compound, to thereby form an optically anisotropic layer having α2, which is ratio of a retardation value at 400 nm to a retardation value at 550 nm, of smaller than 1.2, wherein wavelength-dependence α2 of said optically anisotropic layer is adjusted to the range by adding a plurality of liquid crystalline compounds of which wavelength-dependence is different from each other to the composition, and/or by adding a non-liquid crystalline compound together with the liquid crystalline compound(s) to the composition;

wherein said composition comprises at least one species of liquid crystalline compounds represented by a formula (DI) or a formula (I) below:

Formula (DI)

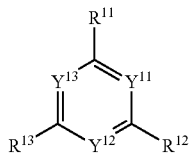

where, in the formula (DI), $Y^{11}$, $Y^{12}$ and $Y^{13}$ independently represent methine or nitrogen atom, $R^{11}$, $R^{12}$ and $R^{13}$ independently represent the group represented by the formula (DI-A), the formula (DI-B) or the formula (DI-C) below:

Formula (DI-A)

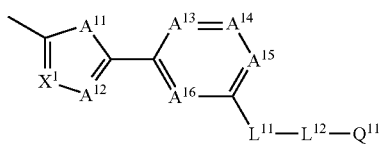

(where, in the formula (DI-A), $A^{11}$, $A^{12}$, $A^{13}$, $A^{14}$, $A^{15}$ and $A^{16}$ independently represent methine or nitrogen atom, $X^1$ represents an oxygen atom, sulfur atom, methylene or imino, $L^{11}$ represents —O—, —O—CO—, —CO—O—, —O—CO—O—, —S—, —NH—, —SO$_2$—, —CH$_2$, —CH=CH— or —C≡C—, $L^{12}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substituent, $Q^{11}$ independently represents a polymerizable group or hydrogen atom);

Formula (DI-B)

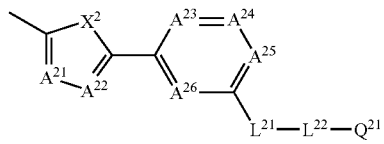

(where, in the formula (DI-B), $A^{21}$, $A^{22}$, $A^{23}$, $A^{24}$, $A^{25}$ and $A^{26}$ independently represent methine or nitrogen atom, represents an oxygen atom, sulfur atom, methylene or imino $L^{21}$ represents —O—, —O—CO—, —CO—O—, —O—CO—O—, —S—, —NH—, —SO$_2$—, —CH$_2$, —CH=CH— or —C≡C—, $L^{22}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substituent, $Q^{21}$ independently represents a polymerizable group or hydrogen atom);

Formula (DI-C)

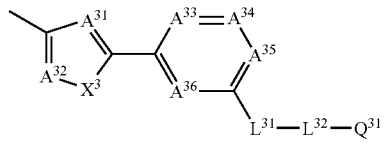

(where, in the formula (DI-C), $A^{31}$, $A^{32}$, $A^{33}$, $A^{34}$, $A^{35}$ and $A^{36}$ independently represent methine or nitrogen atom, $X^3$ represents an oxygen atom, sulfur atom, methylene or imino, $L^{31}$ represents —O—, —O—CO—, —CO—O—, —O—CO—O—, —S—, —NH—, —SO$_2$—, —CH$_2$, —CH=CH— or —C≡C—, $L^{22}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substitutive group, $Q^{31}$ independently represents a polymerizable group or hydrogen atom);

Formula (I)

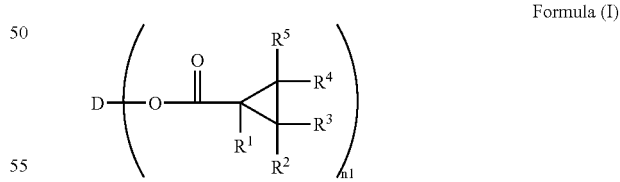

where, in the formula (I), D represents a triphenylene, n1 represents an integer from 3 to 6, $R^1$, $R^2$, $R^3$, $R^4$ and $R^5$ independently represent a hydrogen atom, substituted or non-substituted $C_{1-20}$ alkyl group, substituted or non-substituted $C_{3-20}$ alkenyl group, substituted or non-substituted $C_{1-20}$ alkoxy group, substituted or non-substituted $C_{3-20}$ alkenyloxy group, substituted or non-substituted $C_{6-20}$ aryl group, substituted or non-substituted $C_{6-20}$ aryloxy group, or substituted or non-substituted $C_{1-20}$ alkoxycarbonyl group.

4. The method of claim 3, wherein said composition has a viscosity equal to or smaller than 1500 mPa·s at T° C.; and said optically anisotropic layer is formed by aligning molecules of said liquid crystalline compound(s) at T° C.

5. A polarizing plate comprising a polarizing film, and an optical compensation film as set forth in claim 1.

6. A liquid crystal display device comprising:

a liquid crystal cell having a retardation value Re1(400) at 400 nm and a retardation value Re1(550) at 500 nm in the black state; and at least one layer of optically anisotropic layer formed of a composition comprising at least one species of liquid crystalline compound, having a retardation value Re2 (400) at 400 nm and a retardation value Re2(550) at 550 nm, wherein Re2(400) and Re2(550) of said optically anisotropic layer, and retardations values Re1(400) and Re1 (550) satisfy the relational expression (1) below:

$$0.9 \leq \alpha 2/\alpha 1 \leq 1.1 \qquad \text{Relational Expression (1)}$$

where, $\alpha 1 = Re1(400)/Re1(550)$ and $\alpha 2 = Re2(400)/Re2(550)$, wherein said optically anisotropic layer is a layer formed of a composition comprising at least one species of liquid crystalline compounds represented by a formula (DI) or a formula (I) below:

Formula (DI)

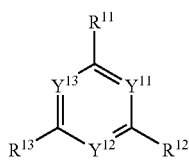

where, in the formula (DI), $Y^{11}$, $Y^{12}$ and $Y^{3}$ independently represent methine or nitrogen atom, $R^{11}$, $R^{12}$ and $R^{13}$ independently represent the group represented by the formula (DI-A), the formula (DI-B) or the formula (DI-C) below:

Formula (DI-A)

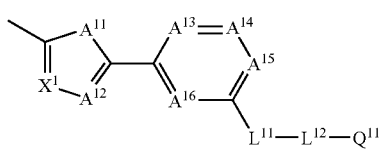

(where, in the formula (DI-A), $A^{11}$, $A^{12}$, $A^{13}$, $A^{14}$, $A^{15}$ and $A^{16}$ independently represent methine or nitrogen atom, $X^{1}$ represents an oxygen atom, sulfur atom, methylene or imino, $L^{11}$ represents —O—, —O—CO—, —CO—O—, —O—CO—O—, —S—, —NH—, —SO$_2$—, —CH$_2$, —CH=CH— or —C≡C—, $L^{12}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substituent, $Q^{11}$ independently represents a polymerizable group or hydrogen atom);

Formula (DI-B)

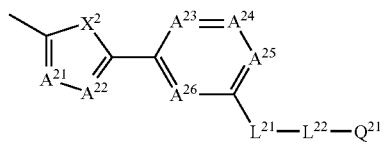

(where, in the formula (DI-B), $A^{21}$, $A^{22}$, $A^{23}$, $A^{24}$, $A^{25}$ and $A^{26}$ independently represent methine or nitrogen atom, $X^{2}$ represents an oxygen atom, sulfur atom, methylene or imino, $L^{21}$ represents —O—, —O—CO—, —CO—O—, —O—CO—O—, —S—, —NH—, —SO$_2$—, —CH$_2$, —CH=CH— or —C≡C—, $L^{22}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substituent, $Q^{21}$ independently represents a polymerizable group or hydrogen atom); Formula (DI-C)

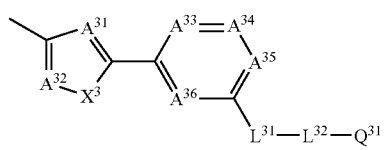

(where, in the formula (DI-C), $A^{31}$, $A^{32}$, $A^{33}$, $A^{34}$, $A^{35}$ and $A^{36}$ independently represent methine or nitrogen atom, represents an oxygen atom, sulfur atom, methylene or imino, $L^{31}$ represents —O—, —O—CO—, —CO—O—, —O—CO—O—, —S—, —NH—, —SO$_2$—, —CH$_2$, —CH=CH— or —C≡C—, $L^{32}$ represents a divalent linking group selected from the group consisting of —O—, —S—, —C(=O)—, —SO$_2$—, —NH—, —CH$_2$—, —CH=CH— and —C≡C— and any combinations thereof, wherein any hydrogen atom, if contained in the above-described groups, may be substituted by a substitutive group, independently represents a polymerizable group or hydrogen atom);

Formula (I)

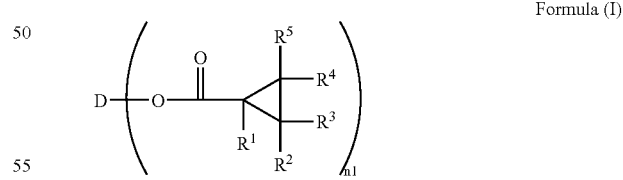

where, in the formula (I), D represents a triphenylene, n1 represents an integer from 3 to 6, $R^{1}$, $R^{2}$, $R^{3}$, $R^{4}$ and $R^{5}$ independently represent a hydrogen atom, substituted or non-substituted $C_{1-20}$ alkyl group, substituted or non-substituted $C_{3-20}$ alkenyl group, substituted or non-substituted $C_{1-20}$ alkoxy group, substituted or non-substituted $C_{3-20}$ alkenyloxy group, substituted or non-substituted $C_{6-20}$ aryl group, substituted or non-substituted $C_{6-20}$ aryloxy group, or substituted or non-substituted $C_{1-20}$ alkoxycarbonyl group.

7. The liquid crystal display device of claim 6, further comprising a polarizing film disposed further outside of said optically anisotropic layer, and a polymer film disposed between said polarizing film and said optically anisotropic layer;

where said polymer film has Re/Rth(450 nm), which is ratio of Re to Rth at 450 nm, 0.4 to 0.95 times as small as Re/Rth(550 nm), which is ratio of Re to Rth at 550 nm, and has Re/Rth(650 nm), which is ratio of Re to Rth at 650 nm, 1.05 to 1.9 times as large as Re/Rth(550 nm).

8. The liquid crystal display device of claim 6, employing an OCB-mode device.

9. The liquid crystal display device of claim 6, employing a TN-mode device.

* * * * *